US010111267B2

(12) United States Patent
Agiwal et al.

(10) Patent No.: US 10,111,267 B2
(45) Date of Patent: Oct. 23, 2018

(54) METHOD AND APPARATUS FOR PERFORMING DEVICE-TO-DEVICE COMMUNICATION

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 14/317,822

(22) Filed: Jun. 27, 2014

(65) Prior Publication Data
US 2015/0004901 A1 Jan. 1, 2015

(30) Foreign Application Priority Data

Jun. 28, 2013 (IN) .............................. 782/KOL/2013
Jun. 27, 2014 (KR) ........................ 10-2014-0079486

(51) Int. Cl.
*H04B 7/24* (2006.01)
*H04W 76/11* (2018.01)
(Continued)

(52) U.S. Cl.
CPC ............ *H04W 76/11* (2018.02); *H04W 76/14* (2018.02); *H04W 72/042* (2013.01)

(58) Field of Classification Search
CPC . H04W 76/023; H04W 72/042; H04W 92/18; H04W 72/04; H04W 12/06;
(Continued)

(56) References Cited

U.S. PATENT DOCUMENTS

2011/0106952 A1  5/2011  Doppler et al.
2011/0312331 A1  12/2011  Hakola et al.
(Continued)

FOREIGN PATENT DOCUMENTS

CN  101873642 A  10/2010
CN  103037359 A  4/2013
(Continued)

OTHER PUBLICATIONS

Chinese Office Action dated Mar. 28, 2018, issued in Chinese Application No. 201480042488.2.
(Continued)

*Primary Examiner* — Ajibola Akinyemi
(74) *Attorney, Agent, or Firm* — Jefferson IP Law, LLP

(57) ABSTRACT

A method and apparatus for performing Device-to-Device (D2D) communication are provided. The method includes being assigned a transmission and reception indicator and an index during D2D connection setup between a User Equipment (UE) and a Base Station (BS) by the UE, the transmission and reception indicator indicating a transmission role or a reception role and the index indicating another UE for D2D communication, receiving the transmission and reception indicator, the index, and resource information for the D2D communication on a control channel by the UE, and performing, by the UE, a transmission operation or a reception operation to or from the other UE indicated by the index in resources indicated by the resource information according to the transmission role or the reception role indicated by the transmission and reception indicator.

24 Claims, 49 Drawing Sheets

(51) Int. Cl.
*H04W 76/14* (2018.01)
*H04W 72/04* (2009.01)

(58) Field of Classification Search
CPC ..... H04W 12/08; H04W 24/04; H04W 24/10; H04W 28/02; H04W 28/0278; H04W 28/06; H04W 36/00; H04W 36/0016; H04W 4/06; H04W 4/08
USPC .......................................................... 455/39
See application file for complete search history.

(56) References Cited

U.S. PATENT DOCUMENTS

| | | | |
|---|---|---|---|
| 2012/0077510 A1 | 3/2012 | Chen et al. | |
| 2012/0129540 A1 | 5/2012 | Hakola et al. | |
| 2013/0150061 A1 | 6/2013 | Shin et al. | |
| 2013/0150108 A1* | 6/2013 | Yang | H04W 52/0216 455/509 |
| 2014/0003262 A1* | 1/2014 | He | H04W 28/08 370/252 |
| 2014/0003319 A1* | 1/2014 | Etemad | H04W 28/08 370/312 |
| 2014/0064203 A1 | 3/2014 | Seo et al. | |
| 2014/0098719 A1 | 4/2014 | Kim et al. | |
| 2014/0162714 A1 | 6/2014 | Kim et al. | |
| 2014/0206372 A1 | 7/2014 | Zeng et al. | |
| 2014/0286284 A1 | 9/2014 | Lim et al. | |
| 2014/0314009 A1 | 10/2014 | Xiong | |
| 2014/0315562 A1 | 10/2014 | Lim et al. | |
| 2015/0071212 A1* | 3/2015 | Kim | H04W 76/14 370/329 |
| 2015/0189487 A1* | 7/2015 | Morita | H04W 52/0225 455/434 |
| 2015/0334756 A1* | 11/2015 | Lu | H04W 76/14 370/329 |

FOREIGN PATENT DOCUMENTS

| | | |
|---|---|---|
| CN | 103139764 A | 6/2013 |
| WO | 2011/088609 A1 | 7/2011 |
| WO | 2012/128505 A2 | 9/2012 |
| WO | 2012/166969 A1 | 12/2012 |
| WO | 2012/166975 A1 | 12/2012 |
| WO | 2013-044718 A2 | 4/2013 |
| WO | 2013/062310 A1 | 5/2013 |
| WO | 2013/062351 A1 | 5/2013 |

OTHER PUBLICATIONS

Ericsson, Resource allocation for D2D transmitters in coverage, Feb. 10, 2014, Tdoc R2-140625, 3GPP TSG-RAN WG2 #85, Feb. 10-14, 2014, Prague, Czech Republic.

Alcatel-Lucent et al., BSR for D2D, May 19, 2014, R2-142587, 3GPP TSG-RAN WG2 Meeting #86, May 19-23, 2014, Seoul, Korea.

Ericsson, Identifiers and Addresses for D2D Communication, Mar. 31, 2014, Tdoc R2-141262, 3GPP TSG-RAN WG2 #85bis, Mar. 31-Apr. 4, 2014, Valencia, Spain.

Huawei et al., Discussion on SR for D2D communication, Mar. 31, 2014, R2-141332, 3GPP TSG RAN WG2 Meeting #85bix, Mar. 31-Apr. 4, 2014, Valencia, Spain.

3rd Generation Partnership Project; Technical Specification Group Radio Access Network; Study on LTE Device to Device Proximity Services; Radio Aspects (Release 12), Mar. 1, 2014, 3GPP TR 36.843, V12.0.1 (Mar. 2014).

Japanese Office Action dated Jun. 11, 2018, issued in Japanese Patent Application No. 2016-523656.

European Office Action dated Jul. 17, 2018, issued in European Patent Application No. 14 816 808.1-1231.

* cited by examiner

METHOD AND APPARATUS FOR PERFORMING DEVICE-TO-DEVICE COMMUNICATION

CROSS-REFERENCE TO RELATED APPLICATION(S)

This application claims the benefit under 35 U.S.C. § 119(a) of an India patent application filed on Jun. 28, 2013 in the Indian Intellectual Property Office and assigned Serial No. IN 782/KOL/2013, and of a Korean patent application filed on Jun. 27, 2014 in the Korean Intellectual Property Office and assigned Serial No. 10-2014-0079486, the entire disclosure of each of which is hereby incorporated by reference.

TECHNICAL FIELD

The present disclosure relates to a method and apparatus for allocating resources and performing communication in a Device-to-Device (D2D) communication system.

BACKGROUND

The recent proliferation of smartphones is a driving force behind the rapid growth of data traffic. According to the Korea Communications Committee, it was reported in 2013 that, due to the increasing popularity of smartphones, mobile data traffic had tripled since the last estimate. Considering that the number of smartphone users will be further increasing and more application services will be used in smartphones, it is expected that mobile data traffic will also be increasing. Particularly, if Machine-to-Machine (M2M) communication including communication between a person and a thing, communication between things, and the like is boosted as a new mobile market beyond communication between humans, the traffic transmitted to a Base Station (BS) will be exceedingly large.

Accordingly, there is a need address these problems. In this context, Device-to-Device (D2D) communication has recently attracted much attention and research on resource allocation for D2D communication is underway.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently allocating resources for Device-to-Device (D2D) communication.

Another aspect of the present disclosure is to provide a method and apparatus for allocating transmission resources and reception resources for D2D communication to a User Equipment (UE) and enabling the UE to identify the allocated transmission resources and reception resources.

In accordance with an aspect of the present disclosure, a method and apparatus for performing D2D communication is provided. The method includes being assigned a transmission and reception indicator and an index during D2D connection setup between a UE and a Base Station (BS) by the UE, the transmission and reception indicator indicating a transmission role or a reception role and the index indicating another UE for D2D communication, receiving the transmission and reception indicator, the index, and resource information for the D2D communication on a control channel by the UE, and performing, by the UE, a transmission operation or a reception operation to or from the other UE indicated by the index in resources indicated by the resource information according to the transmission role or the reception role indicated by the transmission and reception indicator.

In accordance with another aspect of the present disclosure, a method for performing D2D communication is provided. The method includes assigning a transmission and reception indicator and an index to a UE during D2D connection setup between the UE and a BS by the BS, the transmission and reception indicator indicating a transmission role or a reception role and the index indicating another UE for D2D communication, and transmitting the transmission and reception indicator, the index, and resource information for the D2D communication on a control channel to the UE by the BS. The D2D communication is performed between the UE and the other UE by performing a transmission operation or a reception operation between the UE and the other UE indicated by the index in resources indicated by the resource information according to the transmission role or the reception role indicated by the transmission and reception indicator.

In accordance with another aspect of the present disclosure, a UE for performing D2D is provided. The UE includes a transceiver configured to perform D2D communication with another UE through a direct communication link, and a controller configured to control a transmission and reception indicator and an index to be assigned during D2D connection setup between the UE and a BS, and to control the transmission and reception indicator indicating a transmission role or a reception role and the index indicating the other UE for the D2D communication, reception of the transmission and reception indicator, the index, and resource information for the D2D communication on a control channel, and performing of a transmission operation or a reception operation to or from the other UE indicated by the index in resources indicated by the resource information according to the transmission role or the reception role indicated by the transmission and reception indicator.

In accordance with another aspect of the present disclosure, a BS for performing D2D communication is provided. The BS includes a controller configured to control assignment of a transmission and reception indicator and an index to a UE during D2D connection setup between the UE and the BS, the transmission and reception indicator indicating a transmission role or a reception role and the index indicating another UE for D2D communication, and transmission of the transmission and reception indicator, the index, and resource information for the D2D communication on a control channel to the UE, and a transceiver configured to communicate with at least one UE under control of the controller. The D2D communication is performed between the UE and the other UE by performing a transmission operation or a reception operation between the UE and the other UE determined by the index in resources indicated by the resource information according to the transmission role or the reception role indicated by the transmission and reception indicator.

In accordance with another aspect of the present disclosure, a method for performing D2D communication is provided. The method includes being assigned a network temporary ID for D2D communication during D2D connection setup with a BS by a UE, receiving resource information for the D2D communication on a control channel masked with the network temporary ID by the UE, and performing a transmission operation or a reception operation to or from another UE determined based on the network temporary ID in resources indicated by the resource information by the UE.

In accordance with another aspect of the present disclosure, a method for performing D2D communication is provided. The method includes assigning a network temporary ID for D2D communication to a UE during D2D connection setup with the UE by a BS, and transmitting resource information for the D2D communication on a control channel masked with the network temporary ID to the UE by the BS. The D2D communication is performed between the UE and another UE by a transmission operation or a reception operation between the UE and the other UE determined based on the network temporary ID in resources indicated by the resource information.

In accordance with another aspect of the present disclosure, a UE for performing D2D communication is provided. The UE includes a transceiver configured to perform D2D communication with another UE through a direct communication link, and a controller configured to control a network temporary ID for D2D communication to be assigned during D2D connection setup with a BS, and to control reception of resource information for the D2D communication on a control channel masked with the network temporary ID and performing of a transmission operation or a reception operation to or from another UE determined based on the network temporary ID in resources indicated by the resource information.

In accordance with another aspect of the present disclosure, a BS for performing D2D communication is provided. The BS includes a controller configured to control assignment of a network temporary ID for D2D communication to a UE during D2D connection setup with the UE and transmission of resource information for the D2D communication on a control channel masked with the network temporary ID to the UE, and a transceiver configured to communicate with at least one UE under control of the controller. The D2D communication is performed between the UE and another UE by a transmission operation or a reception operation between the UE and the other UE determined based on the network temporary ID in resources indicated by the resource information.

In accordance with another aspect of the present disclosure, a method for performing D2D communication is provided. The method includes being assigned a UE pair ID for D2D communication during D2D connection setup with a BS by a UE, receiving the UE pair ID and resource information for the D2D communication on a control channel by the UE, the control channel being masked with a network temporary ID reserved for D2D communication, and performing a transmission operation or a reception operation to or from another UE determined based on the UE pair ID in resources indicated by the resource information by the UE. The network temporary ID is the same for all D2D connections.

In accordance with another aspect of the present disclosure, a method for performing D2D communication is provided. The method includes assigning a UE pair ID for D2D communication to a UE during D2D connection setup with the UE by a BS, and transmitting the UE pair ID and resource information for the D2D communication on a control channel to the UE by the BS, the control channel being masked with a network temporary ID reserved for D2D communication. The D2D communication is performed between the UE and another UE by a transmission operation or a reception operation between the UE and the other UE based on the UE pair ID in resources indicated by the resource information. The network temporary ID is the same for all D2D connections.

In accordance with another aspect of the present disclosure, a UE for performing D2D communication is provided. The UE includes a transceiver configured to perform D2D communication with another UE on a direct communication link, and a controller configured to control a UE pair ID for D2D communication to be allocated to the UE during D2D connection setup with a BS, to control reception of the UE pair ID and resource information for the D2D communication on a control channel, the control channel being masked with a network temporary ID reserved for D2D communication, and to control performing of a transmission operation or a reception operation to or from another UE determined based on the UE pair ID in resources indicated by the resource information. The network temporary ID is the same for all D2D connections.

In accordance with another aspect of the present disclosure, a BS for performing D2D communication is provided. The BS includes a controller configured to control assignment of a UE pair ID for D2D communication to a UE during D2D connection setup with the UE, and transmission of the UE pair ID and resource information for the D2D communication on a control channel to the UE, the control channel being masked with a network temporary ID reserved for D2D communication, and a transceiver configured to communicate with at least one UE under control of the controller. The D2D communication is performed between the UE and another UE by a transmission operation or a reception operation between the UE and the other UE based on the UE pair ID in resources indicated by the resource information. The network temporary ID is the same for all D2D connections.

In accordance with another aspect of the present disclosure, a method for performing D2D communication is provided. The method includes receiving a network temporary ID of another UE for D2D communication during D2D connection setup with a BS by a UE, receiving information about the other UE and resource information for the D2D communication with the other UE on a control channel by the UE, the control channel being masked with a network temporary ID of a UE to play a transmission role or a reception role in the D2D communication, and performing a transmission operation or a reception operation to or from the other UE based on the network temporary ID used in masking the control channel and the information about the other UE in resources indicated by the resource information by the UE. The network temporary ID is different for each UE.

In accordance with another aspect of the present disclosure, a method for performing D2D communication is provided. The method includes transmitting a network temporary ID of another UE for D2D communication during D2D connection setup with a UE by a BS, and transmitting information about the other UE and resource information for the D2D communication with the other UE on a control channel to the UE by the BS, the control channel being masked with a network temporary ID of a UE to play a transmission role or a reception role in the D2D communication. The D2D communication is performed between the UE and the other UE by a transmission operation or a reception operation between the UE and the other UE based on the network temporary ID used in masking the control channel and the information about the other UE in resources indicated by the resource information. The network temporary ID is different for each UE.

In accordance with another aspect of the present disclosure, a UE for performing D2D communication is provided. The UE includes a transceiver configured to perform D2D communication with another UE on a direct communication link, and a controller configured to control reception of a network temporary ID of the other UE for the D2D communication during D2D connection setup with a BS, reception of information about the other UE and resource information for the D2D communication with the other UE on a control channel masked with a network temporary ID of a UE to play a transmission role or a reception role in the D2D communication, and performing of a transmission operation or a reception operation to or from the other UE based on the network temporary ID used in masking the control channel and the information about the other UE in resources indicated by the resource information. The network temporary ID is different for each UE.

In accordance with another aspect of the present disclosure, a BS for performing D2D communication is provided. The BS includes a controller configured to control transmission of a network temporary ID of another UE for D2D communication during D2D connection setup with a UE, and transmission of information about the other UE and resource information for the D2D communication with the other UE on a control channel to the UE, the control channel being masked with a network temporary ID of a UE to play a transmission role or a reception role in the D2D communication, and a transceiver configured to communicate with at least one UE under control of the controller. The D2D communication is performed between the UE and the other UE by a transmission operation or a reception operation between the UE and the other UE based on the network temporary ID used in masking the control channel and the information about the other UE in resources indicated by the resource information. The network temporary ID is different for each UE.

In accordance with another aspect of the present disclosure, a method for allocating resources for Device-to-Device (D2D) communication is provided. The method includes requesting resources for D2D communication by transmitting a D2D buffer status report or a D2D scheduling request to a Base Station (BS); and receiving resources for D2D communication from BS, wherein the resources for D2D communication is received on a control channel in a downlink (DL) subframe corresponding to an uplink (UL) subframe reserved for D2D communication, or on a control channel using control information format for D2D communication, or on a control channel with Cyclic Redundancy Check (CRC) masked using a radio network terminal identifier (RNTI) assigned to a User Equipment (UE) for D2D communication.

In accordance with another aspect of the present disclosure, a method for allocating resources for Device-to-Device (D2D) communication is proved. The method includes receiving a buffer status report or a scheduling request from a User Equipment (UE); determining whether the buffer status report or the scheduling request is for D2D communication, allocating resources for D2D communication if the buffer status report or the scheduling request is for D2D communication and transmitting the allocated resources for D2D communication to the UE, wherein the resources for D2D communication is transmitted on a control channel in a downlink (DL) subframe corresponding to an uplink (UL) subframe reserved for D2D communication, or on a control channel using control information format for D2D communication or on a control channel with Cyclic Redundancy Check (CRC) masked using a radio network terminal identifier (RNTI) assigned to a User Equipment (UE) for D2D communication.

In accordance with another aspect of the present disclosure, a User Equipment (UE) for allocating resources for Device-to-Device (D2D) communication is proved. The UE includes a transceiver configured to perform D2D communication with another UE through a direct communication link; and a controller configured to control for requesting resources for D2D communication by transmitting a D2D buffer status report or a D2D scheduling request to a Base Station (BS) and for receiving resources for D2D communication from BS, wherein the resources for D2D communication is received on a control channel in a downlink (DL) subframe corresponding to an uplink (UL) subframe reserved for D2D communication, or on a control channel using control information format for D2D communication, or on a control channel with Cyclic Redundancy Check (CRC) masked using a radio network terminal identifier (RNTI) assigned to a User Equipment (UE) for D2D communication.

In accordance with another aspect of the present disclosure, a Base Station (BS) for allocating resources for Device-to-Device (D2D) communication is proved. The BS includes a controller configured to control for receiving a buffer status report or a scheduling request from a User Equipment (UE), determining whether the buffer status report or the scheduling request is for D2D communication, allocating resources for D2D communication if the buffer status report or the scheduling request is for D2D communication and transmitting the allocated resources for D2D communication to the UE and a transceiver configured to perform communication with the UE by controlling of the controller, wherein the resources for D2D communication is transmitted on a control channel in a downlink (DL) subframe corresponding to an uplink (UL) subframe reserved for D2D communication, or on a control channel using control information format for D2D communication or on a control channel with Cyclic Redundancy Check (CRC) masked using a radio network terminal identifier (RNTI) assigned to the UE for D2D communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A Base Station (BS) is an entity that communicates with a User Equipment (UE). The term BS may be replaced with Node B, evolved Node B (eNB or eNode B), Access Point (AP), and the like.

A UE is an entity that communicates with a BS. The term UE may be replaced with Mobile Station (MS), Mobile Equipment (ME), device, terminal, and the like.

Figure 1:
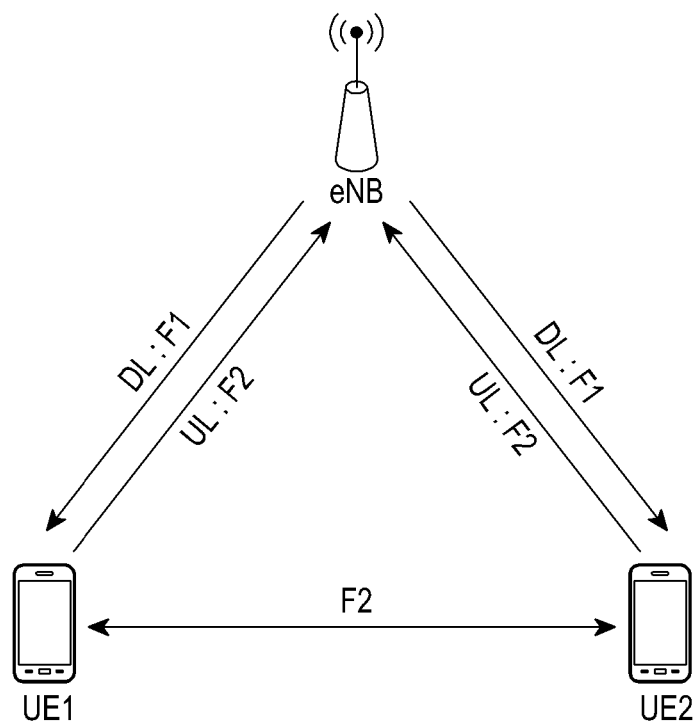
FIG. 1 illustrates a Device-to-Device (D2D) communication environment according to the related art.

FIG. 1 illustrates a Device-to-Device (D2D) communication environment according to the related art.

Referring to FIG. 1, a pair of a first UE (UE1) and a second UE (UE2) are connected to an eNB and also to each other for direct communication. UE1 and UE2 communicate with the eNB using a DownLink (DL) frequency F1 and an UpLink (UL) frequency F2 in a FDD (Frequency Division Duplex) system. The UL frequency F2 is also used for D2D communication between UE1 and UE2. Resources of the UL frequency F2 are controlled by the eNB. In a TDD (Time Division Duplexed) system, UE1 and UE2 communicate with the eNB using a frequency F1 comprising of UL and DL time slots wherein UL time slots are used by UE 1 and UE 2 to transmit to eNB and DL time slots are used by UE1 and UE2 to receive from eNB. The UL time slots are also used for D2D communication between UE1 and UE2. It is to be noted that UE may also communicate with multiple UEs concurrently.

Figure 2:
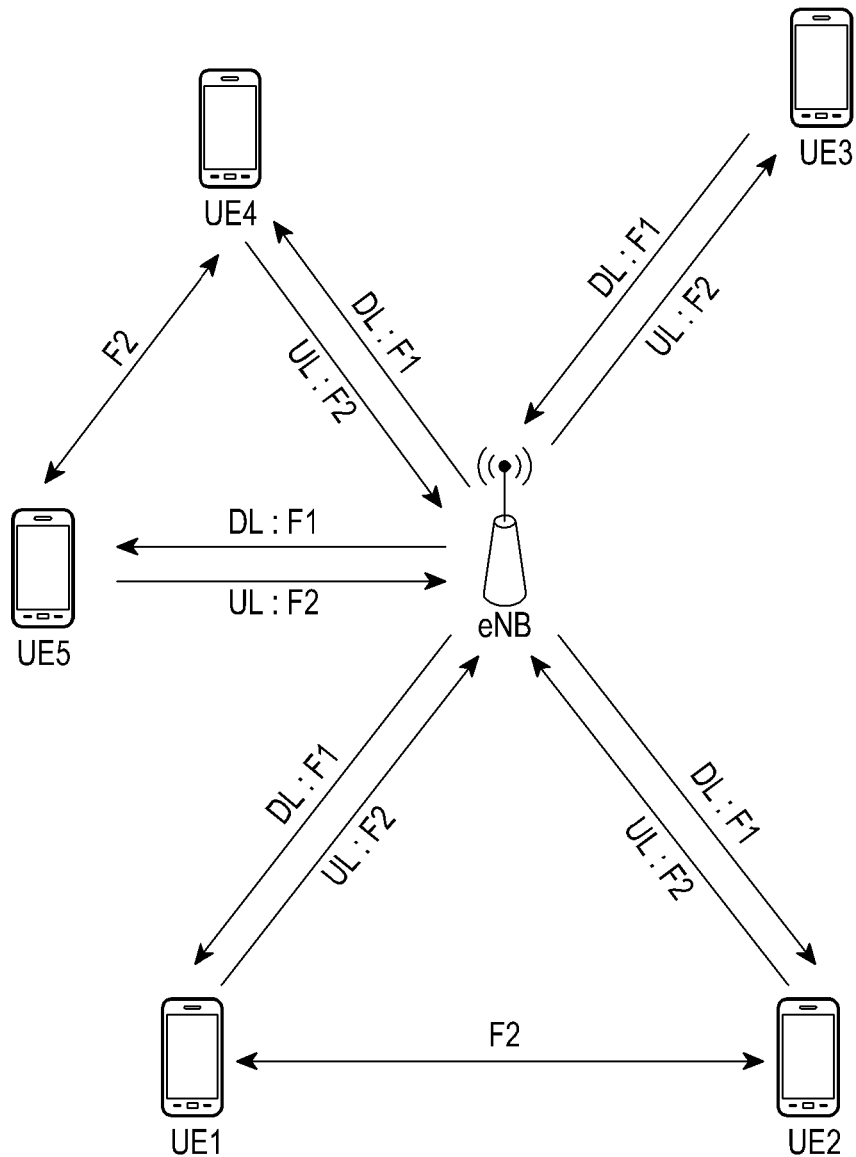
FIG. 2 illustrates a case in which a plurality of User Equipment (UE) pairs connected to an evolved Node B (eNB) participate in D2D communication according to an embodiment of the present disclosure.

FIG. 2 illustrates a case in which a plurality of UE pairs connected to an eNB participates in D2D communication according to an embodiment of the present disclosure.

Referring to FIG. 2, all of UE1, UE2, a third UE (UE3), a fourth UE (UE4), and a fifth UE (UE5) communicate with the eNB using the DL frequency D1 and the UL frequency F2 in a FDD (Frequency Division Duplex) system. As described before, UE pairs, herein, a UE1-UE2 pair and a UE4-UE5 pair perform D2D communication using the UL frequency F2. In a TDD (Time Division Duplexed) system, UE(s) communicate with the eNB using a frequency F1 comprising of UL and DL time slots wherein UL time slots is used by UE(s) to transmit to eNB and DL time slots are used by UE(s) to receive from eNB. The UL time slots are also used for D2D communication between UE1-UE2 and UE4-UE5.

In this case, there is a need for a method for signaling Transmission (Tx) resources and/or Reception (Rx) resources for the UEs involved in D2D communication, a method for identifying a Tx role and an Rx role between the UEs during D2D communication, a method for distinguishing Tx resources from Rx resources for each UE. Embodiments of the present disclosure provide these methods.

Embodiment 1

A method for allocating resources for D2D transmission in one embodiment is described below.

A UE within the coverage area of a network may participate in D2D communication and may also communicate with an eNB. The UE requests resources for D2D communication to an eNB of a serving cell within the network coverage area. In order to allocate the resources, the eNB determines whether the UE has requested the resources for D2D communication or for UL transmission to the eNB. The resources for D2D communication and the resources for UL transmission to the eNB are allocated to the UE through a DL control channel, Physical Downlink Control Channel (PDCCH) or Enhanced PDCCH (EPDCCH). When the UE receives and decodes the DL control channel (the PDCCH or the EPDCCH) masked with its IDentifier (ID), then the UE determines whether the allocated resources are for D2D communication or for UL transmission to the eNB.

Hereinbelow, three methods for allocating resources for D2D transmission according to embodiments of the present disclosure will be described.

Figure 3:
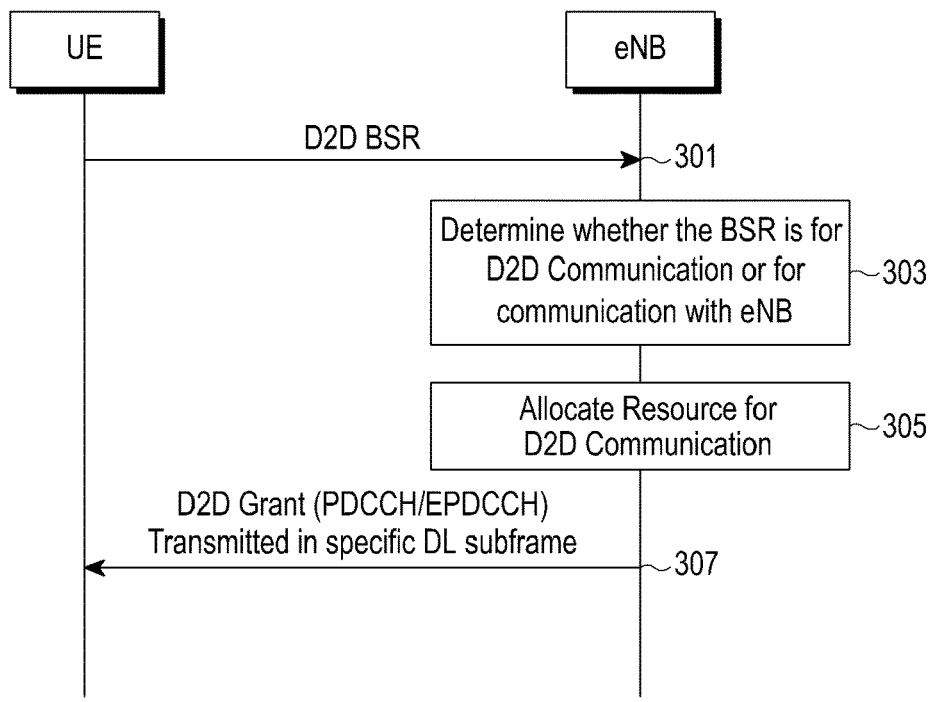
FIG. 3 illustrates a method for allocating resources for D2D communication according to an embodiment of the present disclosure.

FIG. 3 illustrates a method for allocating resources for D2D transmission according to an embodiment of the present disclosure.

Resources for UL transmission to the eNB and resources for D2D communication are indicated through a control channel transmitted by the eNB in different DL subframes. A UE is aware of a DL subframe indicating resources for UL transmission to the eNB and a DL subframe indicating resources for D2D communication. Alternately, resources for UL transmission to the eNB and resources for D2D communication may be indicated through a control channel transmitted by the eNB in the same DL subframe. The UE determines that resources are for D2D communication if the resources indicated in the control channel belong to a set of resources reserved in a UL subframe corresponding to a DL subframe in which the control channel is received. The UE uses a single Cell Radio Network Temporary Identity (C-RNTI) to determine the resources for each type of communication.

Referring to FIG. 3, the UE is in a connected state and assigned a C-RNTI by the eNB. If the UE wants to transmit control and/or data packets through a D2D communication link, the UE transmits a D2D Buffer Status Report (BSR) to the eNB in operation 301. The D2D BSR is different from a general BSR wherein the UE sends the general BSR to eNB to request resources for UL transmission to eNB. A Logical Channel ID (LCID) identifies the D2D BSR from a general BSR. A LCID is newly reserved to indicate the D2D BSR. The LCID may be included in the D2D BSR. Alternatively, the LCID may be included in a Medium Access Control (MAC) subheader indicating a MAC control element having the D2D BSR in a MAC Packet Data Unit (PDU). The D2D BSR may also include a destination ID. The destination ID is the ID of a destination to which the UE wants to transmit control and/or data packets through the D2D communication link. The destination ID may be a unicast address of another UE, group cast address of a group of UEs, or broadcast address. The D2D BSR may also include buffer size and logical channel group ID. Multiple logical channels are typically grouped together and buffer status of group of these logical channels is sent using one buffer status report.

If Physical Uplink Control Channel (PUCCH) resources are available for transmission of the D2D BSR, the resources for the D2D BSR may be obtained using a general method such as transmitting a scheduling request to the eNB. Alternately the resources for the D2D BSR may be obtained by transmitting a random access preamble to the eNB on a Random Access CHannel (RACH). D2D BSR may also be sent in resources already allocated by eNB for UL transmission to eNB.

Upon receipt of the BSR, the eNB in operation 303 determines whether the BSR is for D2D communication or for UL transmission to eNB. This determination is done using the LCID. If the BSR is a D2D BSR then ENB allocates resources for D2D transmission in operation 305 and transmits a grant for D2D transmission on a PDCCH or EPDCCH in a DL subframe corresponding to a UL subframe reserved for D2D communication in operation 307. A Control Information format carrying D2D resource information is the same as or different from a control information format carrying resource information for transmission of a UE to an eNB or for reception from an eNB. The Cyclic Redundancy Check (CRC) of PDCCH or EPDCCH carrying control information is masked with the C-RNTI.

If the UE transmits a Scheduling Assignment (SA) for the D2D communication link in addition to a data packet, upon receipt of the D2D BSR, the eNB may allocate resources for transmission of both the SA and the data packet and indicate the allocated resources using the same or different PDCCHs or EPDCCHs. Alternatively or additionally, upon receipt of the D2D BSR, the eNB may allocate resources for transmitting the SA only. The resources for the data packet may be fixed relative to the location of the SA and/or resources for the SA.

In an alternate embodiment of method illustrated in FIG. 3, instead of BSR, a D2D scheduling request can be transmitted on PUCCH wherein the PUCCH resources are reserved and/or assigned to UE for D2D SR transmission. eNB determines that UE needs resources for D2D communication on receiving the D2D scheduling request in the PUCCH resources reserved and/or assigned to UE for D2D SR transmission.

Figure 4:
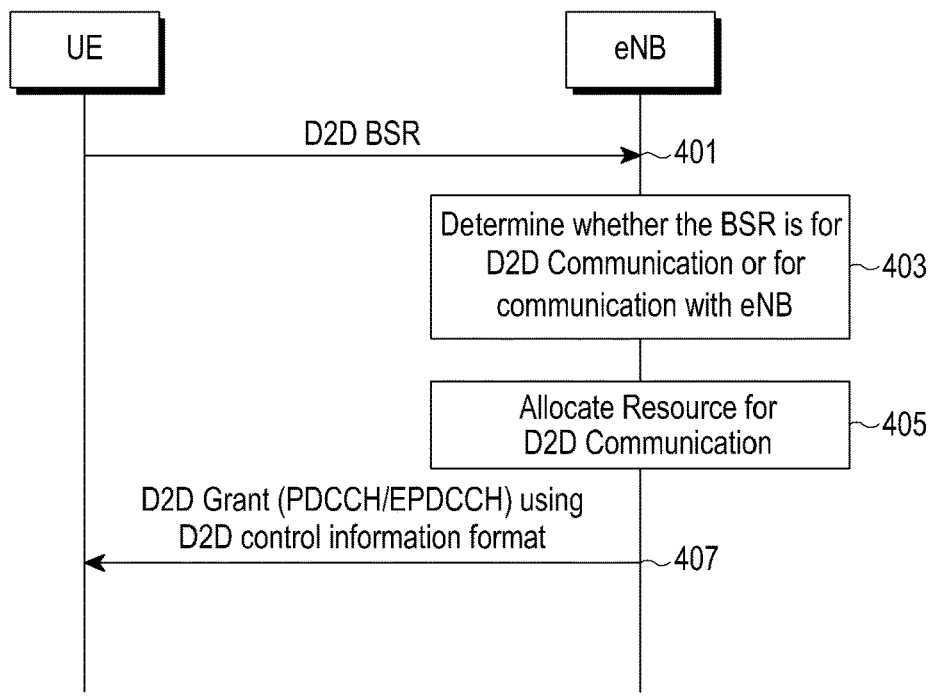
FIG. 4 illustrates another method for allocating resources for D2D communication according to an embodiment of the present disclosure.

FIG. 4 illustrates another method for allocating resources for D2D transmission according to an embodiment of the present disclosure.

Control information format delivered on a control channel indicating resources for communication with an eNB and control information format delivered on a control channel indicating resources for D2D communication may have different formats. The control information format of the control channel indicating resources for D2D communication may be designed such that the size of the control information format is different from the size of general control information format, so that when a UE receives and decodes the control channel, the UE may determine whether the control information indicates resources for D2D communication or not.

Referring to FIG. 4, a UE is in a connected state and assigned a C-RNTI by an eNB. If the UE wants to transmit control and/or data packets through a D2D communication link, the UE transmits a D2D BSR to the eNB in operation 401. The D2D BSR is different from a general BSR wherein the UE sends the general BSR to eNB to request resources for UL transmission to eNB. The D2D BSR is distinguished from a general BSR by an LCID. The LCID is reserved to indicate the D2D BSR. The LCID may be included in the D2D BSR. Alternatively or additionally, the LCID may be included in a MAC subheader indicating a MAC control element with the D2D BSR in a MAC PDU. The D2D BSR may also include a destination ID. The destination ID is the ID of a destination to which the UE wants to transmit control and/or data packets through the D2D communication link. The destination ID may be a unicast address of another UE, group cast address of a group of UEs, or broadcast address. The D2D BSR may also include buffer size and logical channel group ID. Multiple logical channels are typically grouped together and buffer status of group of these logical channels is sent using one buffer status report.

If PUCCH resources are available for transmission of the D2D BSR, the resources for the D2D BSR may be obtained using a general method such as transmitting a scheduling request to the eNB. Alternately the resources for the D2D BSR may be obtained by transmitting a random access preamble to the eNB on an RACH.). D2D BSR may also be sent in resources already allocated by eNB for UL transmission to eNB.

Upon receipt of the BSR, the eNB in operation 403 determines whether the BSR is for D2D communication or for UL transmission to eNB. This determination is done using the LCID. If the BSR is a D2D BSR the eNB allocates resources for D2D transmission in operation 405 and transmits a grant for D2D transmission on a PDCCH or EPDCCH in operation 407. A control information format carrying D2D resource information is different from a control information format carrying resource information for transmission of a UE to an eNB or for reception from an eNB. The CRC of PDCCH or EPDCCH carrying control information is masked with the C-RNTI.

If the UE transmits an SA for the D2D communication link in addition to a data packet, upon receipt of the D2D BSR, the eNB may allocate resources for transmission of both the SA and the data packet and may indicate the allocated resources using the same PDCCH or EPDCCH or different PDCCHs or EPDCCHs. Alternatively or additionally, upon receipt of the D2D BSR, the eNB may allocate resources for transmission of the SA only. The resources for the data packet may be fixed relative to the location of the SA and/or resources for the SA.

In an alternate embodiment of method illustrated in FIG. 4, instead of BSR, a D2D scheduling request can be transmitted on PUCCH wherein the PUCCH resources are reserved and/or assigned for D2D SR transmission. eNB determines that UE needs resources for D2D communication on receiving the D2D scheduling request in the PUCCH resources reserved and/or assigned to UE for D2D SR transmission.

Figure 5:
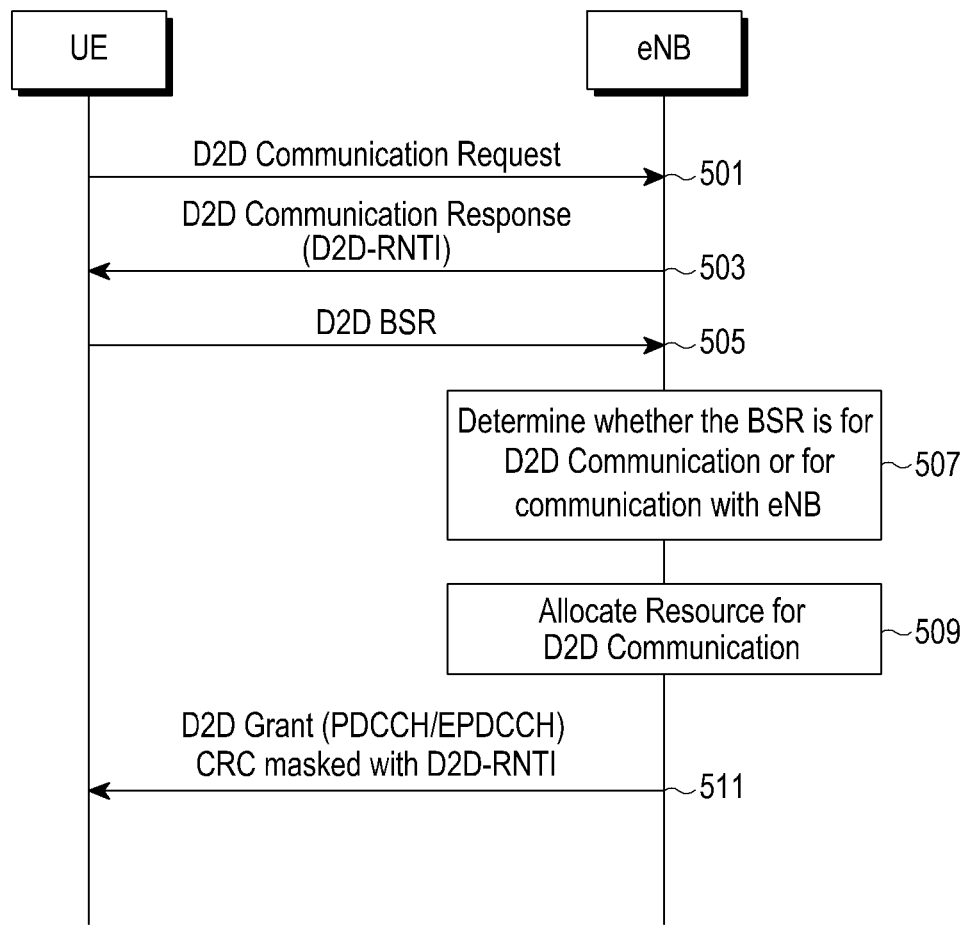
FIG. 5 illustrates a third method for allocating resources for D2D communication according to an embodiment of the present disclosure.

FIG. 5 illustrates a third method for allocating resources for D2D transmission according to an embodiment of the present disclosure.

Different C-RNTIs may be assigned to a UE for communication with an eNB and D2D communication. Therefore, the eNB uses the one or more C-RNTIs assigned for D2D communication on a control channel carrying resources for D2D communication and the one or more C-RNTIs assigned for communication between the UE and the eNB on a control channel carrying resources for communication between the UE and the eNB.

Referring to FIG. 5, a UE is in a connected state and assigned one or more C-RNTIs by an eNB for communication with eNB. If the UE wants to transmit a signal through a D2D communication link, the UE transmits a D2D communication request message (or a D2D communication interest indication message or UE assistance information message with D2D communication interest indication wherein the interest indication may indicate that UE is interested in D2D communication or it may indicate that UE is interested in transmission for D2D communication or it may indicate that UE is interested in reception for D2D communication or it may indicate that UE is interested in both transmission and reception for D2D communication) to the eNB in operation 501. The eNB assigns a D2D Radio Network Temporary Identifier (RNTI) (D2D-RNTI) to the UE in response to the D2D communication request message (or D2D communication interest indication message or UE assistance information message with D2D communication interest indication) in operation 503. In one embodiment the D2D communication response message in operation 503 may be a RRC connection reconfiguration message. If the UE wants to transmit control and/or data packets through a D2D communication link, the UE transmits a D2D BSR to the eNB in operation 505. The D2D BSR is different from a general BSR transmitted to the eNB for requesting a grant for communication between the UE and the eNB to the eNB.

An LCID distinguishes the D2D BSR from the general BSR. The LCID is reserved to indicate the D2D BSR. The LCID may be included in the D2D BSR. Alternatively or additionally, the LCID may be included in a MAC subheader which indicates a MAC control element having the D2D BSR in a MAC PDU. The D2D BSR may also include a destination ID. The destination ID is the ID of a destination to which the UE wants to transmit control and/or data packets through the D2D communication link. The destination ID may be a unicast address of another UE, group cast address of a group of UEs, or broadcast address. The D2D BSR may also include buffer size and logical channel group ID. Multiple logical channels are typically grouped together and buffer status of group of these logical channels is sent using one buffer status report.

If PUCCH resources are available for transmission of the D2D BSR, the resources for the D2D BSR may be obtained using a general method such as transmitting a scheduling request to the eNB. Alternately the resources for the D2D BSR may be obtained by transmitting a random access preamble to the eNB on an RACH. D2D BSR may also be sent in resources already allocated by eNB for UL transmission to eNB.

Upon receipt of the BSR, the eNB in operation 507 determines whether the BSR is for D2D communication or for UL transmission to eNB. This determination is done using the LCID. If the BSR is a D2D BSR the eNB allocates resources for D2D transmission in operation 509 and transmits a grant for D2D transmission on a PDCCH or EPDCCH in operation 511. A control information format carrying D2D resource information may be same or different from a control information format carrying resource information for transmission of a UE to an eNB. The CRC of PDCCH or EPDCCH carrying control information is masked with the D2D-RNTI.

If the UE transmits an SA for the D2D communication link in addition to a data packet, upon receipt of the D2D BSR, the eNB may allocate resources for transmission of both the SA and the data packet and may indicate the allocated resources using the same PDCCH or EPDCCH or different PDCCHs or EPDCCHs. Alternatively or additionally, upon receipt of the D2D BSR, the eNB may allocate resources for transmission of the SA only. The resources for the data packet may be fixed relative to the location of the SA and/or resources of the SA.

In an alternate embodiment of method illustrated in FIG. 5, instead of BSR, a D2D scheduling request can be transmitted on PUCCH wherein the PUCCH resources are reserved and/or assigned for D2D SR transmission. eNB determines that UE needs resources for D2D communication on receiving the D2D scheduling request in the PUCCH resources reserved and/or assigned to UE for D2D SR transmission.

In an alternate embodiment of method illustrated in FIG. 5, the D2D communication request in operation 501 may be indicated during connection setup. The D2D-RNTI may be assigned in addition to the C-RNTI during the connection setup. Alternately the UE does not indicate interest in D2D communication to eNB during connection setup. The eNB autonomously assigns the D2D-RNTI in addition to the C-RNTI during the connection setup if the UE is authorized to perform D2D communication. eNB determines that UE is authorized to perform D2D communication based on UE context received from MME during the connection setup procedure. Alternatively or additionally, the eNB may allocate the D2D-RNTI after receiving the D2D BSR.

A method for allocating resources for D2D reception in one embodiment is described below.

According to an embodiment of the present disclosure, a resource pool including Rx resources may be indicated to a D2D UE interested in D2D communication. The resource pool may be preconfigured in the D2D UE. The D2D UE may acquire the resource pool from a D2D server in the network. The eNB may broadcast the resource pool using system information. The resource pool may be signaled to the D2D UE by dedicated signaling. The resource pool for reception may include resources of a neighbor cell as well resources of a serving cell.

If the UE transmits an SA for the D2D communication link in addition to a data packet, the resource pool for reception includes resources for SA reception. The resources for the data packet are determined by monitoring the SA by the receiving UE. Alternatively or additionally, both an SA resource pool and a data resource pool may be indicated to the D2D UE.

Embodiment 2

In an embodiment of the present disclosure, control channel is transmitted to both transmitting UE and receiving UE to indicate resources for transmission and reception on D2D communication link. In this embodiment the transmitting UE and receiving UE may be connected to same eNB or different eNB. An eNB enables a UE to distinguish Tx resources from Rx resources using a Tx/Rx indicator along with resource information.

Different eNBs communicating with UEs coordinate with each other to determine resources for D2D communication between the UEs and signal the determined resources to the UEs. For example, if UE1 belonging to a first eNB (eNB1) communicates with UE2 belonging to a second eNB (eNB2) by D2D communication, eNB1 signals resources determined for the D2D communication between UE1 and UE2 to UE1 and eNB2 signals the resources determined for the D2D communication between UE1 and UE2 to UE2. The resources are determined for transmission of packets through a D2D communication link. The resources may also be allocated semi-statically such that the allocated resources are valid during a plurality of Transmission Time Intervals (TTIs). The resources may also be allocated statically such that the determined resources are valid for the duration of a connection between UE1 and UE2.

A method for signaling allocated resources is performed as follows.

An eNB transmits resources for D2D communication between a UE pair in a DL subframe and a control region in the DL subframe indicates the resources for D2D communication as well as resources for communication with the eNB. The resources for D2D communication are indicated to the UEs of the UE pair by their respective eNBs. That is, the eNB associated with each UE of the UE Pair transmits control channel carrying resource allocation information to the UE. A CRC of the control channel may be masked with a UE ID (example C-RNTI or D2D-RNTI) of the UE.

For example, if UE1 and UE2 belong to different eNBs, UE1 uses allocated resources for transmission, and UE2 uses the allocated resources for reception, eNB1 transmits a first PDCCH/EPDCCH (PDCCH1 or EPDCCH1) to UE1 and eNB2 transmits a second PDCCH/EPDCCH (PDCCH2 or EPDCCH2) to UE2 in order to indicate resources in which UE1 transmits data and UE2 receives data. The CRC of PDCCH1/EPDCCH1 transmitted by eNB1 is masked with a UE ID of UE1, and the CRC of PDCCH2/EPDCCH2 transmitted by eNB2 is masked with a UE ID of UE2. Both the PDCCHs/EPDCCHs may be transmitted in the same DL subframe or different DL subframes.

In another example, if UE1 and UE2 belong to same eNB1, UE1 uses allocated resources for transmission, and UE2 uses the allocated resources for reception, eNB1 transmits PDCCH1/EPDCCH1 to UE1 and PDCCH2/EPDCCH2 to UE2 in order to indicate the resources in which UE1 transmits and UE2 receives. The CRC of PDCCH1/EPDCCH1 is masked with the UE ID of UE1 and the CRC of PDCCH2/EPDCCH2 is masked with the UE ID of UE2. Both the PDCCHs/EPDCCHs may be transmitted in the same DL subframe or different DL subframes.

Resources for communication with eNB and resources for D2D communication indicated on control channel are distinguished by UE/eNB using the methods illustrated in FIG. 3, 4 and FIG. 5.

A method for identifying Tx resources from Rx resources by a UE will be described below.

Upon receipt of information about resources allocated for D2D communication, the UE needs to determine whether the allocated resources are for transmission or reception. An eNB adds a 1-bit Tx/Rx indicator in a control channel carrying the resource allocation information. If the Tx/Rx indicator is 1, this may mean Tx resources and if the Tx/Rx indicator is 0, this may mean Rx resources. Upon receipt of a control channel carrying resource allocation information with a UE ID of the UE (for example, a C-RNTI of the UE), if a Tx/Rx indicator is set to 0 in the received information, the UE receives data in resources indicated by the resource allocation information. If the Tx/Rx indicator is set to 1 in the received information, the UE transmits data in the indicated resources. The Tx/Rx indicator may be included as an information field in the control channel or may be included in a CRC mask used to generate a CRC for the control channel.

Now, a description will be given of a method for identifying a transmitting UE and a receiving UE using a Tx/Rx indicator and Tx and Rx indexes in the respective cases where a UE is allocated Rx resources and Tx resources.

First, a method for identifying a transmitting UE in the case where Rx resources are allocated to a UE will be described below.

Each UE may be connected to a plurality of UEs. In the case where Rx resources are allocated to the UE, the UE needs to determine from which UE it has to receive data using the allocated resources. To identify the transmitting UE, the UE may use an Rx index. For example, if UE1 is connected to UE2 and a third (UE3) for D2D communication and Rx resources are allocated to UE1, UE1 may receive data from UE2 and UE3. For a connection between UE1 and UE2, Rx index 0 may be assigned to UE1, and for a connection between UE1 and UE3, Rx index 1 may be assigned to UE1. If UE1 receives a control channel with its UE ID and a Tx/Rx indicator set to 0, UE1 receives data in resources indicated by the control channel. UE1 may identify a transmitting UE using an Rx index set in the control channel. The Rx index may be included as an information field in the control channel or may be included in a CRC mask. Additionally, the Rx index may be unique across a plurality of pairs of the UE and other UEs, and an Rx index assigned to each UE may be maintained for the UE independently.

Each UE may be connected to a plurality of UEs. In the case where Tx resources are allocated to the UE, the UE needs to determine to which UE it has to transmit data using the allocated resources. For this purpose, a Tx index (Tx- _Idx) may be used. For example, if UE1 is connected to UE2 and UE3 and Tx resources are allocated to UE1, UE1 may transmit data to UE2 and UE3. For a connection between UE1 and UE2, Tx_Idx 0 may be assigned to UE1, and for a connection between UE1 and UE3, Tx_Idx 1 may be assigned to UE1. If UE1 receives a control channel with its UE ID and a Tx/Rx indicator set to 1, UE1 transmits data in resources indicated by the control channel. UE1 may identify a receiving UE by a Tx index set in the control channel. The Tx index may be included as an information field in the control channel or may be included in a CRC mask. The Tx index may be unique across a plurality of pairs of the UE and other UEs, and a Tx index assigned to each UE may be maintained for the UE independently.

Figure 6:
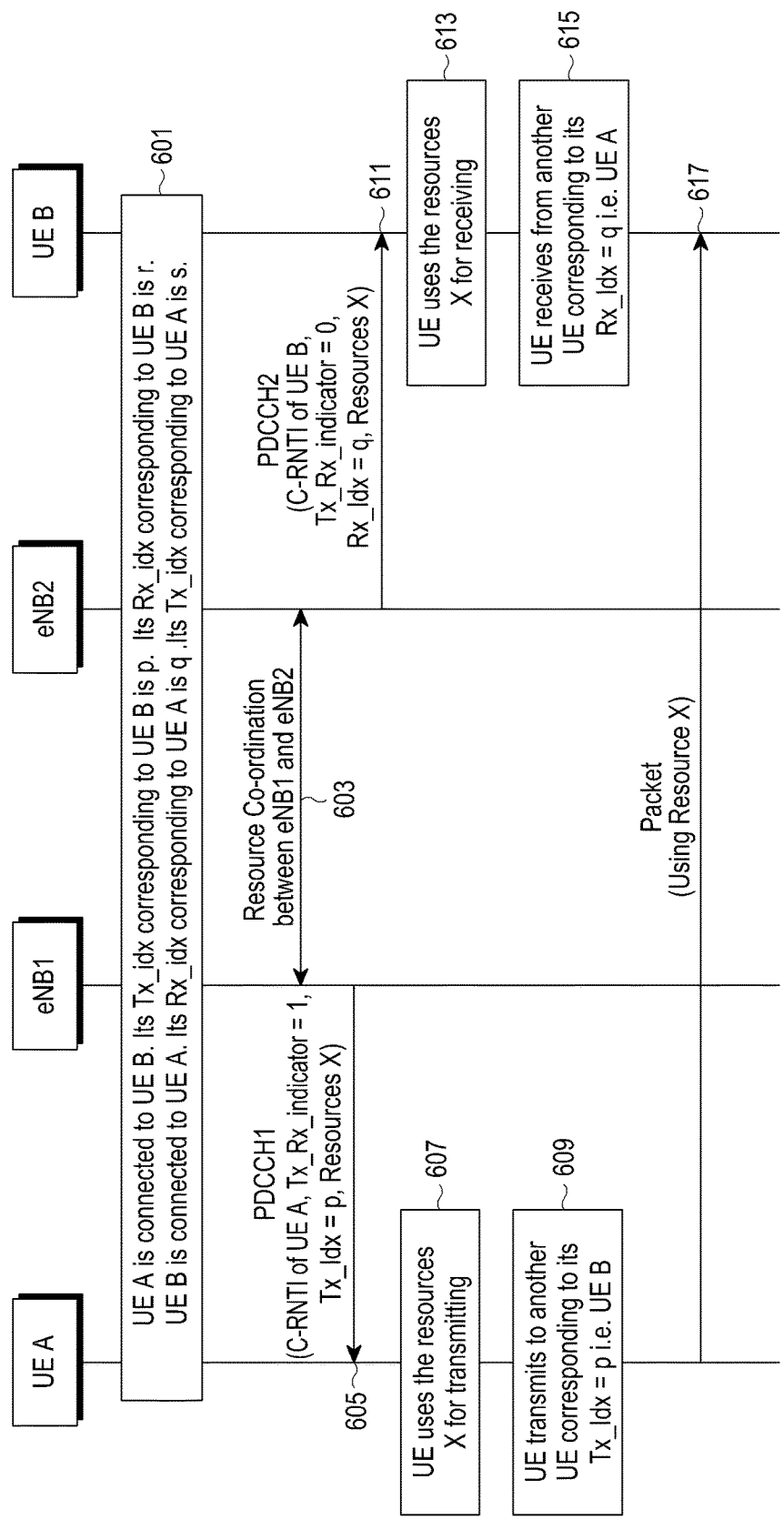
FIGS. 6 and 7 illustrate a method for allocating resources for D2D communication between cells according to an embodiment of the present disclosure.
Figure 7:
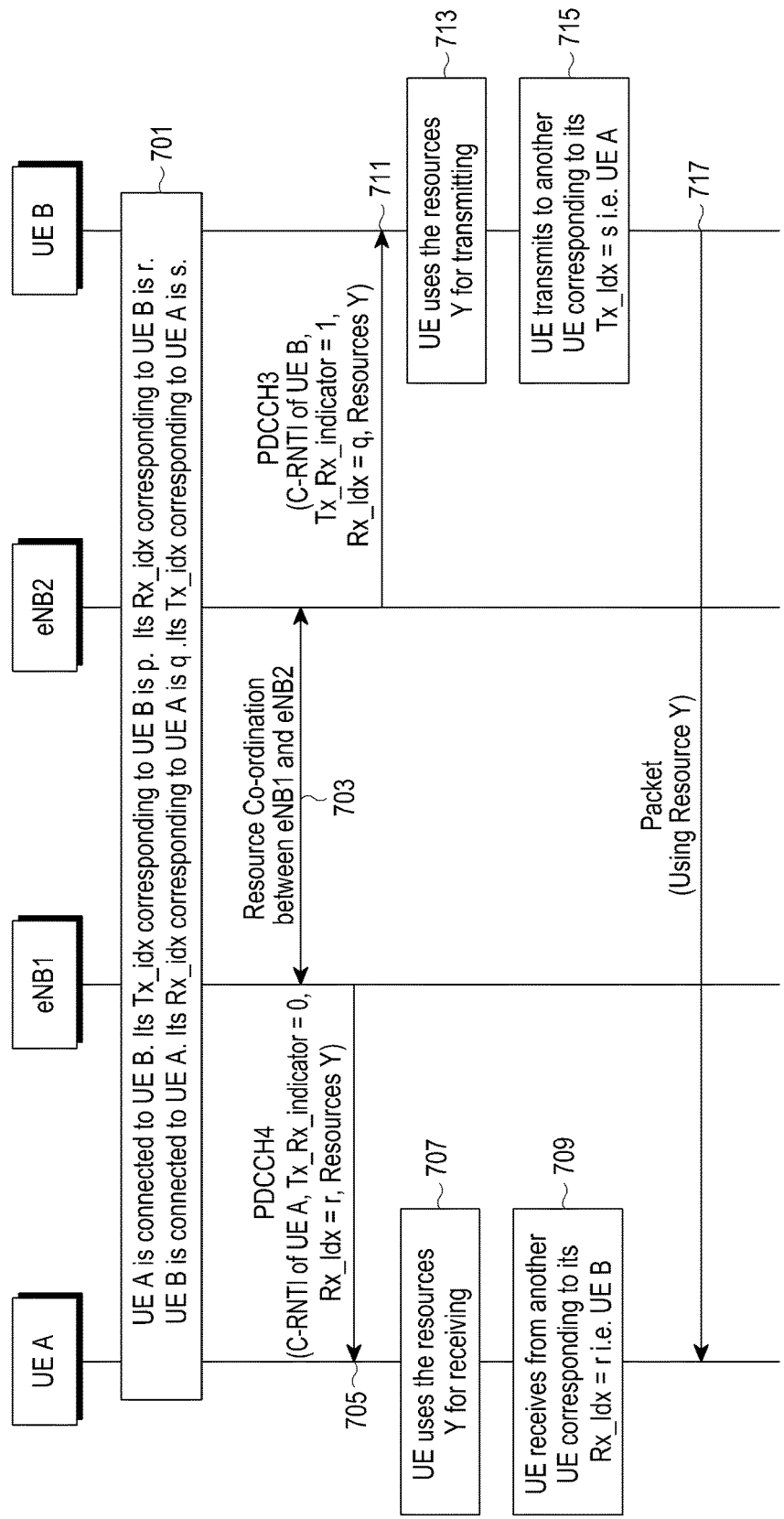

FIGS. 6 and 7 illustrate a method for allocating resources for D2D communication between cells according to an embodiment of the present disclosure. UE A operates as a transmitting UE and UE B operates as a receiving UE in FIG. 6, whereas UE A operates as a receiving UE and UE B operates as a transmitting UE in FIG. 7.

Referring to FIG. 6, during D2D connection setup, eNB1 assigns Tx_Idx p and Rx_Idx r to UE A, for communication with UE B in operation 601. During the D2D connection setup, eNB2 assigns Tx_Idx s and Rx_Idx q to UE B, for communication with UE A in operation 601. In operation 603, eNB1 and eNB2 determine resources for D2D communication between UE A and UE B by coordinating with each other. If eNB 1 and eNB2 determine to use resources X for data transmission from UE A to UE B, eNB1 transmits to UE A PDCCH1 having a CRC masked with a UE ID (for example C-RNTI) of UE A in operation 605. PDCCH1 delivers information about resources X for the D2D communication. UE A receives and decodes PDCCH1 using its UE ID. UE A then determines that it has to use the resources indicated by PDCCH1, for transmission of data to UE B, based on a Tx/Rx indicator and a Tx index. If the Tx/Rx indicator is set to 1, it indicates to UE A that resources X are allocated to UE A, for transmission in operation 607. If the Tx index is set to p, this indicates that UE A should transmit data to UE B corresponding to Tx index p in operation 609. Likewise, eNB2 transmits to UEB PDCCH2 having a CRC masked with a C-RNTI of UE B in operation 611. PDCCH2 delivers information about resources X for the D2D communication. UE B receives and decodes PDCCH2 using its C-RNTI. UE B determines that it has to use the resources indicated by PDCCH2, for reception of data from UE A, based on a Tx/Rx indicator and an Rx index. If the Tx/Rx indicator is set to 0, it indicates to UE B that resources X are allocated to UE B, for reception in operation 613. If the Rx index is set to q, this indicates that UE B should receive data from UE A corresponding to Rx index q in operation 615. UE A transmits a packet to UE B in resources X in operation 617.

Referring to FIG. 7, during D2D connection setup, eNB1 assigns Tx_Idx p and Rx_Idx r to UE A, for communication with UE B in operation 701. During the D2D connection setup, eNB2 assigns Tx_Idx s and Rx_Idx q to UE B, for communication with UE A in operation 701. In operation 703, eNB1 and eNB2 determine resources for D2D communication between UE A and UE B by coordinating with each other. If eNB1 and eNB2 determine to use resources Y for data transmission from UE B to UE A, eNB1 transmits to UE A PDCCH3 having a CRC masked with the C-RNTI of UE A in operation 705. PDCCH3 delivers information about resources Y for the D2D communication. UE A receives and decodes PDCCH3 using its C-RNTI. UE A determines that it has to use the resources indicated by PDCCH3, for reception of data from UE B, based on a Tx/Rx indicator and an Rx index. If the Tx/Rx indicator is set to 0, it indicates to UE A that resources Y are allocated to UE A, for reception in operation 707. If the Rx index is set to r, this indicates that UE A should receive data from UE B corresponding to Rx index r in operation 709. Likewise, eNB2 transmits to UE B PDCCH4 having a CRC masked with the UE ID (for example C-RNTI) of UE B in operation 711. PDCCH4 delivers information about resources Y for the D2D communication. UE B receives and decodes PDCCH4 using its UE ID. UE B determines that it has to use the resources indicated by PDCCH4, for transmission of data to UE A, based on a Tx/Rx indicator and a Tx index. If the Tx/Rx indicator is set to 1, it indicates to UE B that resources Y are allocated to UE B, for transmission in operation 713. If the Tx index is set to s, this indicates that UE B should transmit data to UE A corresponding to Tx index s in operation 715. UE B transmits a packet to UE A in resources Y in operation 717.

Figure 8:
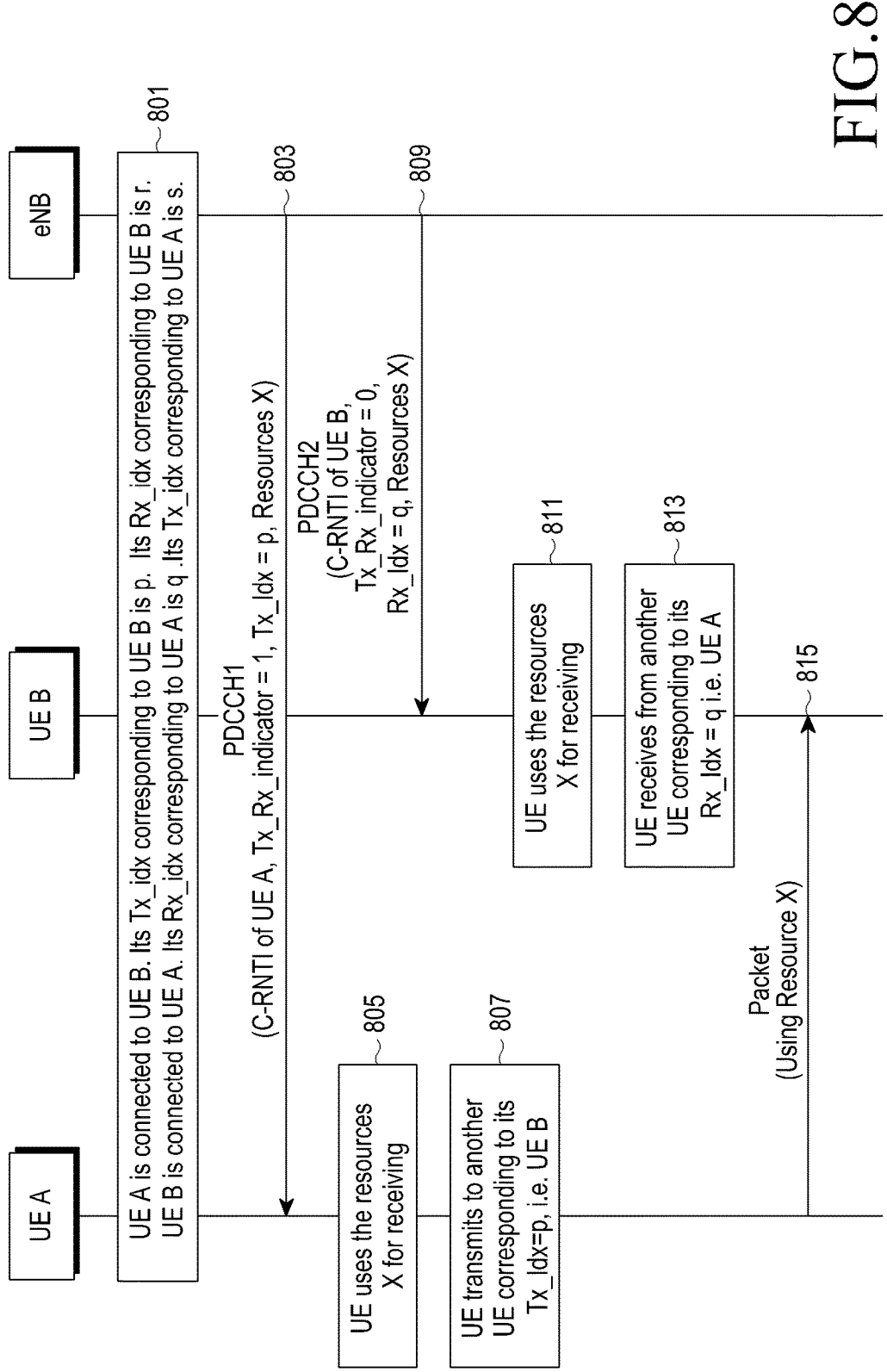
FIGS. 8 and 9 illustrate a method for allocating resources for D2D communication within a cell according to an embodiment of the present disclosure.
Figure 9:
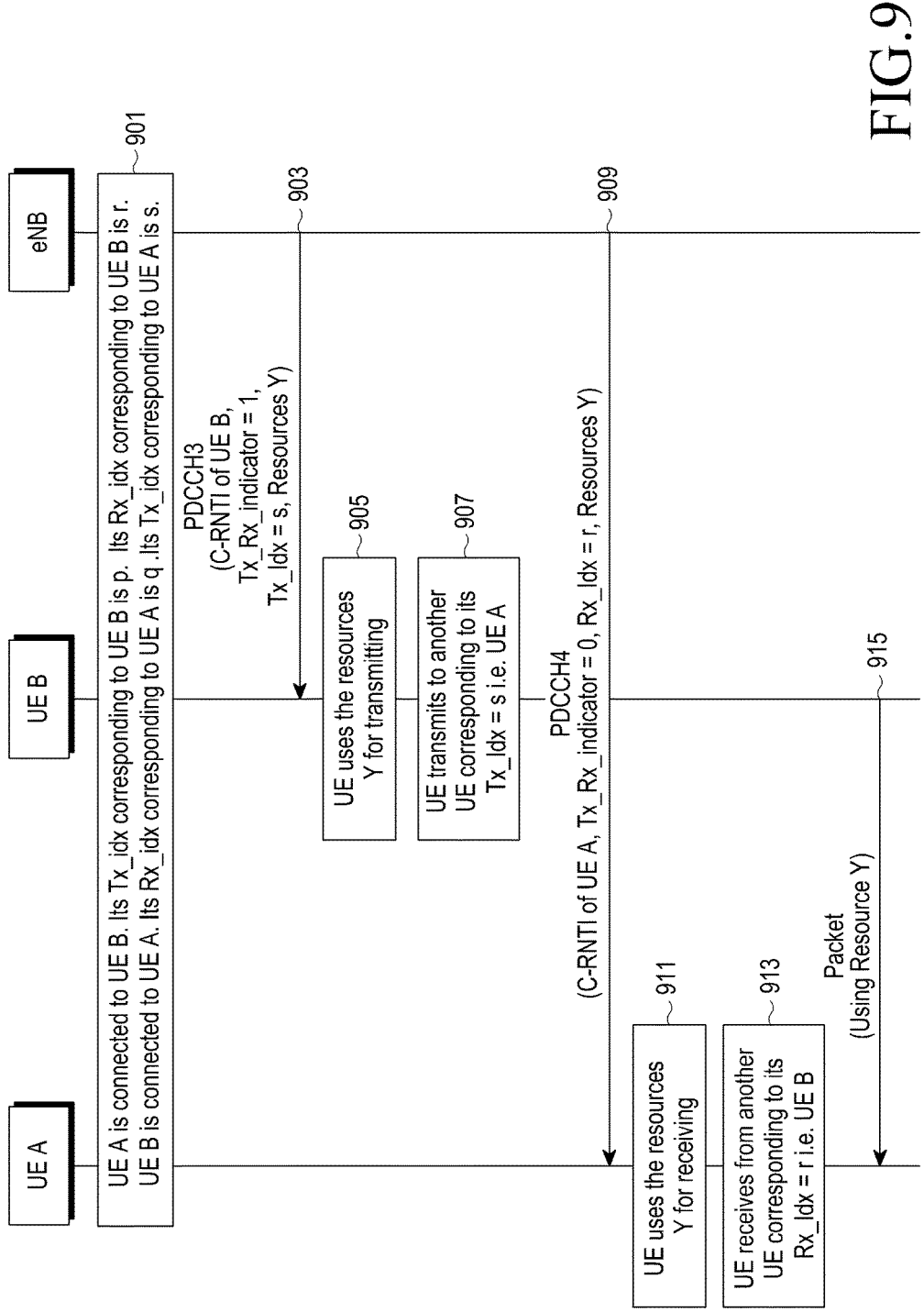

FIGS. 8 and 9 illustrate a method for allocating resources for D2D communication within a cell according to an embodiment of the present disclosure. UE A operates as a transmitting UE and UE B operates as a receiving UE in FIG. 8, whereas UE A operates as a receiving UE and UE B operates as a transmitting UE in FIG. 9.

Referring to FIG. 8, both UE A and UE B communicate with the same eNB. During D2D connection setup, eNB1 assigns Tx_Idx p and Rx_Idx r to UE A, for communication with UE B and assigns Tx_Idx s and Rx_Idx q to UE B, for communication with UE A in operation 801. eNB1 determines resources for D2D communication between UE A and UE B. If eNB1 determines to use resources X for data transmission from UE A to UE B, eNB1 transmits PDCCH1 having a CRC masked with the UE ID (for example C-RNTI) of UE A to UE A in operation 803. PDCCH1 delivers information about resources X for the D2D communication. UE A receives and decodes PDCCH1 using its UE ID. UE A determines that it has to use the resources indicated by PDCCH1, for transmission of data to UE B, based on a Tx/Rx indicator and a Tx index. If the Tx/Rx indicator is set to 1, it indicates to UE A that resources X are allocated to UE A, for transmission in operation 805. If the Tx index is set to p, this indicates that UE A should transmit data to UE B corresponding to Tx index p in operation 807. eNB1 also transmits PDCCH2 having a CRC masked with the UE ID of UE B to UE B in operation 809. PDCCH2 delivers information about resources X for the D2D communication. UE B receives and decodes PDCCH2 using its UE ID. UE B determines that it has to use the resources indicated by PDCCH2, for reception of data from UE A, based on a Tx/Rx indicator and an Rx index. If the Tx/Rx indicator is set to 0, it indicates to UE B that resources X are allocated to UE B, for reception in operation 811. If the Rx index is set to q, this indicates that UE B should receive data from UE A corresponding to Rx index q in operation 813. UE A transmits a packet to UE B in resources X in operation 815. In FIG. 8, the order of operations 803 to 807 and operations 809 to 813 may be changed.

Referring to FIG. 9, during D2D connection setup, eNB1 assigns Tx_Idx p and Rx_Idx=r to UE A, for communication with UE B and assigns Tx_Idx s and Rx_Idx q to UE B, for communication with UE A in operation 901. eNB1 determines resources for D2D communication between UE A and UE B. If eNB1 determines to use resources Y for data transmission from UE B to UE A, eNB1 transmits to UE B PDCCH3 having a CRC masked with the UE ID of UE B in operation 903. PDCCH3 delivers information about resources Y for the D2D communication. UE B receives and decodes PDCCH3 using its UE ID. UE B determines that it has to use the resources indicated by PDCCH3, for transmission of data to UE A, based on a Tx/Rx indicator and a Tx index. If the Tx/Rx indicator is set to 1, it indicates to UE B that resources Y are allocated to UE B, for transmission in operation 905. If the Tx index is set to s, this indicates that UE B should transmit data to UE A corresponding to Tx index s in operation 907. Likewise, eNB1 transmits to UE A PDCCH4 having a CRC masked with the UE ID of UE A in operation 909. PDCCH4 delivers information about resources Y for the D2D communication. UE A receives and decodes PDCCH4 using its UE ID. UE A determines that it has to use the resources indicated by PDCCH4, for reception of data from UE B, based on a Tx/Rx indicator and an Rx index. If the Tx/Rx indicator is set to 0, it indicates to UE A that resources Y are allocated to UE A, for reception in operation 911. If the Rx index is set to r, this indicates that UE A should receive data from UE B corresponding to Rx index r in operation 913. UE B transmits a packet to UE A in resources Y in operation 915. In FIG. 9, the order of operations 903 to 907 and operations 909 to 913 may be changed.

Figure 10:
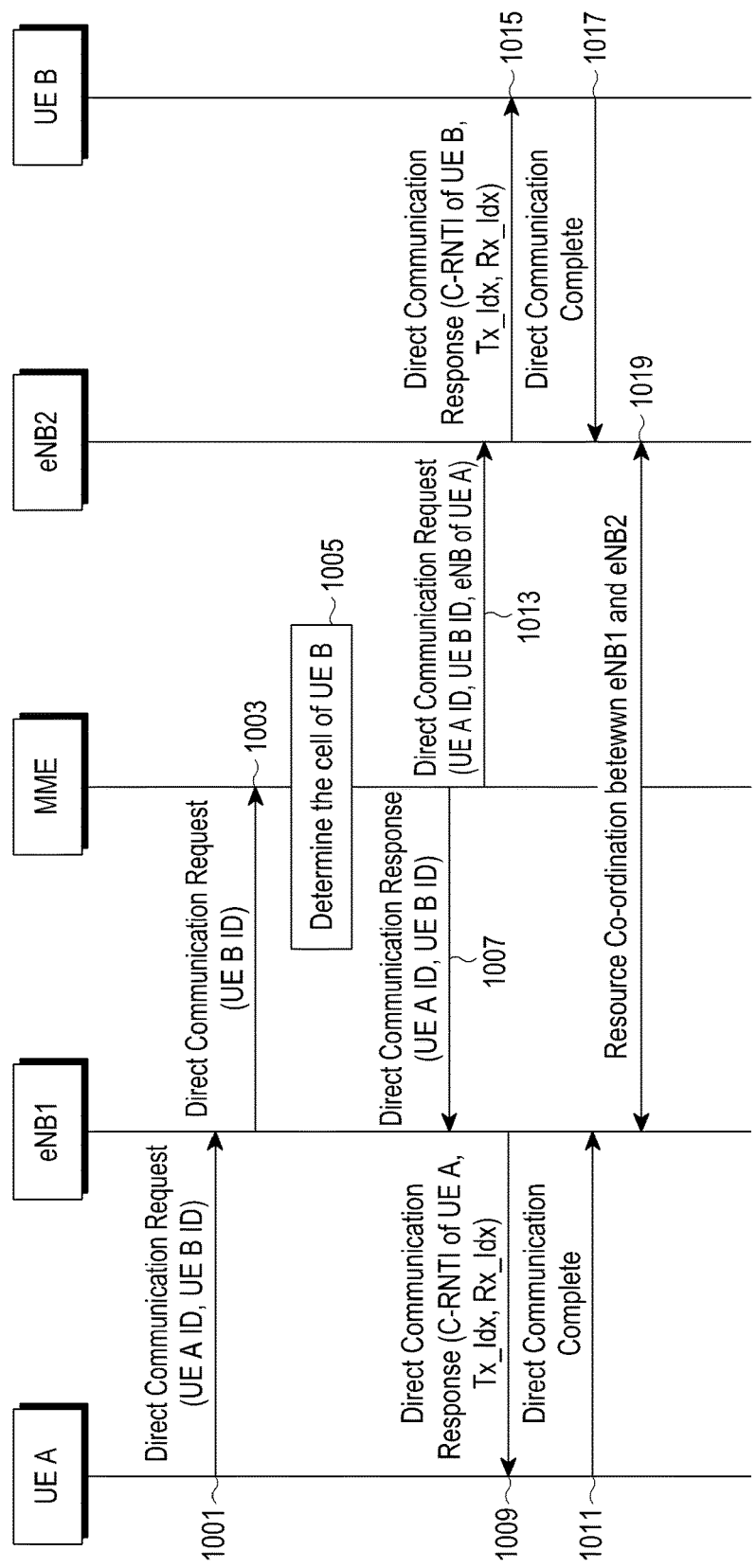
FIG. 10 illustrates a method for allocating a transmission index and a reception index in allocating resources for D2D communication between cells according to an embodiment of the present disclosure.

FIG. 10 illustrates a method for allocating a Tx index and an Rx index in allocating resources for D2D communication between cells according to an embodiment of the present disclosure.

Referring to FIG. 10, UE A has discovered UE B. When UE A wants to establish a D2D connection with UE B, UE A triggers direct connection setup and UE A transmits a direct communication request message to eNB1 in operation 1001. The direct communication request includes a UE ID of UE A and a UE ID of UE B. According to an embodiment, the UE ID of each UE may be an ID assigned to the UE for Proximity Service (ProSe) communication (that is, a ProSe UE ID). Or the UE ID may be an idle mode ID assigned to the UE (that is, an SAE Temporary Mobile Subscriber Identity (S-TMSI)). Or the UE ID may be a Globally Unique Temporary Identifier (GUTI) assigned to the UE. UE A may discover the UE ID of UE B during the discovery of UE B.

Upon receipt of the direct communication request message from UE A, eNB1 verifies the direct communication request message and transmits a direct communication request message including the UE ID of UE B to a Mobility Management Entity (MME) in operation 1003. The MME determines a cell or eNB of UE B in operation 1005. In the case where eNB1 and the eNB of UE B are under the same MME, if UE B is in idle mode, the MME pages UE B so that UE B may transition to connected mode. In the case where eNB1 and the eNB of the UE B are under different MMEs, the MME contacts the MME of UE B in order to determine the cell of UE B. When determining the cell of UE B, the MME transmits a direct communication response message to eNB1 in operation 1007. The direct communication response message includes information about the cell or eNB of UE B. eNB1 assigns a Tx index and an Rx index to UE A and transmits the assigned Tx and Rx indexes of UE A and the C-RNTI of UE A in a direct communication response message to UE A in operation 1009. Only if the C-RNTI is newly assigned to UE A, eNB1 may include the C-RNTI of UE A. If a C-RNTI has not been assigned to UE A yet, eNB1 may assign the C-RNTI to UE A. Further, eNB1 may transmit other parameters related to direct communication in the direct communication response message to UE A. Upon receipt of the direct communication response message, UE A transmits a direct communication complete message to eNB1 in operation 1011.

Upon receipt of the direct communication request message from eNB1 or another MME, the MME transmits a direct communication request message to eNB2 of UE B indicated by the received direct communication request message in operation 1013. It is assumed in FIG. 10 that UE A and UE B are under the same MME. The direct communication request message includes the UE ID of UE A, the UE ID of UE B, and information about the cell or eNB of UE A. Upon receipt of the direct communication request message, eNB2 assigns a Tx index and an Rx index to UE B and transmits the assigned Tx and Rx indexes of UE B and the C-RNTI of UE B in a direct communication response message to UE B in operation 1015. eNB2 may include the C-RNTI of UE B only if the C-RNTI is newly assigned to UE B. If a C-RNTI has not been assigned to UE B yet, eNB2 assigns the C-RNTI to UE B. Further, eNB2 may transmit other parameters related to direct communication in the direct communication response message. Upon receipt of the direct communication response message, UE B transmits a direct communication complete message to eNB2 in operation 1017. eNB1 and eNB2 determine resources for D2D communication in operation 1019 in substantially the same manner as in operation 603 of FIG. 6 and operation 703 of FIG. 7.

A UE may maintain its Tx index and Rx index. That is, the UE may assign a Tx index and an Rx index for its connection to another UE and transmit information about the assigned Tx and Rx indexes to an eNB during direct connection setup. The eNB stores the information and uses it for transmitting a PDCCH to the UE. The Tx and Rx indexes maintained by the UE may be transmitted to the eNB in a direct communication request message or a direct communication complete message. The property of a Tx index and an Rx index is the same irrespective of whether they are assigned by the eNB or the UE. If the eNB allocates a Tx index and an Rx index, the eNB should maintain information about the Tx index and the Rx index. If the UE allocates a Tx index and an Rx index, the UE should maintain information about the Tx index and the Rx index, thereby reducing the load of the eNB.

Figure 11:
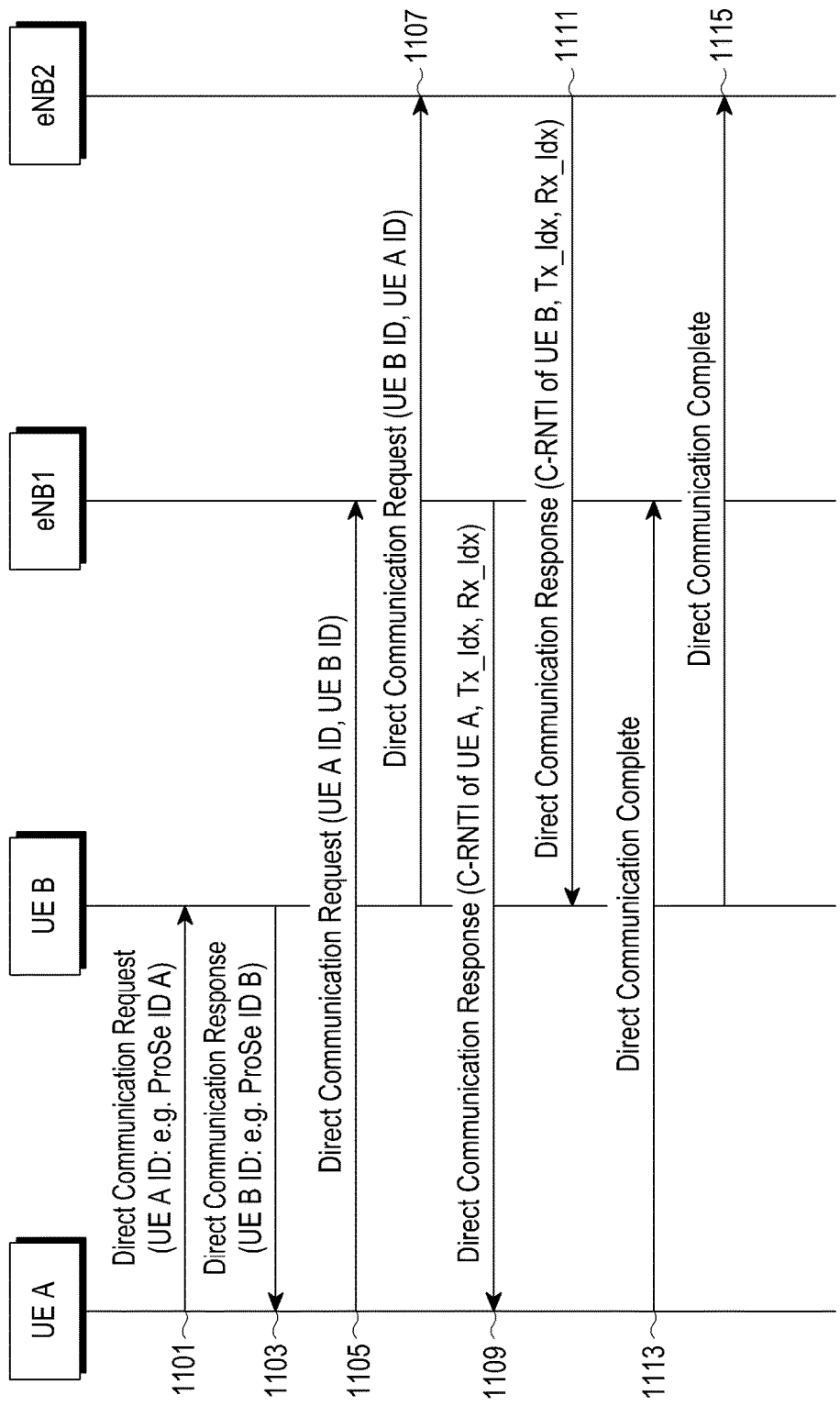
FIG. 11 illustrates another method for allocating a transmission index and a reception index in allocating resources for D2D communication between cells according to an embodiment of the present disclosure.

FIG. 11 illustrates another method for allocating a Tx index and an Rx index in allocating resources for D2D communication between cells according to an embodiment of the present disclosure.

Referring to FIG. 11, UE A initiates direct communication setup with UE B and transmits a direct communication request message including its UE ID to UE B in operation 1101. According to an embodiment, the UE ID may be an ID assigned to UE A for ProSe communication (that is, a ProSe UE ID). Or the UE ID may be an idle mode ID assigned to UE A (that is, an S-TMSI). Or the UE ID may be a GUTI assigned to UE A. If UE B accepts the direct communication request from UE A, UE B transmits a direct communication response message including its UE ID to UE A in operation 1103. UE A and UE B transmit direct communication request messages to eNB1 and eNB2 respectively in operations 1105 and 1107. UE A and UE B include their UE IDs in the direct communication request messages. The order of operations 1105 and 1107 may be changed.

Upon receipt of the direct communication request message from UE A, eNB1 verifies the direct connection request message, assigns a Tx index and an Rx index to UE A, and transmits the assigned Tx index and Rx index and the C-RNTI of UE A in a direct communication response message to UE A in operation 1109. Only if the C-RNTI is newly assigned to UE A, the C-RNTI of UE A may be included. If a C-RNTI has not been assigned to UE A yet, eNB1 assigns a C-RNTI to UE A. eNB1 may transmit other parameters related to direct communication in the direct communication response message to UE A. Upon receipt of the direct communication response message from eNB1, UE A transmits a direct communication complete message to eNB1 in operation 1113.

Likewise, upon receipt of the direct communication request message from UE B, eNB2 verifies the direct connection request message, assigns a Tx index and an Rx index to UE B, and transmits the assigned Tx index and Rx index and the C-RNTI of UE B in a direct communication response message to UE B in operation 1111. Only if the C-RNTI is newly assigned to UE B, the C-RNTI of UE B may be included. If a C-RNTI has not been assigned to UE B yet, eNB2 assigns the C-RNTI to UE B. eNB2 may transmit other parameters related to direct communication in the direct communication response message to UE B. Upon receipt of the direct communication response message from eNB2, UE B transmits a direct communication complete message to eNB2 in operation 1115. UE A and UE B operate for D2D communication.

Upon receipt of the direct communication request message from UE A, eNB1 determines the cell or eNB of UE B through the MME, as described with reference to FIG. 10. Upon receipt of the direct communication request message from UE B, eNB2 performs the same operation. eNB1 and eNB2 determine resources for D2D communication in operation 1019 as in operation 603 of FIG. 6 and operation 703 of FIG. 7.

A UE may maintain a Tx index and an Rx index. That is, the UE may assign a Tx index and an Rx index for its connection with another UE and transmit information about the assigned Tx index and Rx index to an eNB during direct connection setup. The eNB stores the information and uses it for transmitting a PDCCH to the UE. The Tx index and Rx index managed by the UE may be transmitted in a direct communication request message or a direct communication complete message to the eNB. The property of a Tx index and an Rx index is the same irrespective of whether they are assigned by the eNB or the UE. If the eNB assigns a Tx index and an Rx index, the eNB should maintain the Tx index and the Rx index. If the UE assigns a Tx index and an Rx index, the UE should maintain the Tx index and the Rx index, thereby reducing the load of the eNB.

Figure 12:
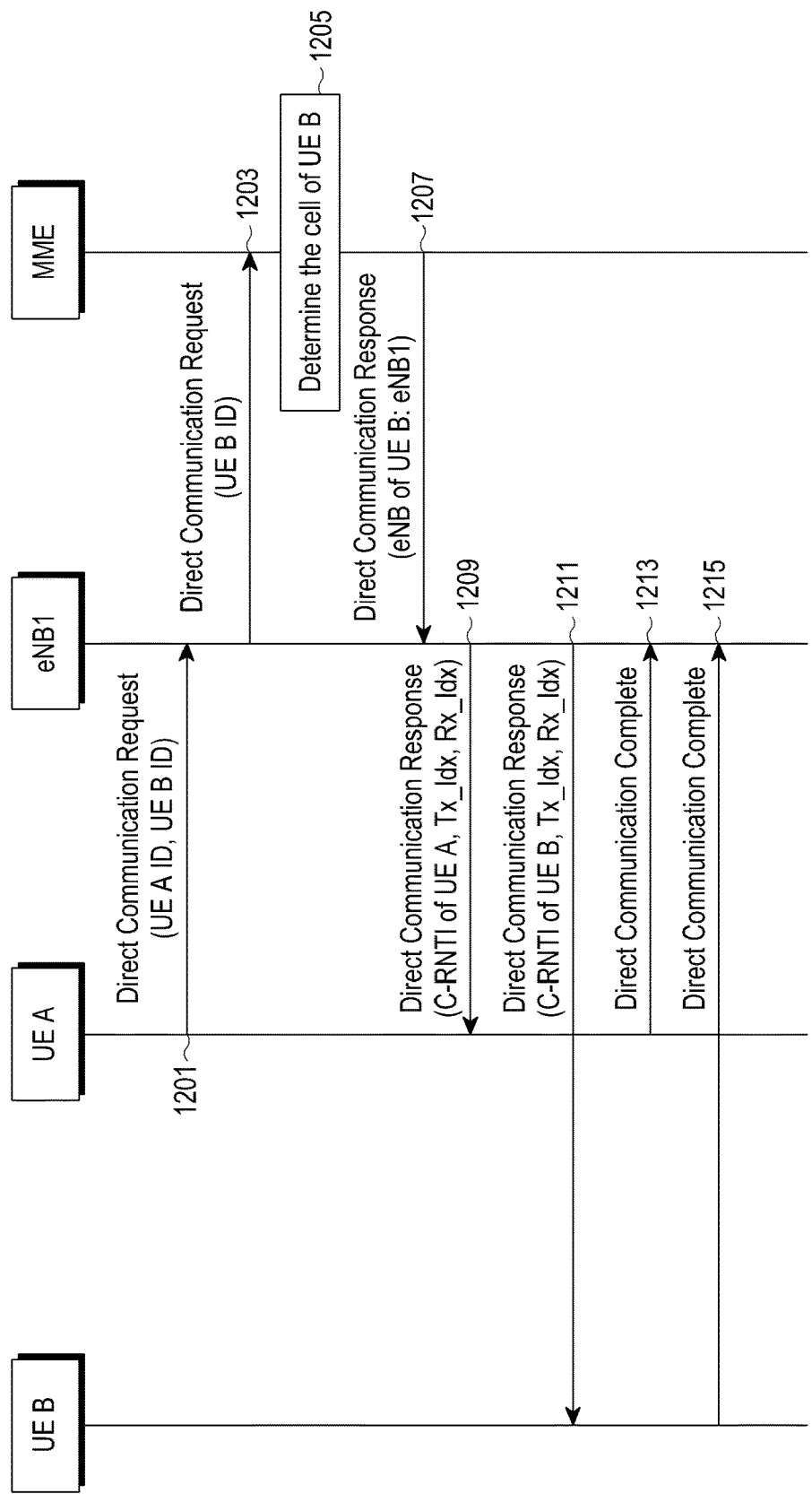
FIG. 12 illustrates a method for allocating a transmission index and a reception index in allocating resources for D2D communication within a cell according to an embodiment of the present disclosure.

FIG. 12 illustrates a method for allocating a Tx index and an Rx index in allocating resources for D2D communication within a cell according to an embodiment of the present disclosure.

Referring to FIG. 12, UE A has discovered UE B. When UE A wants to establish a D2D connection with UE B, UE A triggers direct connection setup and transmits a direct communication request message to eNB1 in operation 1201. The direct communication request message includes the UE ID of UE A and the UE ID of UE B. According to an embodiment, the UE ID of each UE may be an ID assigned to the UE for ProSe communication (that is, a ProSe UE ID). Or the UE ID may be an idle mode ID assigned to the UE (that is, an S-TMSI). Or the UE ID may be a GUTI assigned to the UE. UE A may discover the UE ID of UE B during the discovery of UE B.

Upon receipt of the direct communication request message from UE A, eNB1 verifies the direct communication request message and transmits a direct communication request message including the UE ID of UE B to the MME in operation 1203. The MME determines the cell or eNB of UE B in operation 1205. In the case where eNB1 and the eNB of UE B are under the same MME, if UE B is in idle mode, the MME pages UE B so that UE B may transition to connected mode. In the case where eNB1 and the eNB of the UE B are under different MMEs, the MME contacts the MME of UE B in order to determine the cell of UE B. When determining the cell of UE B, the MME transmits a direct communication response message to eNB1 in operation 1207. The direct communication response message includes information about the cell or eNB of UE B. eNB1 assigns a Tx index and an Rx index to UE A and transmits the assigned Tx index and Rx index of UE A and the C-RNTI of UE A in a direct communication response message to UE A in operation 1209. Only if the C-RNTI is newly assigned to UE A, eNB1 may include the C-RNTI of UE A. If a C-RNTI has not been assigned to UE A yet, eNB1 may assign the C-RNTI to UE A. Further, eNB1 may transmit other parameters related to direct communication in the direct communication response message to UE A. Upon receipt of the direct communication response message, UE A transmits a direct communication complete message to eNB1 in operation 1213.

Upon receipt of the direct communication response message including information about the cell or eNB of UE B from the MME in operation 1207, eNB1 assigns a Tx index and an Rx index to UE B and transmits the assigned Tx index and Rx index of UE B and the C-RNTI of UE B in a direct communication response message to UE B in operation 1211. Only if the C-RNTI is newly assigned to UE B, eNB1 may include the C-RNTI of UE B. If a C-RNTI has not been assigned to UE B yet, eNB1 may assign a C-RNTI to UE B. Further, eNB1 may transmit other parameters related to direct communication in the direct communication response message to UE B. Upon receipt of the direct communication response message, UE B transmits a direct communication complete message to eNB1 in operation 1215.

A UE may maintain a Tx index and an Rx index. That is, the UE may assign a Tx index and an Rx index for its connection to another UE and transmit information about the assigned Tx index and Rx index to an eNB during direct connection setup. The eNB stores the information and uses it for transmitting a PDCCH to the UE. The Tx index and Rx index managed by the UE may be transmitted in a direct communication request message or a direct communication complete message to the eNB. The property of a Tx index and an Rx index is the same irrespective of whether they are assigned by the eNB or the UE. If the eNB assigns a Tx index and an Rx index, the eNB should maintain the Tx index and the Rx index. If the UE assigns a Tx index and an Rx index, the UE should maintain the Tx index and the Rx index, thereby reducing the load of the eNB.

Figure 13:
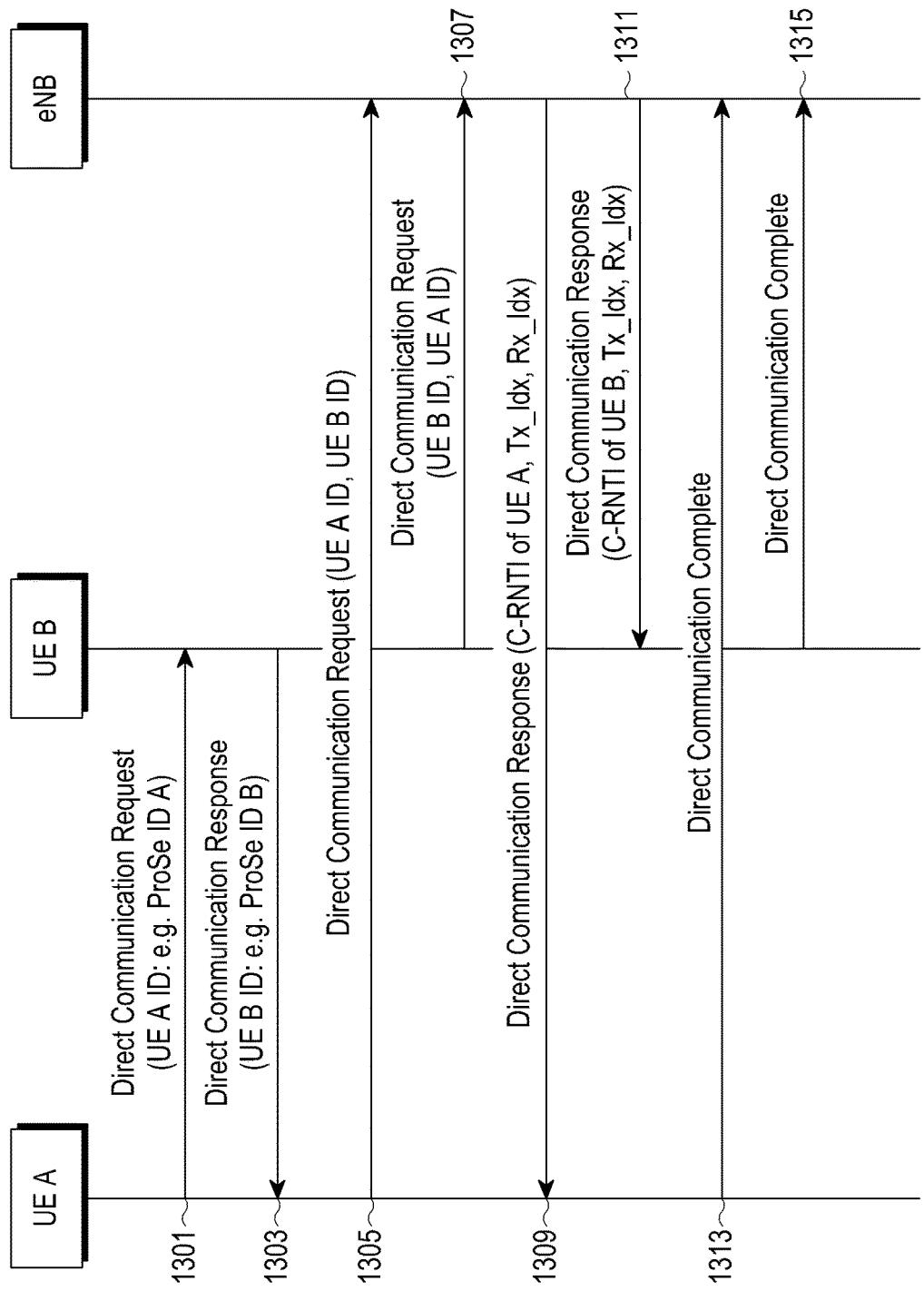
FIG. 13 illustrates another method for allocating a transmission index and a reception index in allocating resources for D2D communication within a cell according to an embodiment of the present disclosure.

FIG. 13 illustrates another method for allocating a transmission index and a reception index in allocating resources for D2D communication within a cell according to an embodiment of the present disclosure.

Referring to FIG. 13, UE A has discovered UE B. When UE A wants to establish a D2D connection with UE B, UE A triggers direct connection setup and transmits a direct communication request message including its UE ID to UE B in operation 1301. According to an embodiment, the UE ID may be an ID assigned to the UE for ProSe communication (that is, a ProSe UE ID). Or the UE ID may be an idle mode ID assigned to the UE (that is, an S-TMSI). Or the UE ID may be a GUTI assigned to the UE. If UE B accepts the direct communication request from UE A, UE B transmits a direct communication response message including its UE ID to UE A in operation 1303. UE A and UE B transmit direct communication request messages respectively to an eNB in operations 1305 and 1307. The direct communication request messages may include the UE IDs of UE A and UE B. The order of operations 1305 and 107 may be changed. Upon receipt of the direct communication request message from UE A, the eNB verifies the direct communication request message, assigns a Tx index and an Rx index to UE A, and transmits the assigned Tx index and Rx index of UE A and the C-RNTI of UE A in a direct communication response message to UE A in operation 1309. Only if the C-RNTI is newly assigned to UE A, the eNB may include the C-RNTI of UE A. If a C-RNTI has not been assigned to UE A yet, the eNB may assign the C-RNTI to UE A. Further, the eNB may transmit other parameters related to direct communication in the direct communication response message to UE A. Upon receipt of the direct communication response message, UE A transmits a direct communication complete message to the eNB in operation 1313.

Likewise, upon receipt of the direct communication request message from UE B, the eNB verifies the direct communication request message, assigns a Tx index and an Rx index to UE B, and transmits the assigned Tx index and Rx index of UE B and the C-RNTI of UE B in a direct communication response message to UE B in operation 1311. Only if the C-RNTI is newly assigned to UE B, the eNB may include the C-RNTI of UE B. If a C-RNTI has not been assigned to UE B yet, the eNB may assign the C-RNTI to UE B. Further, the eNB may transmit other parameters related to direct communication in the direct communication response message to UE B. Upon receipt of the direct communication response message, UE B transmits a direct communication complete message to the eNB in operation 1315. UE A and UE B operate for D2D communication.

A UE may maintain a Tx index and an Rx index. That is, the UE may assign a Tx index and an Rx index for its connection to another UE and transmit information about the assigned Tx index and Rx index to an eNB during direct connection setup. The eNB stores the information and uses it for transmitting a PDCCH to the UE. The Tx index and the Rx index managed by the UE may be transmitted in a direct communication request message or a direct communication complete message to the eNB. The property of a Tx index and an Rx index are same irrespective of whether they are assigned by the eNB or the UE. If the eNB assigns a Tx index and an Rx index, the eNB should maintain the Tx index and the Rx index. If the UE assigns a Tx index and an Rx index, the UE should maintain the Tx index and the Rx index, thereby reducing the load of the eNB.

A method for using a connection index instead of a Tx index and an Rx index to identify a transmitting UE and a receiving UE in the respective cases where a UE is allocated Tx resources and Rx resources respectively will be described below.

A connection index is assigned to each UE at the time of direct connection setup and is unique across a plurality of connections of the UE with other UEs. The connection index is maintained for each UE independently. The connection index of a UE identifies a transmitting UE or a receiving UE from among a plurality of UEs. If UE1 is connected to UE2 and UE3, connection index 0 may be assigned to UE1 for the connection between UE1 and UE2, and connection index 1 may be assigned to UE1 for the connection between UE1 and UE3.

Each UE may be connected to a plurality of UEs. In the case where Rx resources are allocated to the UE, the UE needs to determine from which UE it has to receive data in the allocated resources. For this purpose, the UE may use a connection index. For example, if UE1 is connected to UE2 and UE3 and Rx resources are allocated to UE1, UE1 may receive data from UE2 and UE3. Connection index 0 may be assigned to UE 1 for the connection between UE1 and UE2 and connection index 1 for the connection between UE1 and UE3. UE1 receives a control channel with its C-RNTI. If a Tx/Rx indicator is set to 0, UE1 receives data in resources indicated by the control channel. Also, UE1 may identify a transmitting UE using a connection index included in the control channel. The connection index may be included as an information field in the control channel or may be included in a CRC mask of the control channel.

In the case where a UE is connected to a plurality of UEs and Tx resources are allocated to the UE, the UE needs to determine to which UE it has to transmit in the allocated resources. For this purpose, the UE may use a connection index. For example, if UE1 is connected to UE2 and UE3 and Tx resources are allocated to UE1, UE1 may transmit data to UE2 and UE3. Connection index 0 may be assigned to UE 1 for the connection between UE1 and UE2 and connection index 1 for the connection between UE1 and UE3. UE1 receives a control channel with its C-RNTI. If a Tx/Rx indicator is set to 1, UE1 transmits data in resources indicated by the control channel. Also, UE1 may identify a receiving UE using a connection index included in the control channel. The connection index may be included as an information field in the control channel or may be included in a CRC mask of the control channel.

A UE may maintain a connection index. That is, the UE may assign a connection index for its connection with another UE and transmit information about the connection index to an eNB during direct connection setup. The eNB stores this information and uses it for transmitting a PDCCH to the UE. The connection index managed by the UE may be transmitted to the eNB in a direct communication request message or a direct communication complete message. The property of a connection index is the same irrespective of whether it is assigned by the eNB or the UE. If the eNB assigns a connection index, the eNB should maintain the connection index. If the UE assigns a connection index, the UE should maintain the connection index, thereby reducing the load of the eNB.

A connection index is allocated in the same manner illustrated in FIGS. 6 to 13, except that the connection index is used instead of a Tx index and an Rx index in the embodiment of the present disclosure.

Figure 14:
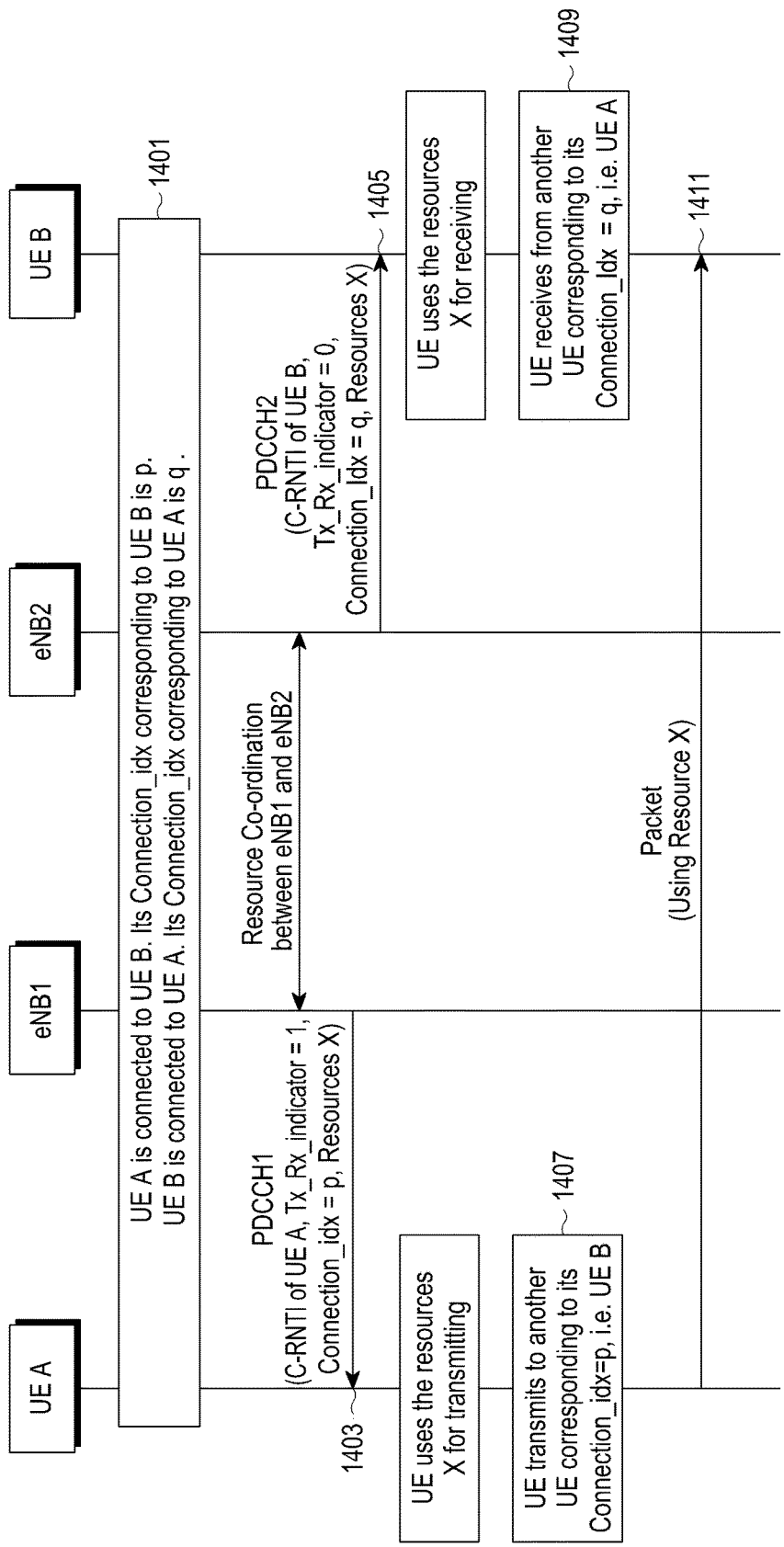
FIGS. 14 and 15 are diagrams illustrating signal flows for allocating a connection index instead of a Tx index or an Rx index for D2D communication according to an embodiment of the present disclosure.
Figure 15:
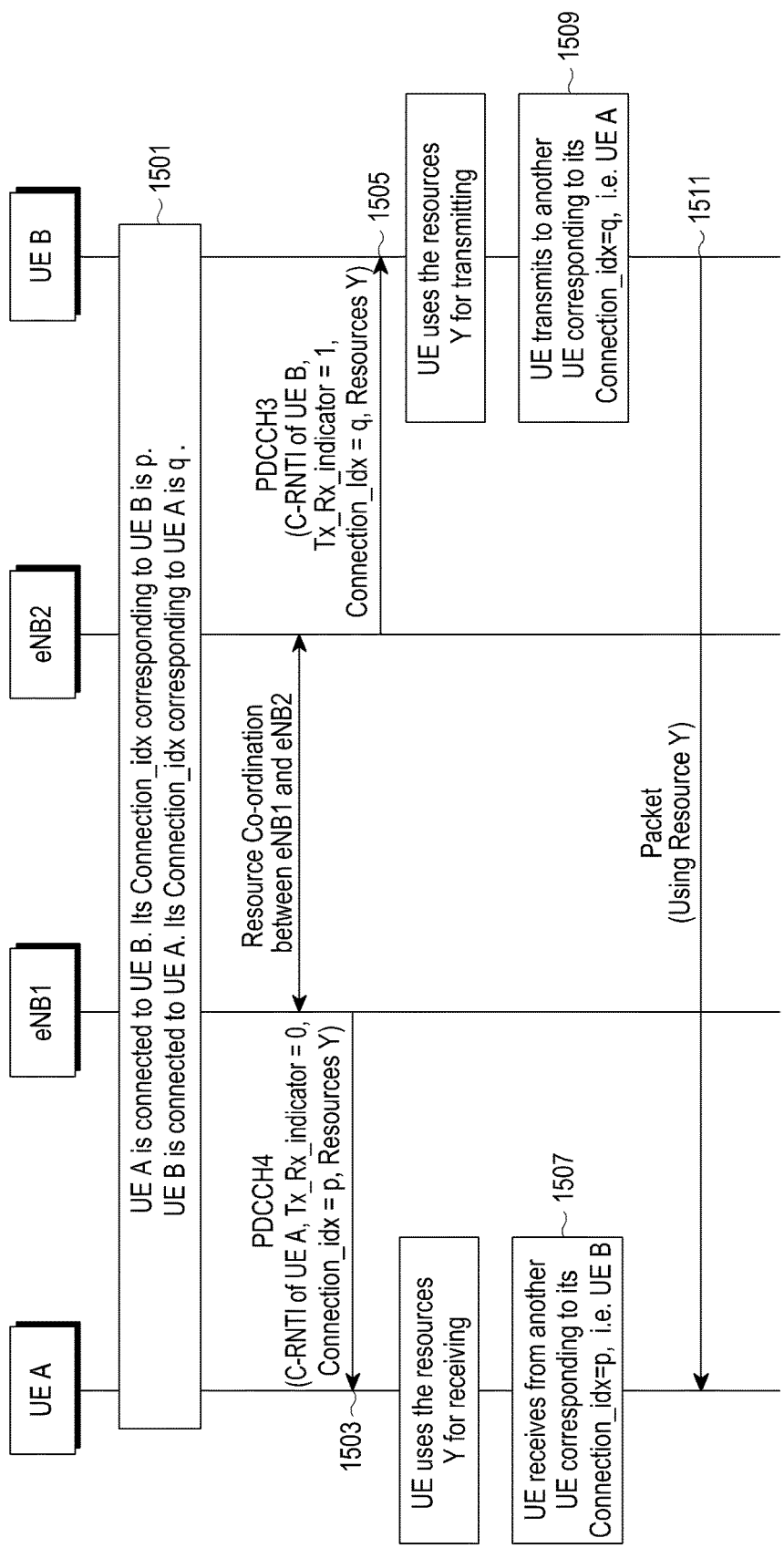

FIGS. 14 and 15 are diagrams illustrating signal flows for allocating a connection index instead of a Tx index or an Rx index for D2D communication according to an embodiment of the present disclosure.

Referring to FIG. 14, during D2D connection setup, eNB1 assigns connection index p (Connection_idx=p) to UE A, for communication with UE B and eNB2 assigns connection index q (Connection_idx=q) to UE B, for communication with UE A in operation 1401. Operation 1403 is identical to operation 605 of FIG. 6 except that a connection index is transmitted instead of a Tx index on PDCCH1. Also, operation 1405 is identical to operation 611 of FIG. 6 except that a connection index is transmitted instead of an Rx index on PDCCH2. Operations 1407 and 1409 are identical to operations 609 and 615 of FIG. 6 respectively except that data is transmitted and received to and from UE B corresponding to the connection index instead of the Tx or Rx index. The other operations, such as transmission of a packet from UE A to UE B in resources X in operation 1411, are performed in the same manner as their counterparts illustrated in FIG. 6 and thus will not be described herein in detail.

Referring to FIG. 15, during D2D connection setup, eNB1 assigns connection index p (Connection_idx=p) to UE A, for communication with UE B and eNB2 assigns connection index q (Connection_idx=q) to UE B, for communication with UE A in operation 1501. Operation 1503 is identical to operation 705 of FIG. 7 except that a connection index is transmitted instead of an Rx index on PDCCH4. Also, operation 1505 is identical to operation 711 of FIG. 7 except that a connection index is transmitted instead of a Tx index on PDCCH3. Operations 1507 and 1509 are identical to operations 709 and 715 of FIG. 7 respectively, except that data is transmitted and received to and from UE B corresponding to the connection index instead of the Tx or Rx index. The other operations, such as transmission of a packet from UE B to UE A in resources Y in operation 1511, are performed in the same manner as their counterparts illustrated in FIG. 7 and thus will not be described herein in detail.

Embodiment 3

In another embodiment of the present disclosure, resource information is indicated to both UEs of UE pair using single control channel transmission by eNB. In this embodiment it is assumed that both UEs of UE pair is connected with same eNB. Tx resources and Rx resources are identified using UE Pair C-RNTI and UE-Idx for direct communication.

In this embodiment, a UE-pair C-RNTI, $C\text{-}RNTI_{UE\text{-}pair}$ is assigned to each UE pair participating in D2D communication in addition to a C-RNTI assigned to each UE to distinguish UEs belonging to the same eNB. Therefore, a plurality of UE-pair C-RNTIs are assigned to a UE participating in D2D communication with a plurality of UEs. A UE-pair C-RNTI is assigned during direct communication path setup and released upon release or termination of the path.

Figure 16:
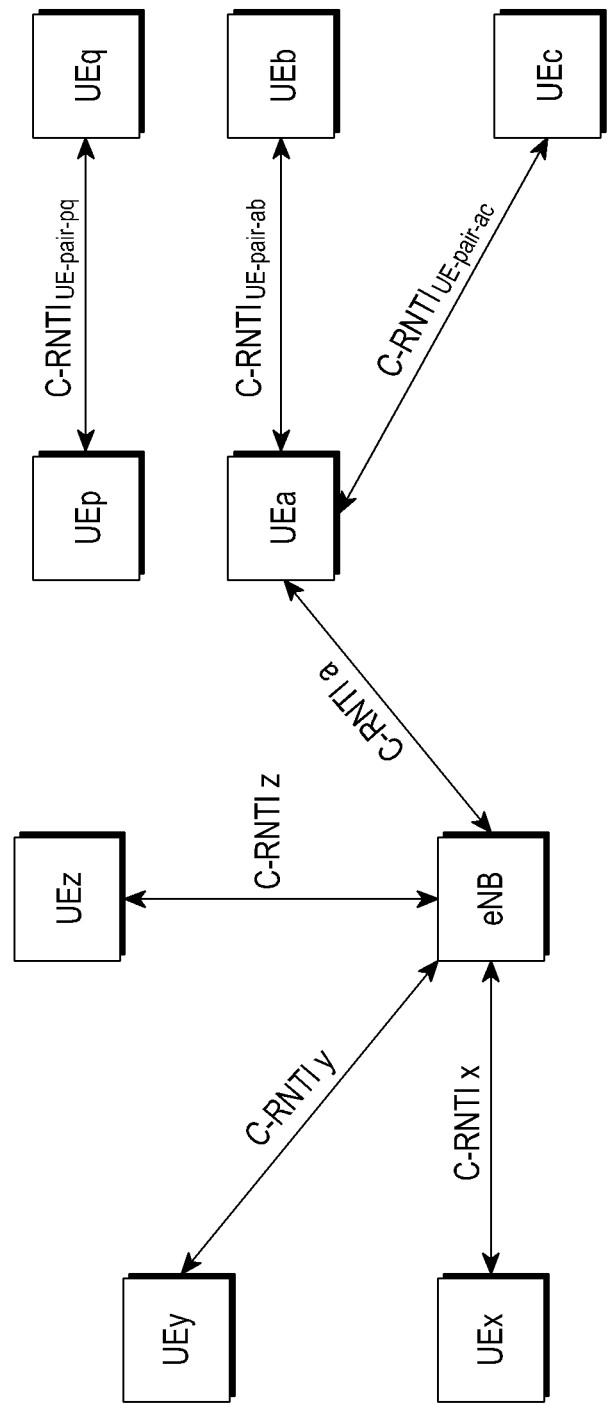
FIG. 16 illustrates an example of allocating Cell Radio Network Temporary Identifiers (C-RNTIs) and UE-pair C-RNTIs according to an embodiment of the present disclosure.

FIG. 16 illustrates an example of allocating C-RNTIs and UE-pair C-RNTIs according to an embodiment of the present disclosure.

Referring to FIG. 16, C-RNTI x, C-RNTI y, C-RNTI z, and C-RNTI a are assigned to UEx, UEy, UEz, and UEa, respectively, for communication with an eNB. UE-pair C-RNTIs, $C\text{-}RNTI_{UE\text{-}pair\text{-}pq}$, $C\text{-}RNTI_{UE\text{-}pair\text{-}ab}$ and $C\text{-}RNTI_{UE\text{-}pair\text{-}ac}$ are assigned to a connection between UEp and UEq, a connection between UEa and UEb, and a connection between UEa and UEc, respectively.

The eNB assigns a UE-pair C-RNTI from an address space from which it assigns C-RNTIs to other UEs communicating with it. This means that C-RNTIs assigned to UEs communicating with the eNB and UE-pair C-RNTIs assigned to UE pairs are distinct.

A UE-pair C-RNTI assigned to a UE pair distinguishes D2D communication between the UE pair from communication between a UE and an eNB. The UE-pair C-RNTI also distinguishes D2D communication between the UE pair from communication between a UE of the UE pair and the eNB. The UE-pair C-RNTI also distinguishes communication between the UE pair from communication between another UE pair.

If selective DL subframes and/or UL subframes are signaled or reserved for only direct communication, C-RNTIs for UEs communicating with an eNB and UE-pair C-RNTIs for UE pairs may be assigned from independent address spaces having the same addresses. This is possible if the UEs communicating with the eNB are aware of these selective subframes. This means that the C-RNTIs assigned to the UEs communicating with the eNB and the UE-pair C-RNTIs assigned to the UE pairs may be same.

Figure 17:
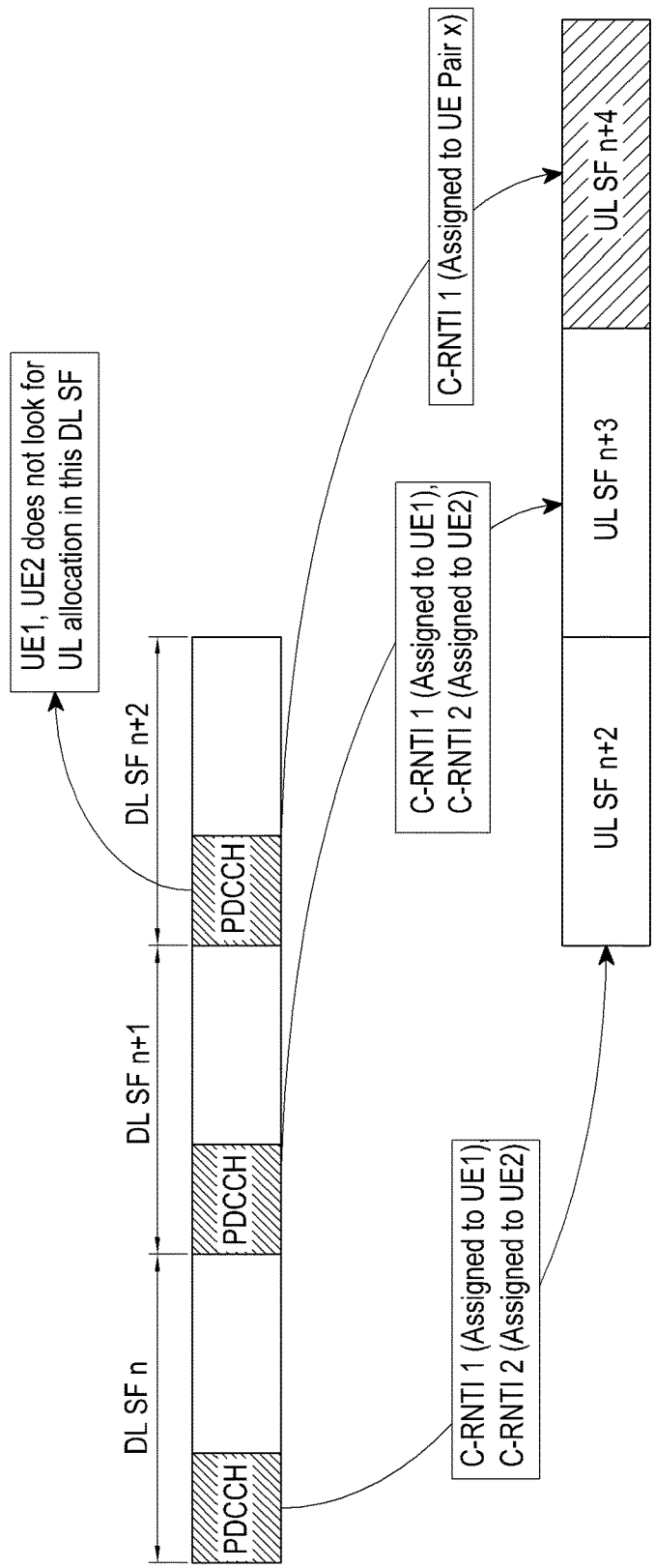
FIG. 17 illustrates an example of reusing a C-RNTI address space for UE-pair C-RNTIs according to an embodiment of the present disclosure.

FIG. 17 illustrates an example of reusing a C-RNTI address space for UE-pair C-RNTIs according to an embodiment of the present disclosure.

Referring to FIG. 17, C-RNTI 1 and C-RNTI 2 are assigned to UE1 and UE2, respectively, for communicating with an eNB. Selective UL subframes are reserved for D2D communication. UE1 and UE2 use the assigned C-RNTIs to receive and decode PDCCHs in DL subframes, DL SF n and DL SF n+1 to receive information about resources for transmitting data in UL subframes, UL SF n+2 and UL SF n+3 respectively. The UEs of UE pair x use C-RNTI 1 in a DL subframe, DL SF n+2 to receive information about resources for D2D communication in a UL subframe, UL SF n+4. UE1 does not use C-RNTI 1 in the DL subframe, DL SF n+2 to receive information about resources for transmitting in the UL subframe, UL SF n+4. However, UE1 may use C-RNTI 1 in the DL subframe, DL SF n+2 to receive information about resources for receiving DL packets in a DL subframe, DL SF n+3.

A description will be given of a method for signaling resource allocation using a UE-pair C-RNTI.

If a UE wants to transmit data on a D2D communication link, the UE transmits, to an eNB, a D2D BSR requesting resources for D2D communication. An LCID distinguishes the D2D BSR from a normal BSR. The LCID may be reserved to indicate the D2D BSR and included in the D2D BSR. Alternatively, the LCID may be included in a MAC subheader indicating a MAC control element having the D2D BSR in a MAC PDU. The D2D BSR may also include a destination ID. The destination ID is the ID of a destination to which the UE wants to transmit a signal through the D2D communication link. The destination ID may be a unicast address of a UE, a group cast address of group of UEs, or a broadcast address.

If PUCCH resources are available for transmission of the D2D BSR, the resources for the D2D BSR may be obtained using a general method such as transmitting a scheduling request to the eNB or by transmitting a random access preamble to the eNB on an RACH.

Figure 18B:
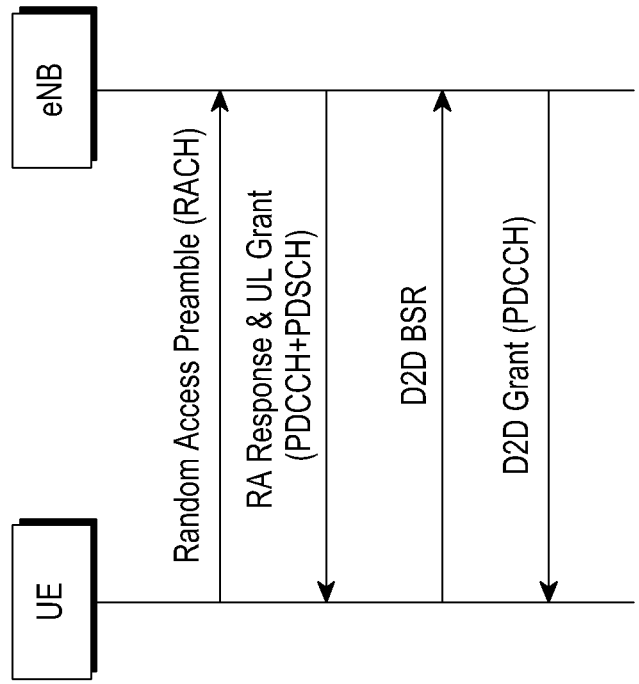
FIGS. 18A and 18B illustrate methods for allocating resources for transmission of a D2D Buffer Status Report according to an embodiment of the present disclosure.
Figure 18A:
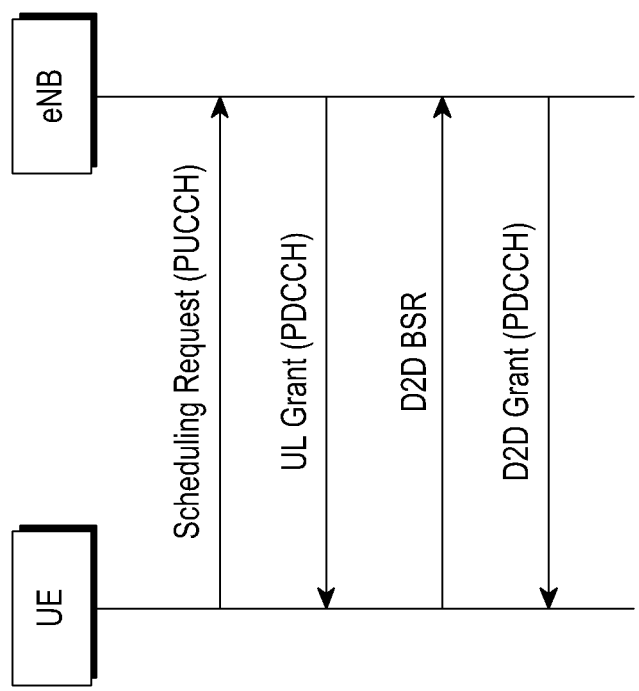

FIGS. 18A and 18B illustrate methods for allocating resources for transmission of a D2D BSR according to an embodiment of the present disclosure More specifically, FIG. 18A illustrates an example of requesting resources for transmitting a D2D BSR on a PUCCH and FIG. 18B illustrates an example of requesting resources for transmitting a D2D BSR on an RACH.

Upon receipt of the D2D BSR, the eNB allocates resources for D2D transmission and transmits a grant for D2D transmission on a PDCCH or EPDCCH in a DL subframe corresponding to a UL subframe reserved for D2D communication. A control information format carrying the D2D resource information is the same as or different from a control information format carrying resource information for transmission of a UE to an eNB. The PDCCH or EPDCCH is masked with a UE Pair C-RNTI. The PDCCH or EPDCCH transmitted by eNB is received by the UE which has send D2D BSR as well as the other UE which is communicating with the UE which has sent D2D BSR.

The eNB signals resources for direct communication between a UE pair on a PDCCH/EPDCCH masked with a UE-pair C-RNTI. The DL control region (that is, the PDCCH/EPDCCH) indicates resources for direct communication as well as resources for communication with the eNB. The resources for direct communication are indicated to the UEs of the UE pair by a single transmission. Resources are not indicated separately to each UE of the UE pair.

Resources may be allocated for each packet transmission on DL. The resources may also be allocated in a semi-static manner so that the allocated resources are valid during a plurality of TTIs. The resources may also be allocated in a static manner so that the determined resources are valid for the duration of a connection between the UEs.

A UE that performs direct communication with another UE monitors a DL control region for resource allocation using a UE-pair C-RNTI. A UE of a UE pair communicating with an eNB as well as with another UE monitors a DL control region for resource allocation using a C-RNTI and a UE-pair C-RNTI. If selective subframes are signaled or reserved for only direct communication, the UE of the UE pair monitors the DL control region for resource allocation of the selective subframes for direct communication in respective DL subframes only using the UE-pair C-RNTI. However, if the selective subframes are UL subframes, the UE may monitor these DL subframes using the C-RNTI assigned for communication with the eNB for DL resource allocation. If the selective subframes are DL subframes, the UE may monitor these DL subframes using the C-RNTI assigned for communication with the eNB for UL resource allocation. If the UE is also communicating with the eNB, the UE monitors the DL control region for DL/UL resource allocation using the C-RNTI assigned for communication with the eNB in other DL subframes.

Figure 19:
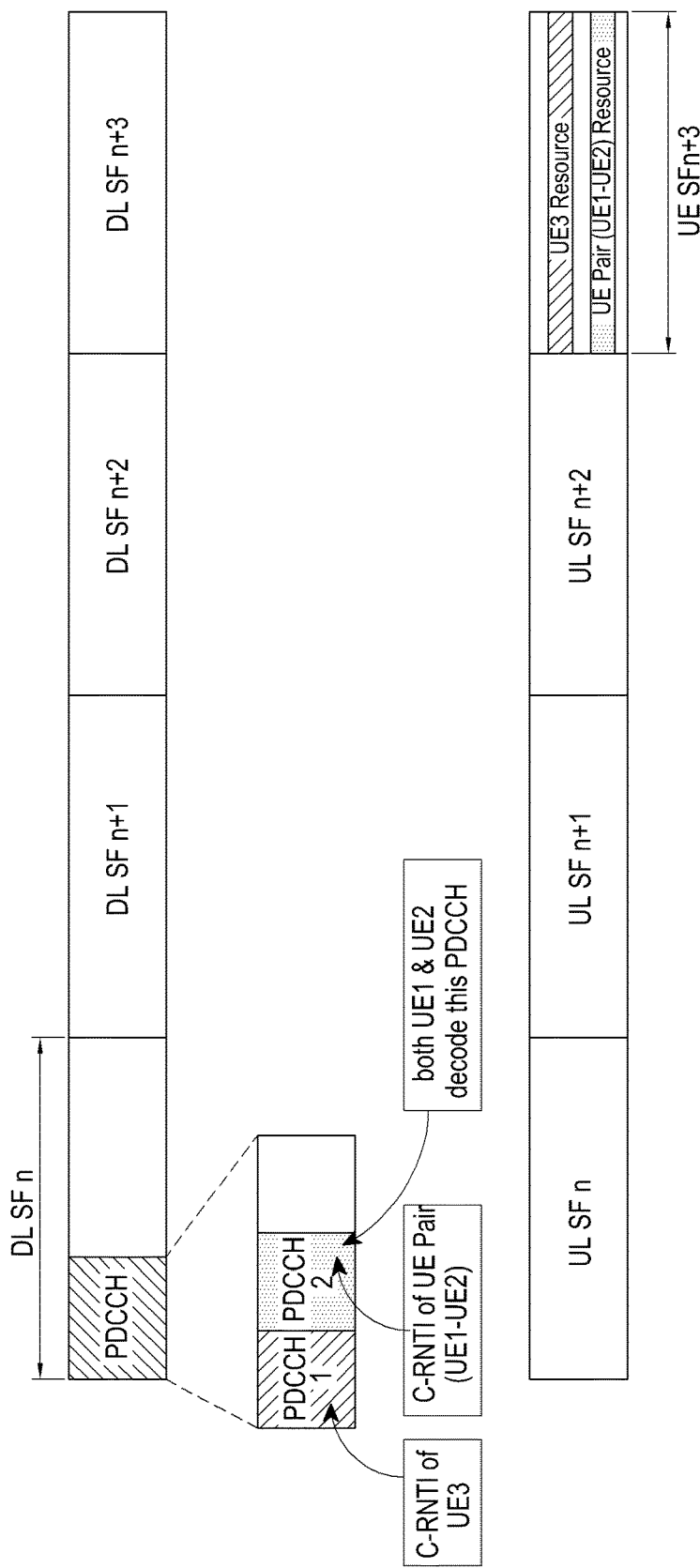
FIG. 19 illustrates an example of distinguishing resources for communication between a UE pair from resources for other UEs within the coverage area of an eNB according to an embodiment of the present disclosure.

FIG. 19 illustrates an example of distinguishing resources for communication between a UE pair from resources of other UEs in the coverage area of an eNB according to an embodiment of the present disclosure.

Referring to FIG. 19, UE1 and UE2 participate in direct communication using the UL frequency F2. UE3 is communicating with the eNB using the UL frequency F2. UE3 monitors the DL subframe, DL SF n using a C-RNTI whereas the UE1-UE2 pair monitors the DL subframe, DL SF n using a UE-pair C-RNTI, C-RNTI$_{UE\text{-}pair}$. In FIG. 19, a control region of the DL subframe DL SF n indicates resources for the UL subframe UL SF n+3. The C-RNTI of UE3 and the UE-pair C-RNTI of the UE1-UE2 pair distinguish a PDCCH and UL resources for UE3 from a PDCCH and UL resources for the UE1-UE2 pair.

Figure 20:
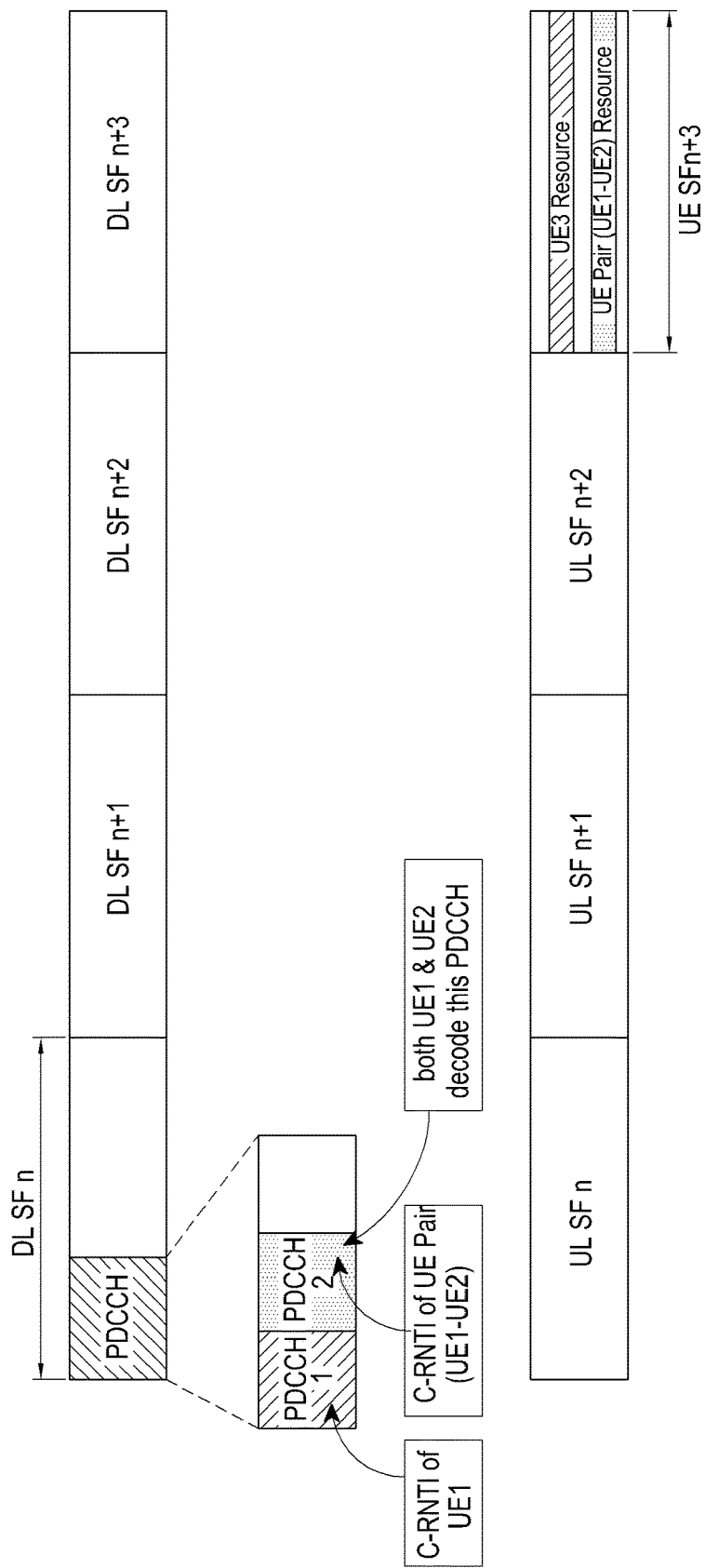
FIG. 20 illustrates an example of distinguishing resources for communication between a UE pair from resources for communication between a UE of the UE pair and an eNB according to an embodiment of the present disclosure.

FIG. 20 illustrates an example of distinguishing resources for communication between a UE pair from resources for communication between a UE of the UE pair and an eNB according to an embodiment of the present disclosure.

Referring to FIG. 20, UE1 and UE2 participate in direct communication using the UL frequency F2. UE1 is also communicating with the eNB using the UL frequency F2. UE1 monitors the DL subframe DL SF n using a C-RNTI and a UE-pair C-RNTI. In FIG. 20, the control region of the DL subframe DL SF n indicates resources for the UL subframe UL SF n+3. The C-RNTI of UE1 and the UE-pair C-RNTI of the UE1-UE2 pair distinguish a PDCCH and UL resources for UE1 for direct communication with UE2 from a PDCCH and UL resources for communication with the eNB.

Figure 21:
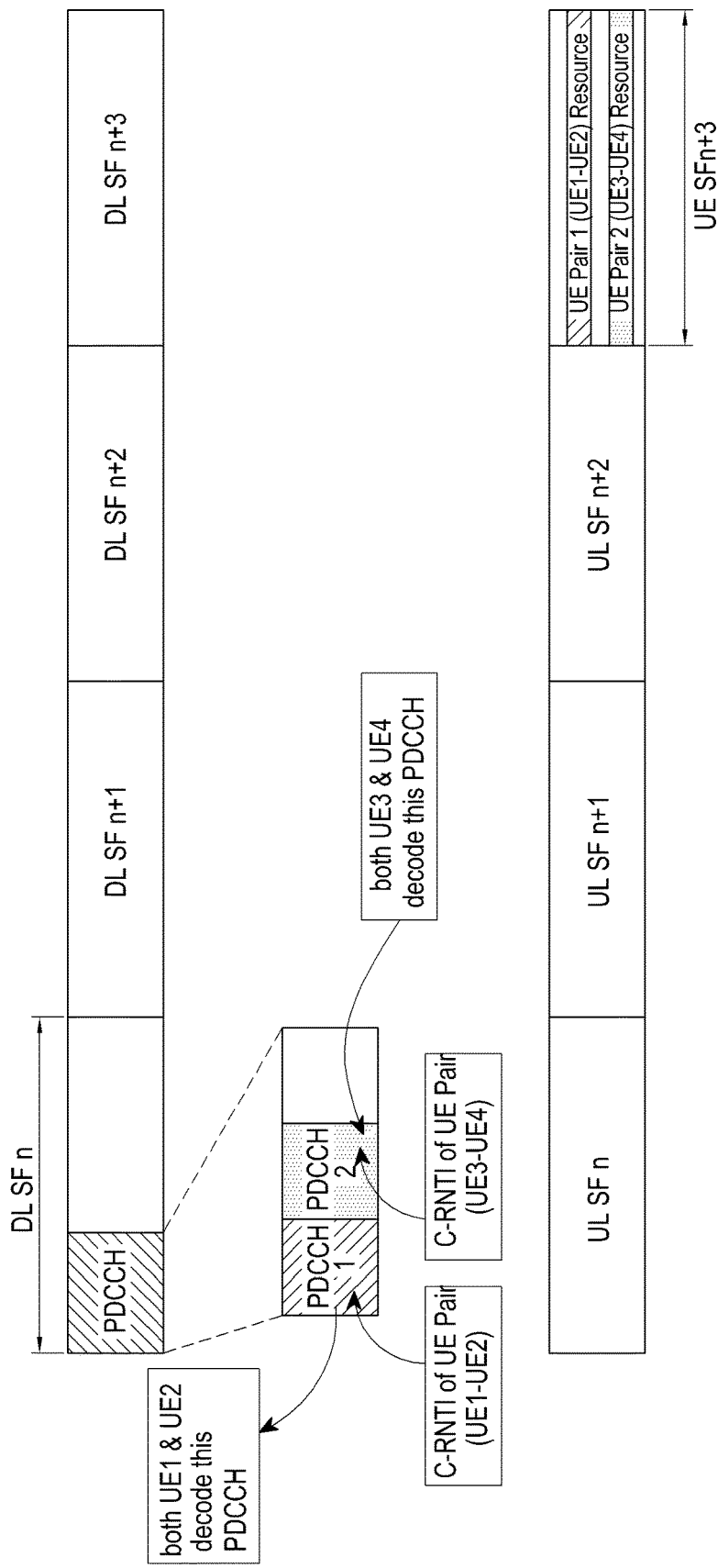
FIG. 21 illustrates an example of distinguishing resources for communication between one UE pair from resources for communication between another UE pair according to an embodiment of the present disclosure.

FIG. 21 illustrates an example of distinguishing resources for communication between one UE pair from resources for communication between another UE pair according to an embodiment of the present disclosure.

Referring to FIG. 21, UE1 and UE2 participate in direct communication using the UL frequency F2, and UE3 and UE4 participate in direct communication using the UL frequency F2. UE1 and UE2 of the UE1-UE2 pair monitor the DL subframe DL SF n using their UE-pair C-RNTI, whereas UE3 and UE4 of the UE3-UE4 pair monitor the DL subframe DL SF n using their UE-pair C-RNTI. In FIG. 21, the control region of the DL subframe DL SF n indicates resources for the UL subframe UL SF n+3. The UE-pair C-RNTI of the UE1-UE2 pair and the UE-pair C-RNTI of the UE3-UE4 pair distinguish a PDCCH and UL resources for the UE1-UE2 pair from a PDCCH and UL resources for the UE3-UE4 pair.

Resources for direct communication are signaled to the UEs of a UE pair by a single transmission using a UE-pair C-RNTI assigned to the UE pair. However, upon receipt of the signal using the UE-pair C-RNTI, each UE of the UE pair does not know whether to transmit or receive in the resources. Accordingly, a method for identifying Tx resources and Rx resources when a UE-pair C-RNTI is used will be described below.

In unidirectional communication, Tx and Rx roles between the UEs of a UE pair are predetermined or indicated by direct path setup signaling. For example, for the UE1-UE2 pair, UE1 may be a transmitter and UE2 may be a receiver. The eNB signals resources for the UE1-UE2 pair using the UE-pair C-RNTI assigned to the UE1-UE2 pair. Both UE1 and UE2 receive resource allocation information in a DL control region using the UE-pair C-RNTI of the UE1-UE2 pair. UE1 and UE2 receive the same PDCCH and use the allocated resources according to their Tx and Rx roles determined at the time of direct path setup. That is, UE1 uses the allocated resources for transmission and UE2 uses the allocated resources for reception.

Figure 22:
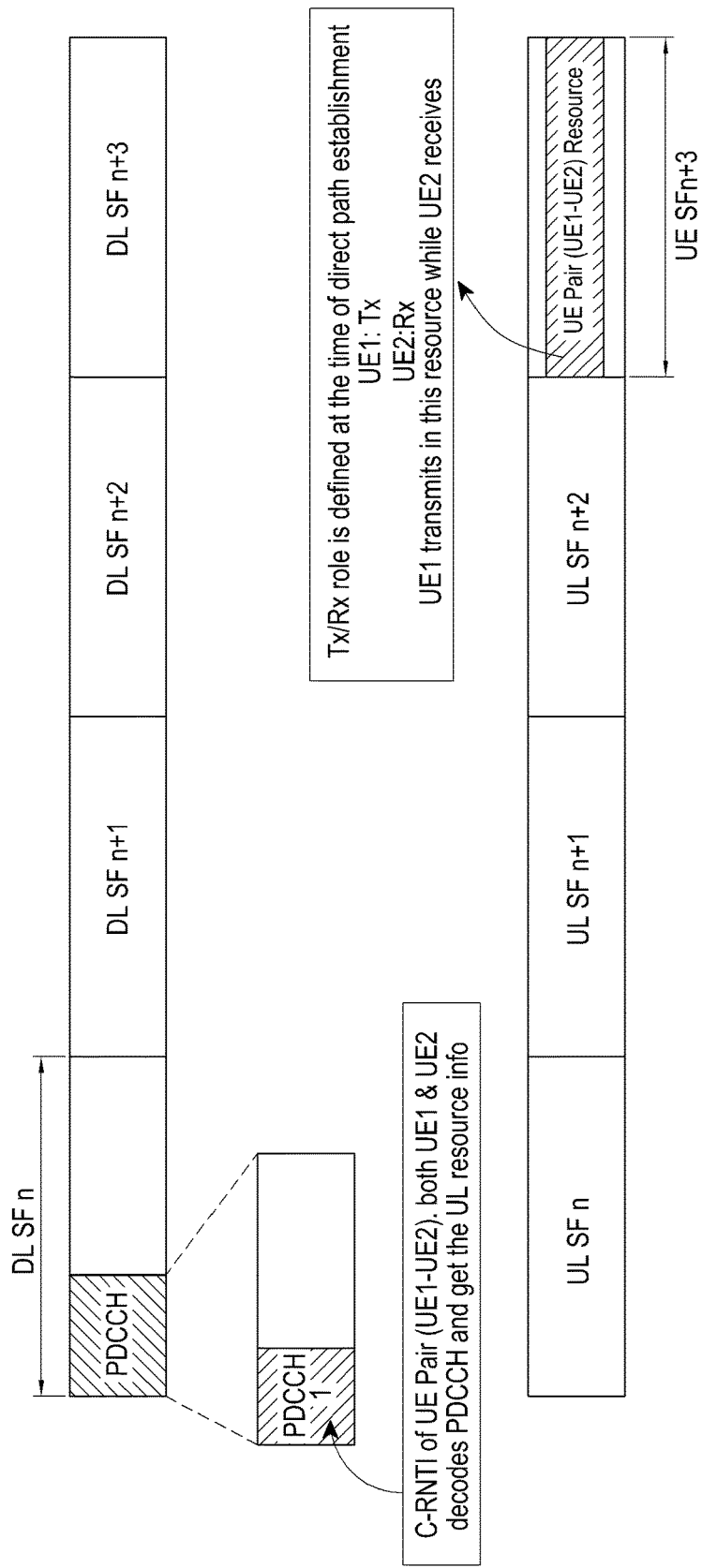
FIG. 22 illustrates a method for identifying transmission resources and reception resources in the case of unidirectional communication according to an embodiment of the present disclosure.

FIG. 22 illustrates a method for identifying Tx resources and Rx resources in the case of unidirectional communication according to an embodiment of the present disclosure.

Referring to FIG. 22, UE1 and UE2 receive resource information for direct communication by receiving and decoding a PDCCH using a UE pair C-RNTI assigned to the UE1-UE2 pair. UE1 transmits data to UE2 in allocated resources whereas UE2 receives data from UE1 in the allocated resources.

In bidirectional communication, each UE of a UE pair plays Tx and Rx roles. An eNB assigns a 1-bit UE index (UE_idx) to each of the UEs of the UE pair in addition to a UE-pair C-RNTI. For example, for the UE1-UE2 pair, UE_idx 0 is assigned to UE 1 and UE_idx 1 is assigned to UE2. The eNB transmits resources for the UE1-UE2 pair using the UE-pair C-RNTI assigned to the UE1-UE2 pair. The eNB adds the UE index of a UE in the resource allocation signaling. The UE index identifies a UE which has to use the allocated resources for transmission. The UE index may be used in CRC masking of a PDCCH or may be included as an information field in the decoded PDCCH. UE1 and UE2 receive the same PDCCH and use the allocated resources according to the UE indexes assigned by the network at the time of direct path setup.

Figure 23:
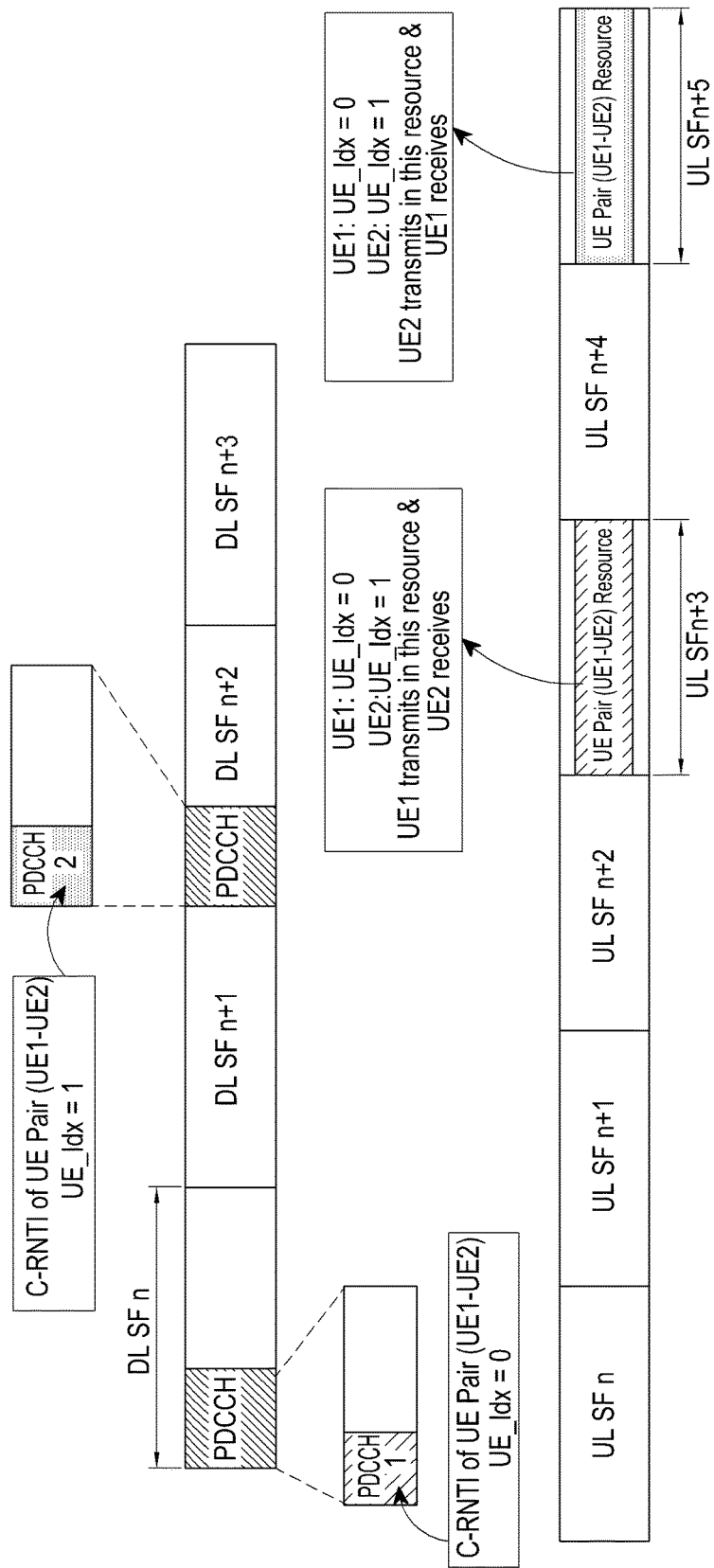
FIG. 23 illustrates a method for identifying transmission resources and reception resources in the case of bidirectional communication according to an embodiment of the present disclosure.

FIG. 23 illustrates a method for identifying Tx resources and Rx resources in the case of bidirectional communication according to an embodiment of the present disclosure.

Referring to FIG. 23, if UE1 receives and decodes a PDCCH using the UE-pair C-RNTI and the UE index of UE1 is included in the PDCCH, UE1 transmits data in allocated resources. As UE1 receives and decodes a PDCCH in the DL subframe DL SF n using the UE-pair C-RNTI and the UE index of UE1 is included in the PDCCH, UE1 transmits data in allocated resources of the UL subframe UL SF n+3. If UE2 receives and decodes a PDCCH using the UE-pair C-RNTI and the UE index of UE2 is included in the PDCCH, UE2 transmits data in allocated resources. As UE2 receives and decodes a PDCCH in the DL subframe DL SF n+2 using the UE-pair C-RNTI and the UE index of UE2 is included in the PDCCH, UE2 transmits data in allocated resource of the UL subframe UL SF n+5.

To identify Tx resources and Rx resources in bidirectional communication in which both UEs of a UE pair play Tx and Rx roles, the eNB may assign two UE-pair C-RNTIs to the UEs of the UE pair. For example, if UE1 operates as a transmitter, a UE-pair C-RNTI, $C\text{-}RNTI_{UE\text{-}pair\ 1}$ may be assigned to UE1 and if UE1 operates as a receiver, a UE-pair C-RNTI, $C\text{-}RNTI_{UE\text{-}pair\ 2}$ may be assigned to UE1. If UE2 operates as a receiver, the UE-pair C-RNTI, $C\text{-}RNTI_{UE\text{-}pair\ 1}$ may be assigned to UE2 and if UE2 operates as a transmitter, the UE-pair C-RNTI, $C\text{-}RNTI_{UE\text{-}pair\ 2}$ may be assigned to UE2. The eNB transmits resources for the UE1-UE2 pair using one of the UE-pair C-RNTIs assigned to the UE1-UE2 pair. If UE1 should transmit data in allocated resources and UE2 should receive the data in the allocated resources, the eNB uses the UE-pair C-RNTI, $C\text{-}RNTI_{UE\text{-}pair\ 1}$. If UE2 should transmit data in allocated resources and UE1 should receive the data in the allocated resources, the eNB uses the UE-pair C-RNTI, $C\text{-}RNTI_{UE\text{-}pair\ 2}$. UE1 and UE2 receive the same PDCCH and use allocated resources according to the UE-pair C-RNTIs assigned by the network at the time of direct path setup.

Figure 24:
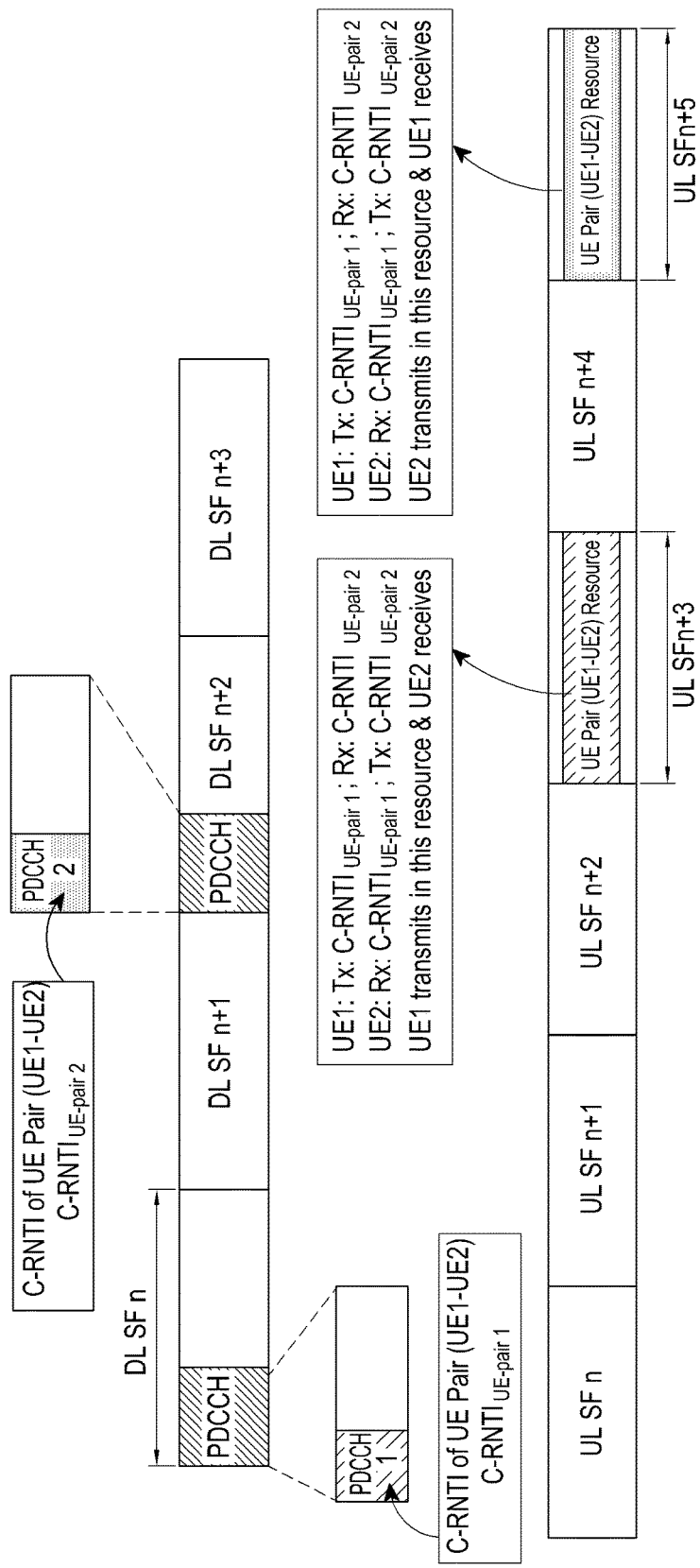
FIG. 24 illustrates a method for identifying transmission resources and reception resources in the case of bidirectional communication according to an embodiment of the present disclosure.

FIG. 24 illustrates a method for identifying Tx resources and Rx resources in the case of bidirectional communication according to an embodiment of the present disclosure.

Referring to FIG. 24, if UE1 receives and decodes a PDCCH in the DL subframe DL SF n using the UE-pair C-RNTI $C\text{-}RNTI_{UE\text{-}pair\ 1}$ which is a C-RNTI assigned to UE1 for transmission, UE1 transmits data in allocated resources of the UL subframe UL SF n+3. If UE2 receives and decodes a PDCCH in the DL subframe DL SF n+2 using the UE-pair C-RNTI $C\text{-}RNTI_{UE\text{-}pair\ 1}$ which is a C-RNTI assigned to UE2 for reception, UE2 receives data in allocated resources of the UL subframe UL SF n+5. If UE2 receives and decodes a PDCCH in the DL subframe DL SF n+2 using the UE-pair C-RNTI $C\text{-}RNTI_{UE\text{-}pair\ 2}$ which is a C-RNTI assigned to UE2 for transmission, UE2 transmits data in allocated resources of the UL subframe UL SF n+5. If UE1 receives and decodes a PDCCH in the DL subframe DL SF n+2 using the UE-pair C-RNTI $C\text{-}RNTI_{UE\text{-}pair\ 2}$ which is a C-RNTI assigned to UE1 for reception, UE1 receives data in allocated resources of the UL subframe UL SF n+5.

A UE-pair C-RNTI may be used together with a UE index in a measurement report, a BSR, a resource request, and the like transmitted to an eNB. The eNB may then uniquely identify a UE and a communication link of the UE for which the report or request is transmitted. Similarly, the eNB may use the UE-pair C-RNTI in DL signaling to the UE. If the measurement report, the BSR, the resource request, and the like are for a communication link between the UE and the eNB, the UE transmits the measurement report, the BSR, the resource request, and the like to the eNB using a C-RNTI assigned for communication with the eNB. If the measurement report, the BSR, the resource request, and the like are for communication between the UEs of the UE pair, the UE transmits the measurement report, the BSR, the resource request, and the like to the eNB using the UE-pair C-RNTI together with the UE index.

If two UE-pair C-RNTIs are assigned to a UE pair, a UE of the UE pair may use the UE-pair C-RNTIs for transmitting in a measurement report, a BSR, a resource request, and the like to the eNB. If the measurement report, the BSR, the resource request, and the like are for a communication link between the UE and the eNB, the UE transmits the measurement report, the BSR, the resource request, and the like to the eNB using a C-RNTI assigned for communication with the eNB. If the measurement report, the BSR, the resource request, and the like are for communication between the UEs of the UE pair, the UE transmits the measurement report, the BSR, the resource request, and the like to the eNB using the two UE-pair C-RNTIs. The eNB may then uniquely identify the UE and the communication link of the UE for which the reports or request is transmitted. Similarly, the eNB may use the two UE-pair C-RNTIs in DL signaling to the UEs of the UE pair.

Now a description will be given of a method for allocating a UE index and a UE-pair C-RNTI.

Figure 25:
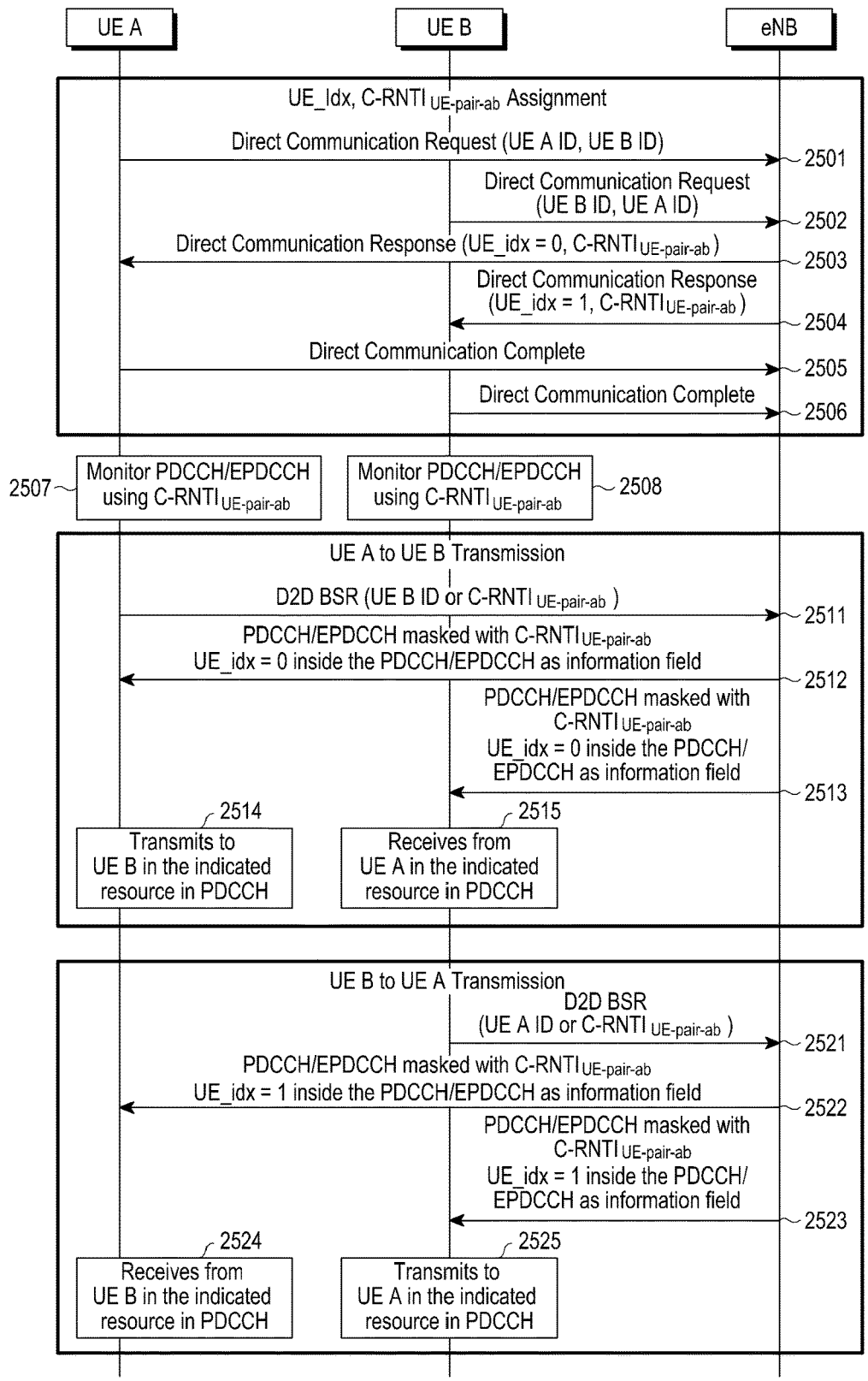
FIG. 25 illustrates a method for allocating a UE index (UE_idx) and a UE-pair C-RNTI ($C-RNTI_{UE-pair}$) in allocating resources for D2D communication within a cell according to an embodiment of the present disclosure.

FIG. 25 illustrates a method for allocating a UE index (UE_idx) and a UE-pair C-RNTI ($C\text{-}RNTI_{UE\text{-}pair}$) in allocating resources for D2D communication within a cell according to an embodiment of the present disclosure.

Referring to FIG. 25, UE A and UE B transmit direct communication request messages to an eNB in operations 2501 and 2502. Each of UE A and UE B includes the UE ID of the UE B and the UE ID of UE A in the direct communication request message. The order of the transmissions of the direct communication request messages from UE A and UE B to the eNB may be changed. One UE may acquire the UE ID of the other UE with which it wants to communicate in the following manner.

UE A initiates direct communication setup with UE B on a D2D communication link. UE A transmits a direct communication request message including its UE ID. The UE ID may be an ID of the UE specific to D2D communication or may be some other UE ID which identifies the UE. The UE ID may also be an application user ID of the UE. If UE B accepts the communication request from UE A, UE B transmits a direct communication response message including its UE ID to UE A. UE A and UE B may know each other's UE ID as a part of a discovery message. UE A and UE B may periodically transmit discovery messages. The UE IDs of UEs with which the UE wants to communicate may be preconfigured in the UE.

Upon receipt of the direct communication request message from UE A, the eNB verifies the direct communication request message and then assigns $C\text{-}RNTI_{UE\text{-}pair\text{-}ab}$ as a UE-pair C-RNTI and UE_idx 0 as a UE index to UE A. The eNB transmits the assigned $C\text{-}RNTI_{UE\text{-}pair}$ and UE_idx to UE A in a direct communication response message in operation 2503. The eNB may transmit other parameters related to direct communication in the direct communication response message. Upon receipt of the direct communication request message from UE B, the eNB verifies the direct communication request message and then assigns $C\text{-}RNTI_{UE\text{-}pair\text{-}ab}$ and UE_idx 1 as a UE index to UE B. The eNB sends the assigned $C\text{-}RNTI_{UE\text{-}pair}$ and UE_idx to UE B in a direct communication response message in operation 2504. The eNB may transmit other parameters related to direct communication in the direct communication response message. Upon receipt of the direct communication response messages, UE A and UE B transmit direct communication complete messages to the eNB respectively in operations 2505 and 2506. UE A and UE B perform operations using the assigned UE-pair C-RNTI and UE indexes. UE A and UE B monitor a PDCCH or an EPDCCH using the UE-pair C-RNTI, $C\text{-}RNTI_{UE\text{-}pair\text{-}ab}$ in operations 2507 and 2508. This monitoring may be added to monitoring a PDCCH or an EPDCCH using C-RNTIs assigned to UE A and UE B for UE-eNB communication.

If UE A wants to transmit data to UE B on the D2D communication link, UE A transmits a D2D BSR to the eNB in operation 2511. The D2D BSR includes the ID of UE B or the UE-pair C-RNTI, C-RNTI$_{UE\text{-}pair\text{-}ab}$. Upon receipt of the D2D BSR, the eNB transmits a grant in a PDCCH or EPDCCH masked with the UE-pair C-RNTI, C-RNTI$_{UE\text{-}pair\text{-}ab}$ and a UE index in operations 2512 and 2513. The PDCCH or EPDCCH may be received by both UE A and UE B. As the UE index corresponds to UE A, UE A transmits data in allocated resources in operation 2514 and UE B receives the data in the allocated resources in operation 2515. The UE-pair C-RNTI, C-RNTI$_{UE\text{-}pair\text{-}ab}$ indicates that the resources are for communication between UE A and UE B.

If UE B wants to transmit data to UE A on the D2D communication link, UE B transmits a D2D BSR to the eNB in operation 2521. The D2D BSR includes the ID of UE A or the UE-pair C-RNTI, C-RNTI$_{UE\text{-}pair\text{-}ab}$. Upon receipt of the D2D BSR, the eNB transmits a grant in a PDCCH/EPDCCH masked with the UE-pair C-RNTI, C-RNTI$_{UE\text{-}pair\text{-}ab}$ and a UE index in operations 2522 and 2523. The PDCCH or EPDCCH may be received by both UE A and UE B. As the UE index corresponds to UE B, UE B transmits data in allocated resources in operation 2524 and UE A receives the data in the allocated resources in operation 2525. The UE-pair C-RNTI C-RNTI$_{UE\text{-}pair\text{-}ab}$ indicates that the resources are for communication between UE A and UE B.

If both unidirectional communication and bidirectional communication are supported, the eNB may assign a UE index only in the case of bidirectional communication. A UE may indicate to the eNB whether the communication is bidirectional or unidirectional in a direct communication request message.

Figure 26:
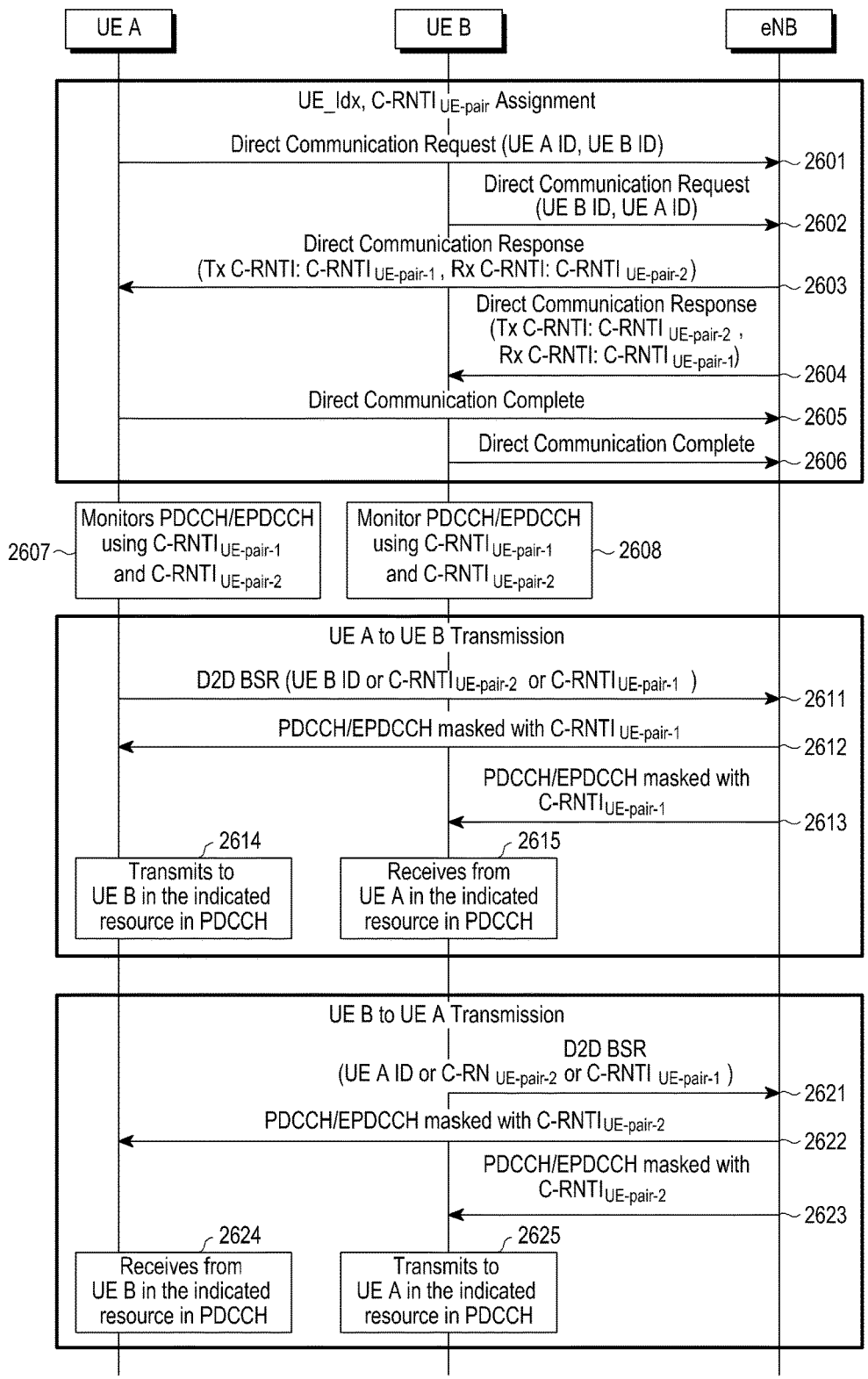
FIG. 26 is a diagram illustrating a signal flow for allocating a transmission UE-pair C-RNTI (Tx $C-RNTI_{UE-pair}$) and a reception UE-pair C-RNTI (Rx $C-RNTI_{UE-pair}$) according to an embodiment of the present disclosure.

FIG. 26 is a diagram illustrating a signal flow for allocating a Tx UE-pair C-RNTI and an Rx UE-pair C-RNTI according to an embodiment of the present disclosure.

Referring to FIG. 26, UE A and UE B transmit direct communication request messages to the eNB respectively in operations 2601 and 2602. Each of UE A and UE B includes the UE ID of the UE B and the UE ID of UE A in its direct communication request message. The order of the transmissions of the direct communication request messages from UE A and UE B to the eNB may be changed. One UE may acquire the UE ID of the other UE with which it wants to communicate in the following manner.

UE A initiates direct communication setup with UE B on a D2D communication link. UE A transmits a direct communication request message including its UE ID. The UE ID may be an ID of the UE specific to D2D communication or may be some other UE ID which identifies the UE. The UE ID may also be an application user ID of the UE. If UE B accepts the communication request from UE A, UE B transmits a direct communication response message including its UE ID to UE A. UE A and UE B may know each other's UE ID as a part of a discovery message. UE A and UE B may periodically transmit discovery messages. The UE IDs of UEs with which the UE wants to communicate may be preconfigured in the UE.

Upon receipt of the direct communication request message from UE A, the eNB verifies the direct communication request message and assigns a Tx UE-pair C-RNTI, C-RNTI$_{UE\text{-}pair\text{-}1}$ and an Rx UE-pair C-RNTI, C-RNTI$_{UE\text{-}pair\text{-}2}$ to UE A. The eNB transmits the assigned Tx UE-pair C-RNTI and Rx UE-pair C-RNTI to UE A in a direct communication response message in operation 2603. The eNB may transmit other parameters related to direct communication in the direct communication response message.

Upon receipt of the direct communication request message from UE B, the eNB verifies the direct communication request message and assigns a Tx UE-pair C-RNTI, C-RNTI$_{UE\text{-}pair\text{-}2}$ and an Rx UE-pair C-RNTI, C-RNTI$_{UE\text{-}pair\text{-}1}$ to UE B. The eNB sends the assigned Tx and Rx UE-pair C-RNTIs to UE B in a direct communication response message in operation 2604. The eNB may transmit other parameters related to direct communication in the direct communication response message.

Upon receipt of the direct communication response messages, UE A and UE B transmit direct communication complete messages to the eNB, respectively in operations 2605 and 2606. UE A and UE B perform operations using the assigned Tx and Rx UE-pair C-RNTIs. UE A and UE B monitor a PDCCH or an EPDCCH using the UE-pair C-RNTIs, C-RNTI$_{UE\text{-}pair\text{-}1}$ and C-RNTI$_{UE\text{-}pair\text{-}2}$ in operations 2607 and 2608. This monitoring may be added to monitoring a PDCCH/EPDCCH using C-RNTIs assigned to UE A and UE B for UE-eNB communication.

If UE A wants to transmit data to UE B on the D2D communication link, UE A transmits a D2D BSR to the eNB in operation 2611. The D2D BSR includes the ID of UE B or the UE-pair C-RNTI, C-RNTI$_{UE\text{-}pair\text{-}1}$ or C-RNTI$_{UE\text{-}pair\text{-}2}$. Upon receipt of the D2D BSR, the eNB transmits a grant in a PDCCH or EPDCCH masked with the UE-pair C-RNTI, C-RNTI$_{UE\text{-}pair\text{-}1}$ in operations 2612 and 2613. The PDCCH or EPDCCH may be received by both UE A and UE B. As the UE-pair C-RNTI, C-RNTI$_{UE\text{-}pair\text{-}1}$ corresponds to the Tx UE-pair C-RNTI of UE A, UE A transmits data in allocated resources in operation 2614 and UE B receives the data in the allocated resources in operation 2615.

If UE B wants to transmit data to UE A on the D2D communication link, UE B transmits a D2D BSR to the eNB in operation 2621. The D2D BSR includes the ID of UE A or the UE-pair C-RNTI, C-RNTI$_{UE\text{-}pair\text{-}1}$ or C-RNTI$_{UE\text{-}pair\text{-}2}$. Upon receipt of the D2D BSR, the eNB transmits a grant in a PDCCH or EPDCCH masked with the UE-pair C-RNTI, C-RNTI$_{UE\text{-}pair\text{-}2}$ in operations 2622 and 2623. The PDCCH or EPDCCH may be received by both UE A and UE B. As the UE-pair C-RNTI, C-RNTI$_{UE\text{-}pair\text{-}2}$ corresponds to the Tx UE-pair C-RNTI of UE B, UE B transmits data in allocated resources in operation 2624 and UE A receives the data in the allocated resources in operation 2625.

While UL subframes are used for direct communication in the foregoing drawings, the present disclosure is equally applicable for the cases in which DL subframes or both DL and UL subframes are used for direct communication. The present disclosure is also applicable to a system operating in Frequency Division Duplexing (FDD) mode or Time Division Duplexing (TDD) mode.

A C-RNTI assigned to a UE Pair may be a UE-pair C-RNTI, a semi-persistently scheduled UE-pair C-RNTI, or a temporary UE-pair. In an embodiment in which two UE-pair C-RNTIs are assigned to a UE pair, one may be semi-persistently scheduled and the other may be normally scheduled. In another embodiment in which one UE-pair C-RNTI is assigned to a UE pair, it may be semi-persistently or normally scheduled.

Embodiment 4

A third embodiment of the present disclosure provides a method for identifying Tx resources and Rx resources using one C-RNTI reserved for D2D communication, UE pair ID and UE_Idx. In this embodiment resource information is indicated to both UEs of UE pair using single control channel transmission by eNB. In this embodiment it is assumed that both UEs of UE pair is connected with same eNB.

In the third embodiment of the present disclosure, to distinguish one UE from another UE served by the same eNB, one C-RNTI is reserved as C-RNTI$_{UE\text{-}pairs}$ from a C-RNTI space assigned to each UE. The C-RNTI space from which C-RNTI$_{UE\text{-}pairs}$ is reserved is the same address space from which UEs communicating with the eNB are assigned C-RNTIs. The reserved C-RNTI is used to distinguish resources assigned to a UE(s) for communicating with the eNB from resources assigned to UE pairs for direct communication. Each UE pair engaged in direct communication is assigned a UE pair ID. A UE pair ID distinguishes one UE pair from another UE pair. A UE engaged in direct communication with a plurality of UEs is assigned a plurality of UE pair IDs. A UE pair ID is assigned by a network (for example, an eNB or MME) to each UE pair engaged in direct communication. A UE pair ID assigned to the UEs of a UE pair is added to C-RNTIs assigned to the UEs for communication with the eNB by the eNB. A UE pair ID is assigned during direct communication path setup. The UE pair ID is used to distinguish resources amongst UE pairs. Resources for all UE pairs are indicated using the reserved C-RNTI by the eNB. The UE pair ID may be added in a message (for example, a field in control information) carrying resource information. The UE pair ID may also be added in a CRC mask for a PDCCH.

A method for identifying a UE pair using a reserved C-RNTI and a UE pair ID distinguishes UE pair communication from communication between other UEs (i.e., UEs which are not involved in direct communication) and an eNB in the coverage area of the eNB. It also distinguishes UE pair communication from communication between a UE of the UE pair with the eNB. It also distinguishes one UE pair communication from another UE pair communication.

A description will be given of a method for signaling resource allocation using a reserved C-RNTI and a UE pair ID.

If a UE wants to transmit on a D2D communication link, the UE transmits to an eNB a D2D BSR requesting resources for D2D communication. An LCID may distinguish the D2D BSR from a normal BSR. The LCID may be reserved to indicate the D2D BSR and included in the D2D BSR. Alternatively, the LCID may be included in a MAC subheader indicating a MAC control element having the D2D BSR in a MAC PDU. The D2D BSR may also include a destination ID. The destination ID is the ID of a destination to which the UE wants to transmit a control and/or data packets through the D2D communication link. The destination ID may be a unicast address of an UE, group cast address of a group of UEs, or broadcast address.

If PUCCH resources are available for transmission of the D2D BSR, the resources for the D2D BSR may be obtained using a general method such as transmitting a scheduling request to the eNB or by transmitting a random access preamble to the eNB on an RACH.

Upon receipt of the D2D BSR, the eNB allocates resources for D2D transmission and transmits a grant for D2D transmission on a PDCCH or EPDCCH in a DL subframe corresponding to a UL subframe reserved for D2D communication. The PDCCH or EPDCCH is masked with the reserved C-RNTI. The UE pair ID may be included as an information field in the PDCCH or EPDCCH. The PDCCH or EPDCCH transmitted by the eNB may be received by another UE communicating with the UE transmitting the BSR as well as the UE transmitting the BSR. The eNB signals resources for direct communication between a UE pair in a DL frequency. The DL control region (that is, the PDCCH or EPDCCH) indicates resources for direct communication as well as resources for communication with the eNB. The resources for direct communication are indicated to the UEs of the UE pair by a single transmission. Resources are not indicated separately to each UE of the UE pair.

Resources may be allocated for each packet transmission on DL. The resources may also be allocated in a semi-static manner so that the allocated resources are valid during a plurality of TTIs. The resources may also be allocated in a static manner so that the determined resources are valid for the duration of a connection between the UEs.

A UE that performs direct communication with another UE monitors the DL control region for resource allocation using a reserved C-RNTI and a UE pair ID. A UE of a UE pair communicating with an eNB as well as with another UE monitors the DL control region for resource allocation using a C-RNTI, the reserved C-RNTI, and a UE pair ID. If selective subframes (DL, UL, or both DL and UL) are signaled or reserved for only direct communication, the UEs of the UE pair monitor the DL control region for resource allocation of the selective subframes for direct communication in respective DL subframes using the reserved C-RNTI and the UE pair ID. However, if the selective subframes are UL subframes, the UE may monitor these DL subframes using a C-RNTI assigned for communication with the eNB, for DL resource allocation. If the selective subframes are DL subframes, the UE may monitor these DL subframes using the C-RNTI assigned for communication with the eNB, for UL resource allocation. If the UE is also communicating with the eNB, the UE monitors the DL control region for DL/UL resource allocation using the C-RNTI assigned for communication with the eNB in other DL subframes.

Figure 27:
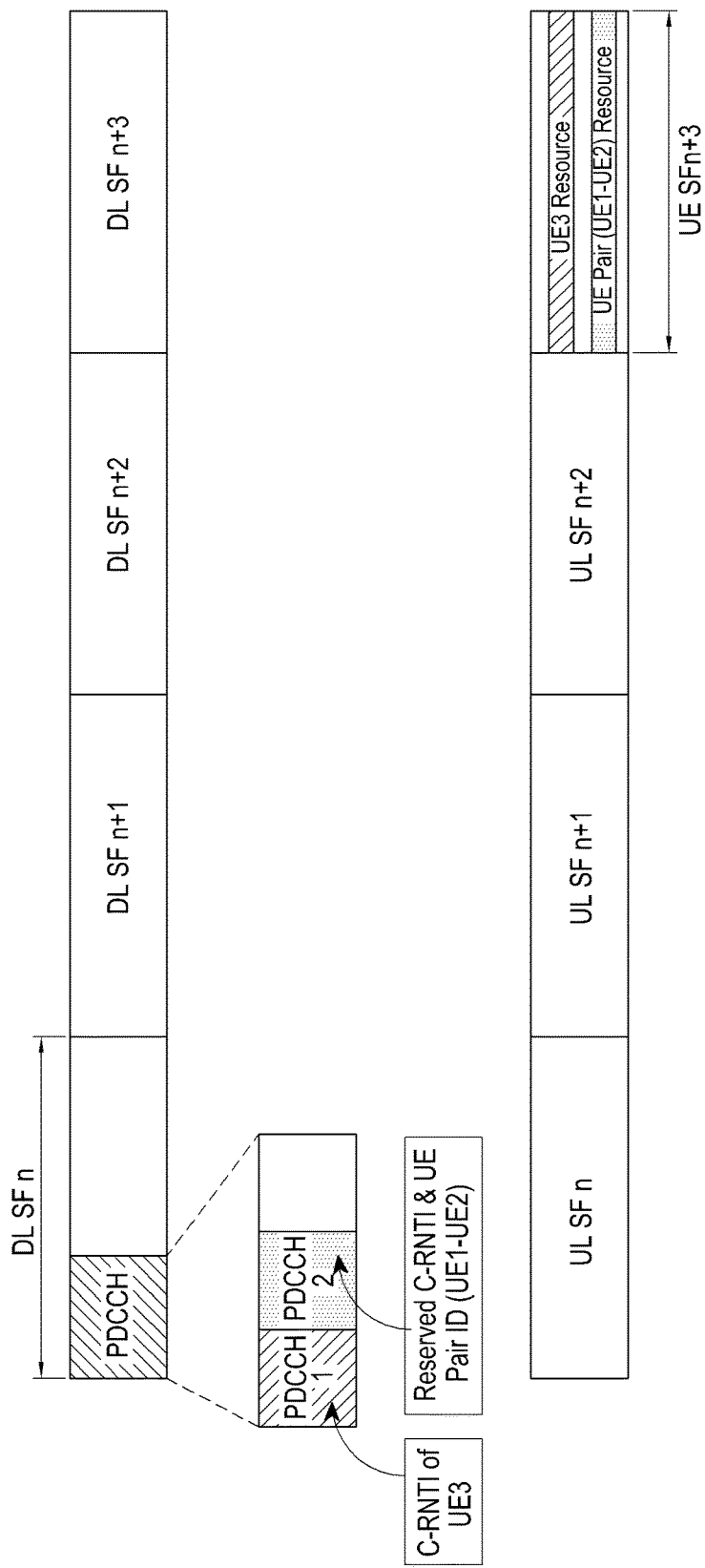
FIG. 27 illustrates an example of distinguishing resources for communication between a UE pair from resources for other UEs within the coverage area of an eNB according to an embodiment of the present disclosure.

FIG. 27 illustrates an example of distinguishing resources for communication between a UE pair from resources of other UEs within the coverage area of an eNB according to an embodiment of the present disclosure.

Referring to FIG. 27, UE1 and UE2 participate in direct communication using the UL frequency F2, and UE3 is communicating with the eNB using the UL frequency F2. UE3 monitors the DL subframe DL SF n using a C-RNTI whereas the UE1 and UE2 monitor the DL subframe DL SF n using a reserved C-RNTI (C-RNTI$_{UE\text{-}pairs}$). In FIG. 27, a control region of the DL subframe DL SF n indicates resources for the UL subframe UL SF n+3. The C-RNTI of UE3 and the reserved C-RNTI distinguish PDCCHs and UL resources for UE3 and the UE1-UE2 pair.

Figure 28:
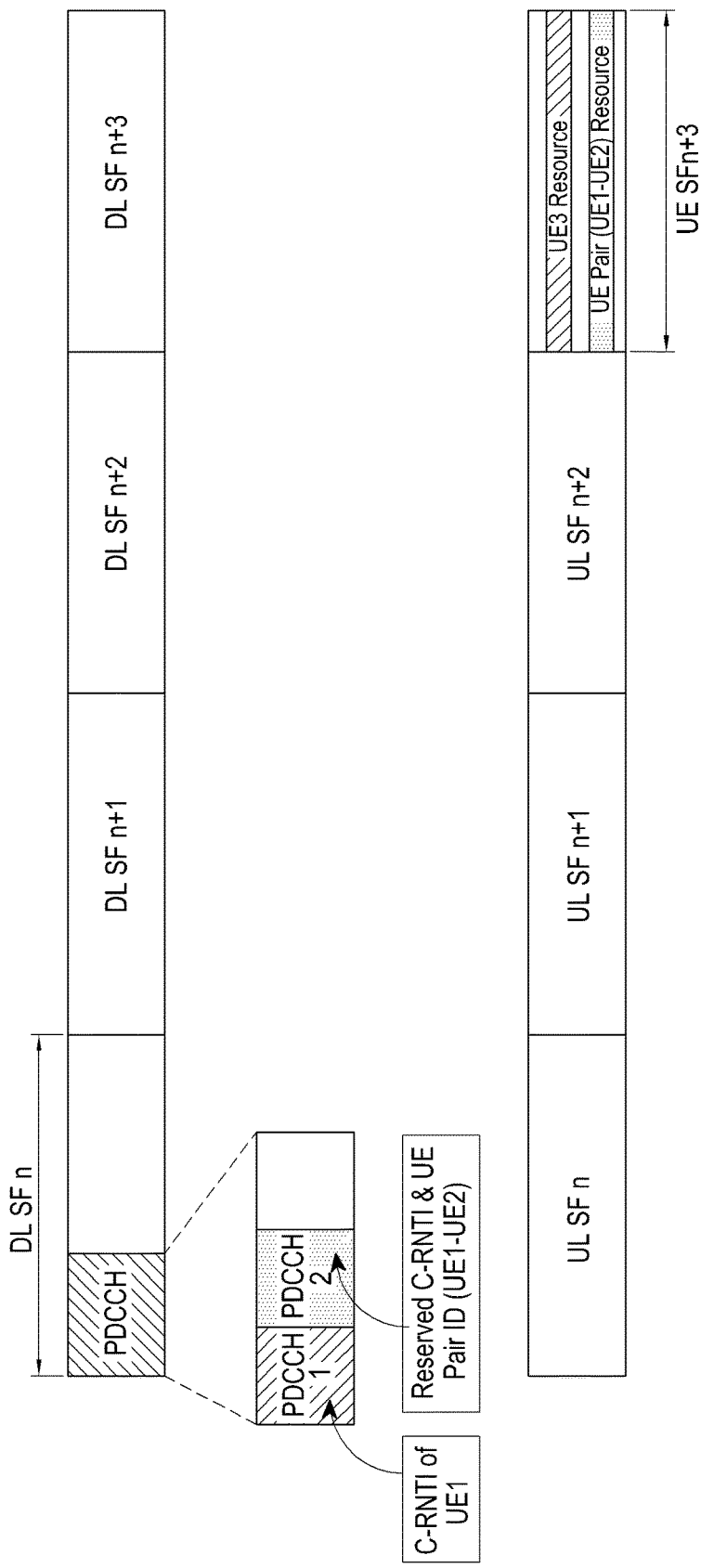
FIG. 28 illustrates an example of distinguishing resources for UE pair communication from resources for communication between the UEs of a UE pair and an eNB according to an embodiment of the present disclosure.

FIG. 28 illustrates an example of distinguishing resources for communication between a UE pair from resources for communication between a UE of the UE pair and an eNB according to an embodiment of the present disclosure.

Referring to FIG. 28, UE1 and UE2 participate in direct communication using the UL frequency F2 and UE1 is also communicating with the eNB using the UL frequency F2. UE1 monitors the DL subframe DL SF n using a C-RNTI and a reserved C-RNTI. In FIG. 28, a control region of the DL subframe DL SF n indicates resources for the UL subframe UL SF n+3. The C-RNTI of UE1 and the reserved C-RNTI distinguish PDCCHs and UL resources for UE1 for direct communication with UE2 and for communication with the eNB.

Figure 29:
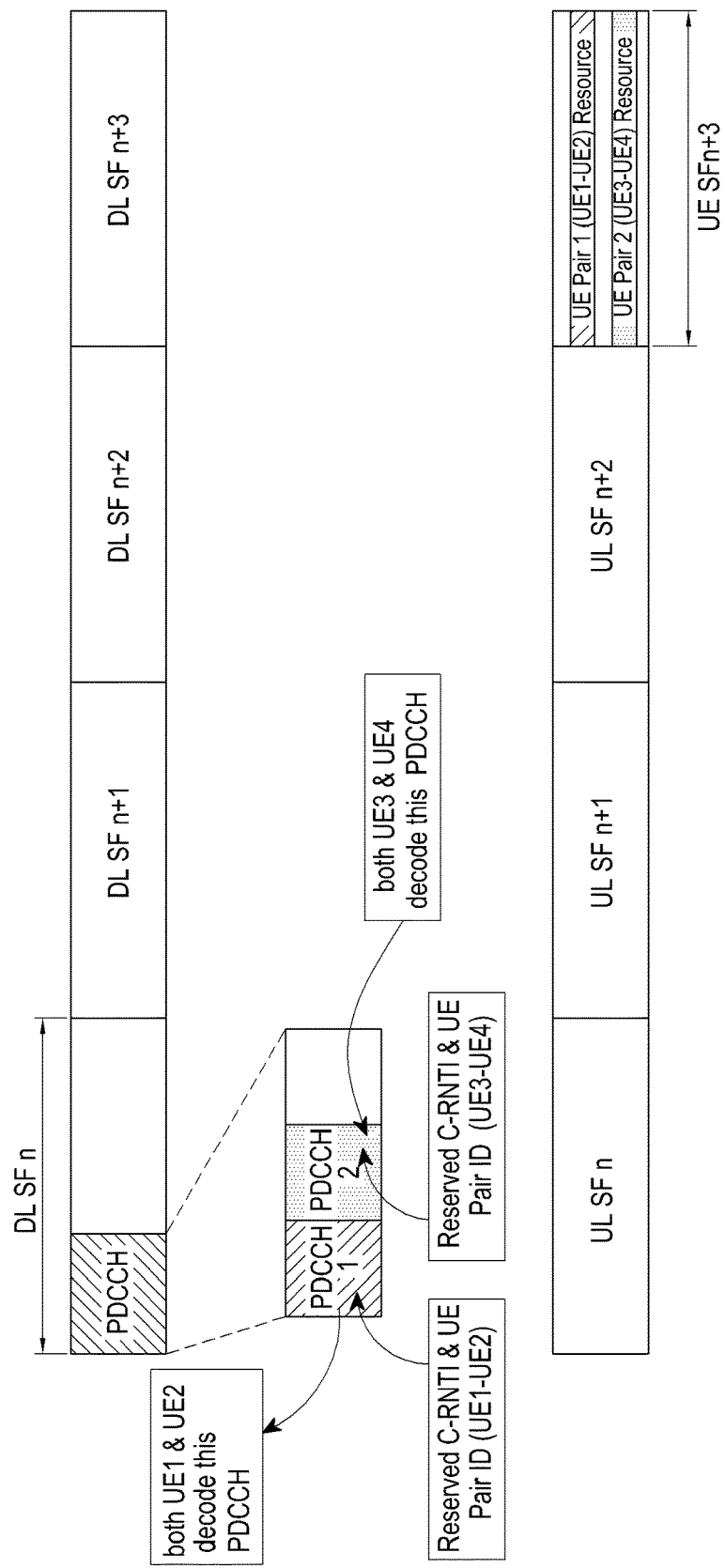
FIG. 29 illustrates an example of distinguishing resources for UE pair communication from resources for other UE pair communication according to an embodiment of the present disclosure.

FIG. 29 illustrates an example of distinguishing resources for communication between one UE pair from resources for communication between another UE pair according to an embodiment of the present disclosure.

Referring to FIG. 29, UE1 and UE2 participate in direct communication using the UL frequency F2, and UE3 and UE4 participate in direct communication using the UL frequency F2. UE1 and UE2 of the UE1-UE2 pair monitor the DL subframe DL SF n using their UE pair ID and a reserved C-RNTI. UE3 and UE4 of the UE3-UE4 pair monitor the DL subframe DL SF n using their UE pair ID and the reserved C-RNTI. The reserved C-RNTI and UE pair ID of the UE1-UE2 pair, and the reserved C-RNTI and UE pair ID of the UE3-UE4 pair distinguish PDCCHs and UL resources for the UE1-UE2 pair and the UE3-UE4 pair.

Resources for direct communication are signaled to the UEs of a UE pair by a single transmission using a reserved C-RNTI and a UE pair ID assigned to the UE pair. However, upon receipt of information about the resources using the reserved C-RNTI and the UE pair ID, each UE of the UE pair does not know whether to transmit or receive data in the resources. Accordingly, a method for identifying Tx resources and Rx resources when a reserved C-RNTI and a UE pair ID are used will be described.

In unidirectional communication, Tx and Rx roles between the UEs of a UE pair are predetermined or indicated by direct path setup signaling. For example, for a UE1-UE2 pair, UE1 may be a transmitter and UE2 may be a receiver. An eNB transmits resources for the UE1-UE2 pair using a reserved C-RNTI and a UE pair ID assigned to the UE1-UE2 pair. Both UE1 and UE2 receive resource allocation information in a control region of a DL frequency using the reserved C-RNTI and the UE pair ID. UE1 and UE2 receive the same PDCCH and use allocated resources according to their Tx and Rx roles determined during the direct path setup. That is, UE1 uses the allocated resources for transmission and UE2 uses the allocated resources for reception.

In bidirectional communication, each UE of a UE pair plays Tx and Rx roles. The eNB assigns a 1-bit UE index (UE_idx) to each UE in addition to a UE pair ID. For example, for a UE1-UE2 pair, UE_idx=0 for UE1 and UE_idx=1 for UE2. The eNB signals resources for the UE1-UE2 pair using a reserved C-RNTI and a UE pair ID assigned to the UE1-UE2 pair. The eNB adds the UE index to resource allocation signaling. The UE index identifies a UE to transmit data in the allocated resources. The UE index may be used in CRC masking of a PDCCH or may be included as an information field in the decoded PDCCH. UE1 and UE2 receive the same PDCCH and use the allocated resources using their UE indexes assigned by the network during direct path setup.

Or the eNB may assign two UE pair IDs to the UEs of the UE pair in order to distinguish Tx resources from Rx resources in bidirectional communication in which the UEs of the UE pair play the Tx and Rx roles. For example, if UE1 operates as a transmitter, UE pair ID 1 is assigned to UE1 and if UE1 operates as a receiver, UE pair ID 2 is assigned to UE1. If UE2 operates as a receiver, UE pair ID 1 is assigned to UE2 and if UE2 operates as a transmitter, UE pair ID 2 is assigned to UE2. The eNB transmits resources for the UE1-UE2 pair using the reserved C-RNTI and one of the UE pair IDs assigned to the UE1-UE2 pair. If UE1 has to use allocated resources for transmission and UE2 has to receive using the allocated resources, the eNB uses the reserved C-RNTI and UE pair ID 1. If UE2 has to use allocated resources for transmission and UE1 has to receive using the allocated resources, the eNB uses the reserved C-RNTI and UE pair ID 2.

A UE pair ID may be used together with a UE index in a measurement report, a BSR, a resource request, and the like transmitted to an eNB. The eNB may uniquely identify a UE and a communication link of the UE for which the report or request is transmitted. Similarly, the eNB may use the UE pair ID in DL signaling to the UE. If the measurement report, the BSR, the resource request, and the like are for communication between the UE and the eNB, the UE transmits the measurement report, the BSR, the resource request, and the like to the eNB using a C-RNTI assigned for communication with the eNB. If the measurement report, the BSR, the resource request, and the like are for direct communication between the UEs of the UE pair, the UE transmits the measurement report, the BSR, the resource request, and the like to the eNB using the UE pair ID together with a UE index.

If two UE pair IDs are assigned to a UE pair, a UE of the UE pair may use the two UE pair IDs for transmitting a measurement report, a BSR, a resource request, and the like to the eNB. If the measurement report, the BSR, the resource request, and the like are for communication between the UE and the eNB, the UE transmits the measurement report, the BSR, the resource request, and the like to the eNB using a C-RNTI assigned for communication with the eNB. If the measurement report, the BSR, the resource request, and the like are for direct communication between the UEs of the UE pair, the UE transmits the measurement report, the BSR, the resource request, and the like to the eNB using the two UE pair IDs. The eNB may then uniquely identify the UE and the communication link of the UE for which the reports or request is transmitted. Similarly, the eNB may use the two UE pair IDs in DL signaling to the UE.

A description will be given of a method for allocating a UE index and a UE pair ID.

Figure 30:
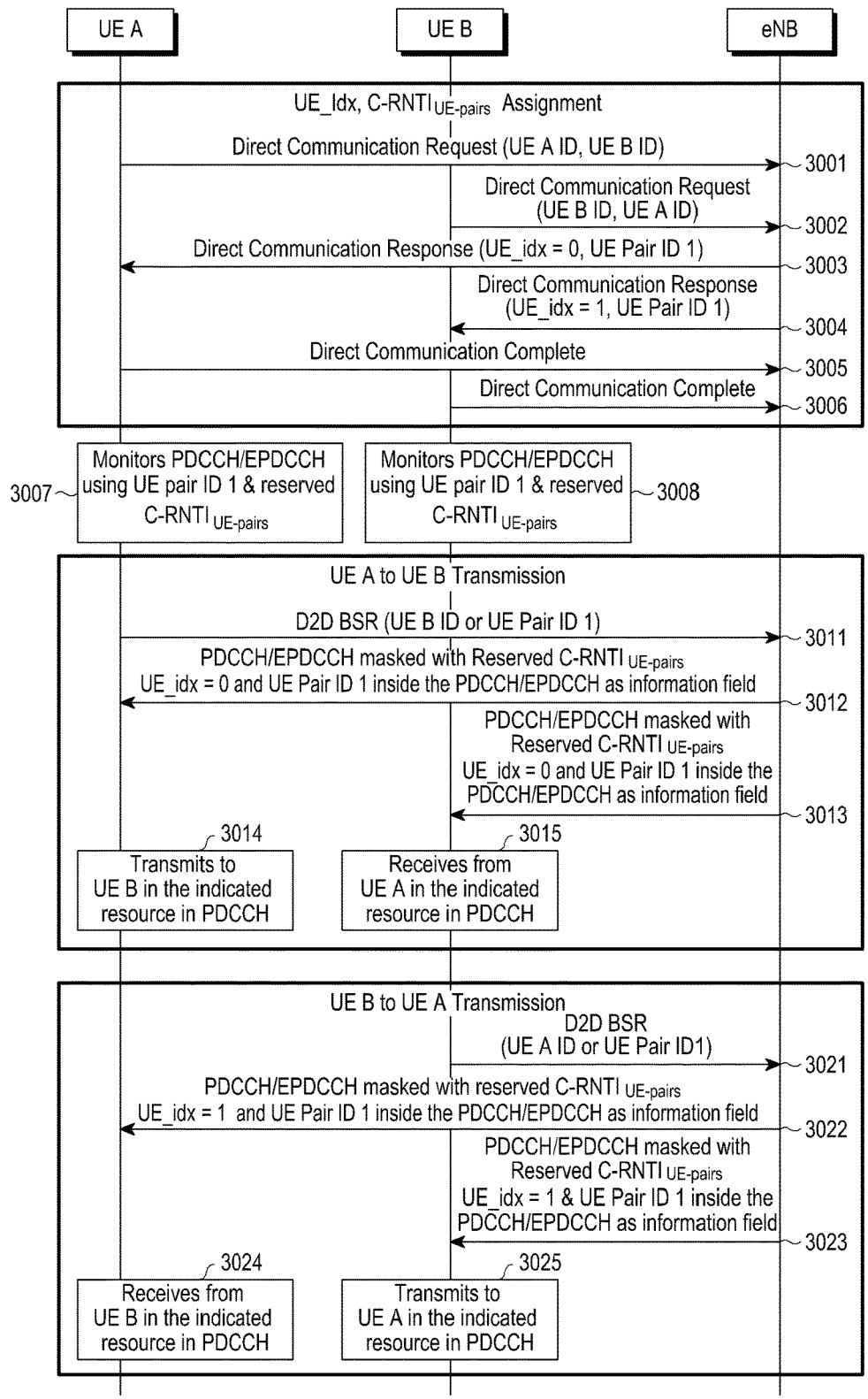
FIG. 30 illustrates a method for allocating a UE index and a UE pair ID in allocating resources for D2D communication within a cell according to an embodiment of the present disclosure.

FIG. 30 illustrates a method for allocating UE index and a UE pair ID in allocating resources for D2D communication within a cell according to an embodiment of the present disclosure.

Referring to FIG. 30, UE A and UE B transmit direct communication request messages to an eNB respectively in operations 3001 and 3002. Each of UE A and UE B includes the UE ID of the UE B and the UE ID of UE A in its direct communication request message. The order of the transmissions of the direct communication request messages from UE A and UE B to the eNB may be changed. One UE may acquire the UE ID of another UE with which it wants to communicate in the following manner.

UE A initiates direct communication setup with UE B on a D2D communication link. UE A transmits a direct communication request message including its UE ID. The UE ID may be an ID of the UE specific to D2D communication or may be some other UE ID which identifies the UE. The UE ID may also be an application user ID of the UE. If UE B accepts the communication request from UE A, UE B transmits a direct communication response message including its UE ID to UE A. UE A and UE B may know each other's UE ID as a part of a discovery message. UE A and UE B may periodically transmit discovery messages. The UE IDs of UEs with which the UE wants to communicate may be preconfigured in the UE.

Upon receipt of the direct communication request message from UE A, the eNB verifies the direct communication request message and then assigns UE pair ID=1 and UE_idx=0 to UE A. The eNB transmits the assigned UE pair ID and UE index to UE A in a direct communication response message in operation 3003. The eNB may transmit other parameters related to direct communication in the direct communication response message. Upon receipt of the direct communication request message from UE B, the eNB verifies the direct communication request message and then assigns UE pair ID=1 and UE_idx=1 to UE B. The eNB sends the assigned UE pair ID and UE index to UE B in a direct communication response message in operation 3004. The eNB may transmit other parameters related to direct communication in the direct communication response message.

Upon receipt of the direct communication response messages, UE A and UE B transmit direct communication complete messages to the eNB in operations 3005 and 3006. UE A and UE B perform operations using the assigned UE pair ID and UE indexes. UE A and UE B monitor a PDCCH or EPDCCH using UE pair ID 1 and a reserved C-RNTI, C-RNTI$_{UE\text{-}pairs}$ in operations 3007 and 3008. This monitoring may be added to monitoring a PDCCH or EPDCCH using C-RNTIs assigned to UE A and UE B for UE-eNB communication.

If UE A wants to transmit data to UE B on the D2D communication link, UE A transmits a D2D BSR to the eNB in operation 3011. The D2D BSR includes the ID of UE B or UE pair ID 1. Upon receipt of the D2D BSR, the eNB transmits a grant in a PDCCH or EPDCCH masked with UE pair ID 1 and a UE index in operations 3012 and 3013. The PDCCH or EPDCCH may be received by both UE A and UE B. As the UE index corresponds to UE A, UE A transmits data in allocated resources in operation 3014 and UE B receives data in the allocated resources in operation 3015. UE pair ID 1 indicates that the resources are for communication between UE A and UE B.

If UE B wants to transmit data to UE A on the D2D communication link, UE B transmits a D2D BSR to the eNB in operation 3021. The D2D BSR includes the ID of UE A or UE pair ID 1. Upon receipt of the D2D BSR, the eNB transmits a grant in a PDCCH or EPDCCH masked with UE pair ID 1 and a UE index in operations 3022 and 3023. The PDCCH or EPDCCH may be received by both UE A and UE B. As the UE index corresponds to UE B, UE B transmits data in allocated resources in operation 3024 and UE A receives data in the allocated resources in operation 3025. UE pair ID 1 indicates that the resources are for communication between UE A and UE B.

If both unidirectional communication and bidirectional communication are supported, the eNB may assign a UE index only in the case of bidirectional communication. A UE may indicate to the eNB whether the communication is bidirectional or unidirectional in a direct communication request message.

Figure 31:
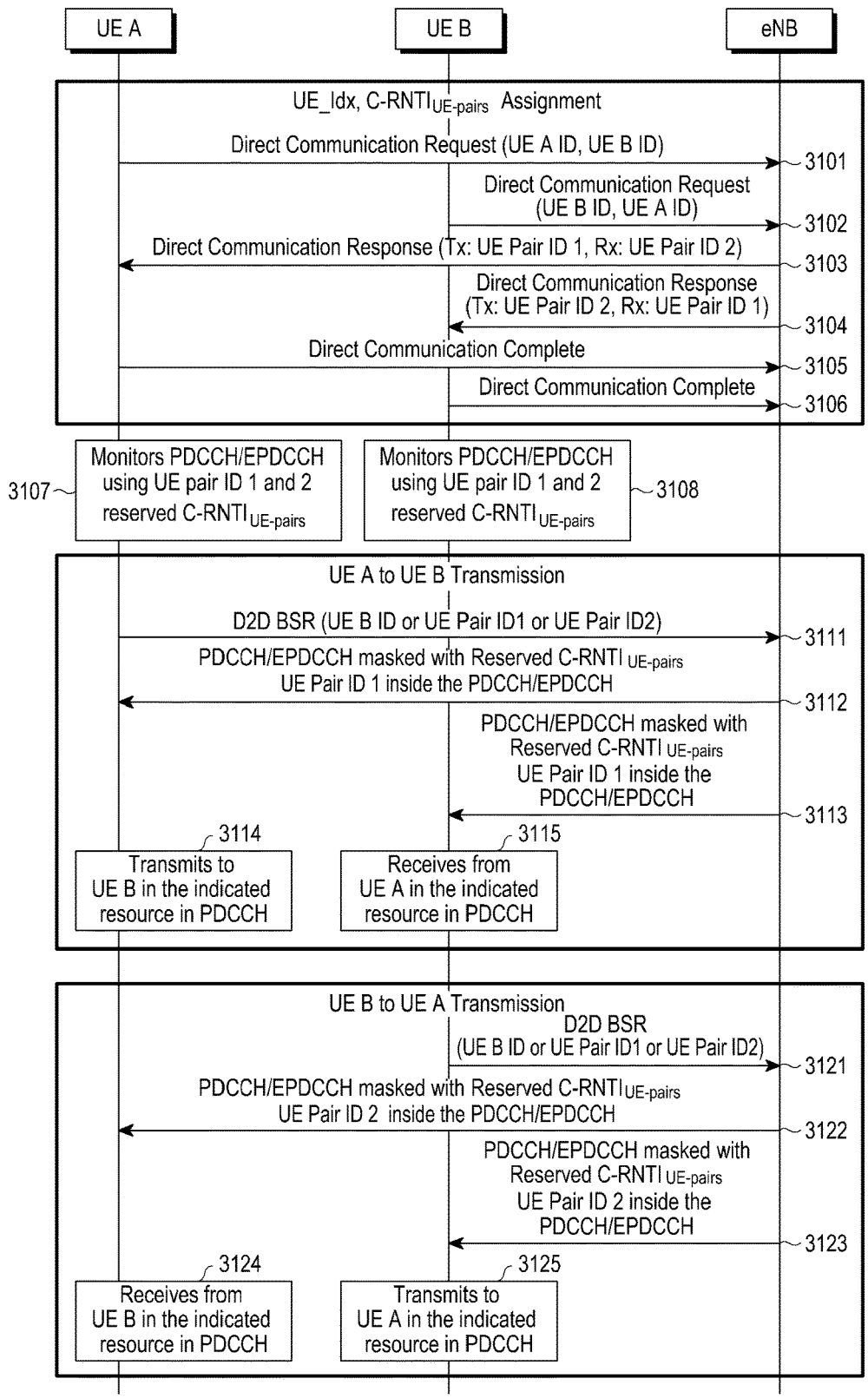
FIG. 31 illustrates an operation for allocating a transmission UE pair ID and a reception UE pair ID according to an embodiment of the present disclosure.

FIG. 31 illustrates an operation for allocating a Tx UE pair ID and an Rx UE pair ID according to an embodiment of the present disclosure.

Referring to FIG. 31, UE A and UE B transmit direct communication request messages to an eNB respectively in operations 3101 and 3102. Each of UE A and UE B includes the UE ID of the UE B and the UE ID of UE A in its direct communication request message. The order of the transmissions of the direct communication request messages from UE A and UE B to the eNB may be changed. A UE may acquire the UE ID of another UE with which it wants to communicate in the following manner.

UE A initiates direct communication establishment with UE B on a D2D communication link. UE A transmits a direct communication request message including its UE ID. The UE ID may be an ID of the UE specific to D2D communication or may be some other UE ID which identifies the UE. The UE ID may also be an application user ID of the UE. If UE B accepts the communication request from UE A, UE B transmits a direct communication response message including its UE ID to UE A. UE A and UE B may know each other's UE ID as a part of a discovery message. UE A and UE B may periodically transmit discovery messages. The UE IDs of UEs with which the UE wants to communicate may be preconfigured in the UE.

Upon receipt of the direct communication request message from UE A, the eNB verifies the direct communication request message and then assigns Tx UE pair ID 1 and Rx UE pair ID 2 to UE A. The eNB transmits the assigned Tx UE pair ID and Rx UE pair ID to UE A in a direct communication response message in operation 3103. The eNB may transmit other parameters related to direct communication in the direct communication response message. Upon receipt of the direct communication request message from UE B, the eNB verifies the direct communication request message and then assigns Tx UE pair ID 2 and Rx UE pair ID 1 to UE B. The eNB transmits the assigned Tx UE pair ID and Rx UE pair ID to UE B in a direct communication response message in operation 3104. The eNB may transmit other parameters related to direct communication in the direct communication response message.

Upon receipt of the direct communication response messages, UE and UE B transmit direct communication complete messages to the eNB respectively in operations 3105 and 3106. UE A and UE B perform operations using the assigned Tx UE pair IDs and Rx UE pair IDs. UE A and UE B monitor a PDCCH or EPDCCH using the Tx UE pair IDs, Rx UE pair IDs, and a reserved C-RNTI in operations 3107 and 3108. This monitoring may be added to monitoring a PDCCH or EPDCCH using C-RNTIs assigned to UE A and UE B for UE-eNB communication.

If UE A wants to transmit data to UE B on the D2D communication link, UE A transmits a D2D BSR to the eNB in operation 3111. The D2D BSR may include the ID of UE B, UE pair ID 1, or UE pair ID 2. Upon receipt of the D2D BSR, the eNB transmits a grant in a PDCCH or EPDCCH masked with the reserved C-RNTI and UE pair ID 1 in operations 3112 and 3113. The PDCCH or EPDCCH may be received by both UE A and UE B. As UE pair ID 1 corresponds to the Tx UE pair ID of UE A, UE A transmits data in allocated resources in operation 3114 and UE B receives data in the allocated resources in operation 3115.

If UE B wants to transmit data to UE A on the D2D communication link, UE B transmits a D2D BSR to the eNB in operation 3121. The D2D BSR may include the ID of UE A, UE pair ID 1, or UE pair ID 2. Upon receipt of the D2D BSR, the eNB transmits a grant in a PDCCH or EPDCCH masked with the reserved C-RNTI and UE pair ID 2 in operations 3122 and 3123. The PDCCH or EPDCCH may be received by both UE A and UE B. As UE pair ID 2 corresponds to the Tx UE pair ID of UE B, UE B transmits data in allocated resources in operation 3124 and UE A receives data in the allocated resources in operation 3125.

While UL subframes are used for direct communication in the foregoing description and drawings, the present disclosure is equally applicable for the cases in which DL subframes or both DL and UL subframes are used for direct communication. The present disclosure is also applicable to a system operating in FDD mode or TDD mode.

In an embodiment in which two UE pair IDs are assigned to a UE pair, one may be semi-persistently scheduled and the other may be normally scheduled. In another embodiment in which a UE pair is assigned one UE pair ID, it may be semi-persistently scheduled or normally scheduled.

Embodiment 5

A fourth embodiment of the present disclosure provides a method for identifying Tx resources and Rx resources using a unified C-RNTI (same C-RNTI for D2D communication and communication with eNB). In this embodiment resource information is indicated to both UEs of UE pair using single control channel transmission by eNB. In this embodiment it is assumed that both UEs of UE pair is connected with same eNB.

In the fourth embodiment of the present disclosure, it is assumed that selective subframes (DL or UL or both) are signaled or reserved for only direct communication. A UE(s) does not use these selected subframes to communicate with an eNB. The granularity of reservation for direct communication may be frames, slots, or symbols. An eNB assigns one unified C-RNTI to a UE for all types of communications (for example, communication between a UE and an eNB, communication between a UE and one or more other UEs, and communication between a UE and an eNB and one or more other UEs). A C-RNTI is assigned to the UE when it establishes a connection with the eNB or with another UE. If the UE already has a connection either with the eNB or the other UE, then a new C-RNTI is not assigned during subsequent connection establishment with the UE or the eNB. The assigned unified C-RNTI is released only when the UE has no connection with any other UE and the eNB. Even if the unified C-RNTI is established during connection setup with the eNB, it is not released during the connection release with the eNB if the UE has a direct connection with at least one other UE. If the C-RNTI established during the connection setup with the eNB is released during the connection release with the eNB and if the UE has a direct connection with at least one other UE, a new C-RNTI is assigned to the UE. The unified C-RNTI may be a temporary C-RNTI, a semi-persistently scheduled C-RNTI, or a C-RNTI.

Figure 32:
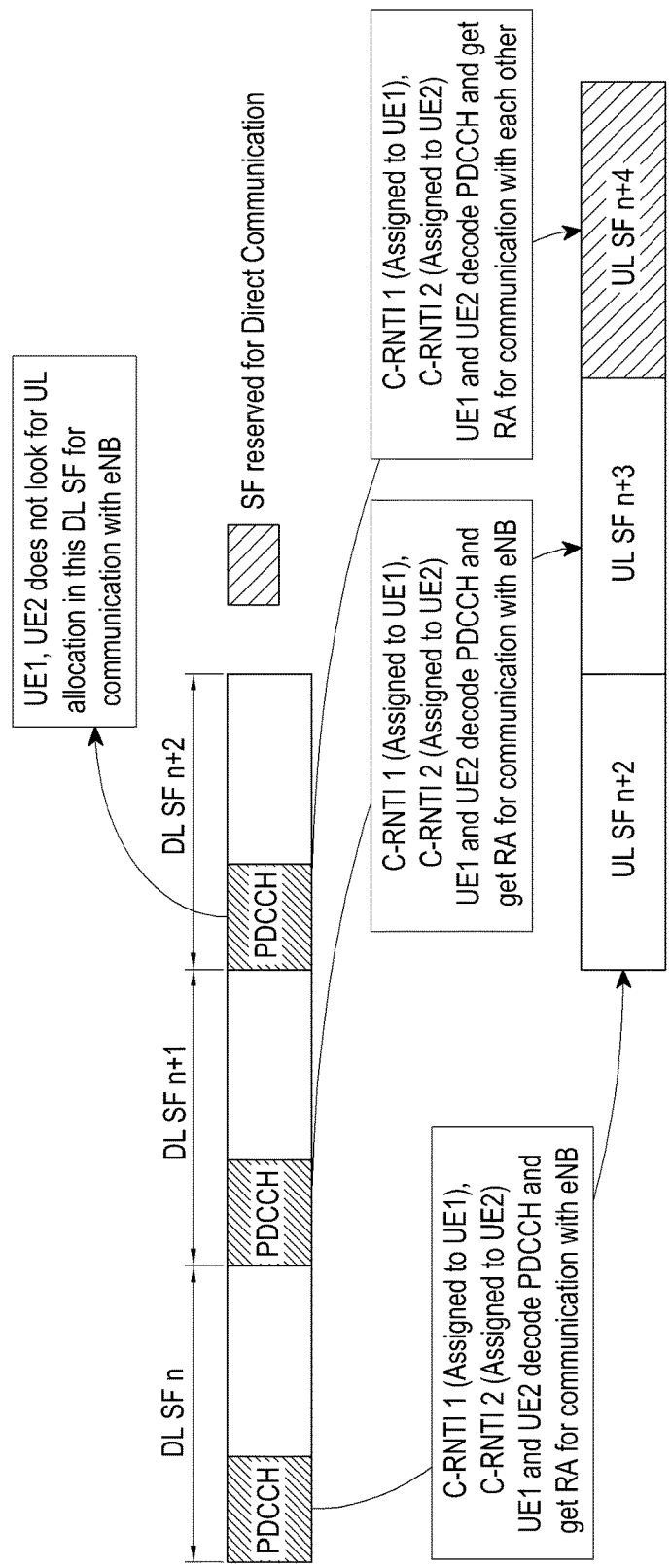
FIG. 32 illustrates a method for using a unified C-RNTI for direct communication according to an embodiment of the present disclosure.

FIG. 32 illustrates a method for using a unified C-RNTI for direction communication according to an embodiment of the present disclosure.

Referring to FIG. 32, C-RNTI 1 and C-RNTI 2 are assigned to UE1 and UE2, respectively for communication with an eNB. UE1 and UE2 use the assigned C-RNTIs (i.e. C-RNTI 1 and C-RNTI 2) to receive and decode a PDCCH in the DL subframes, DL SF n and DL SF n+1 to receive resources for transmitting data in the UL subframes, UL SF n+2 and UL SF n+3, respectively. UE1 and UE2 also use the assigned C-RNTIs (i.e. C-RNTI 1 and C-RNTI 2) to receive and decode a PDCCH in the DL subframes, DL SF n and DL SF n+1 to receive resources for receiving DL packets in the DL subframes, DL SF n and DL SF n+1 respectively. The same C-RNTI (i.e. C-RNTI 1) as assigned to UE1 is assigned to UE pair x. The UEs of UE pair x use C-RNTI 1 in the DL subframe, DL SF n+2 to receive resources for direct communication in the UL subframe, UL SF n+4. UE1 does not use C-RNTI 1 in the DL subframe, DL SF n+2 to receive resources for transmitting data in the UL subframe, UL SF n+4. However, UE1 may use C-RNTI 1 in the DL subframe, DL SF n+2 to receive resources for receiving DL packets in the DL subframe, DL SF n+3.

A method for resource allocation signaling and identifying a transmitting UE and a receiving UE of UE Pair will be described below.

An eNB allocates resources for direct communication between a UE pair. A control region (that is, a PDCCH) indicates resources for direct communication as well as resources for communication with the eNB. The resources for direct communication are indicated to the UEs of the UE pair using a single transmission. In an embodiment of the present disclosure, a C-RNTI of a transmitting UE amongst the UEs of the UE pair is used in a PDCCH to indicate resources for direct communication. The transmitting and receiving UEs of the UE pair receive and decode the PDCCH using the C-RNTI of the transmitting UE. The UEs of the UE pair exchange each other's C-RNTI during connection setup either directly or via the network.

The transmitting UE may participate in direct communication with a plurality of UEs. For example, a transmitting UE, UE1 may be connected to UE2 and UE3. If the C-RNTI of UE1 is used to indicate the resources, then a method is needed to determine whether the allocated resources will be used by UE1 to transmit data to UE2 or UE3. A method is also needed to determine whether UE2 or UE3 should receive the indicated resources using the C-RNTI of UE1. For this purpose, the eNB assigns a Tx/Rx index (Tx-Rx-Idx) to each UE performing the Tx role in direct communication. The Tx/Rx index is independently maintained for each UE performing the Tx role. The Tx/Rx index of a UE distinguishes a plurality of connections of the UE with other UEs. For example, if UE1 is connected to UE2 and UE3 and transmits data to both UE2 and UE3, the Tx/Rx index of UE1 for a UE1-UE2 connection may be 0 whereas the Tx/Rx index of UE1 for a UE1-UE3 connection may be 1. A Tx/Rx index is assigned at the time of connection establishment between the UEs of a UE pair. A Tx/Rx index is assigned to each UE of a UE pair.

Figure 33:
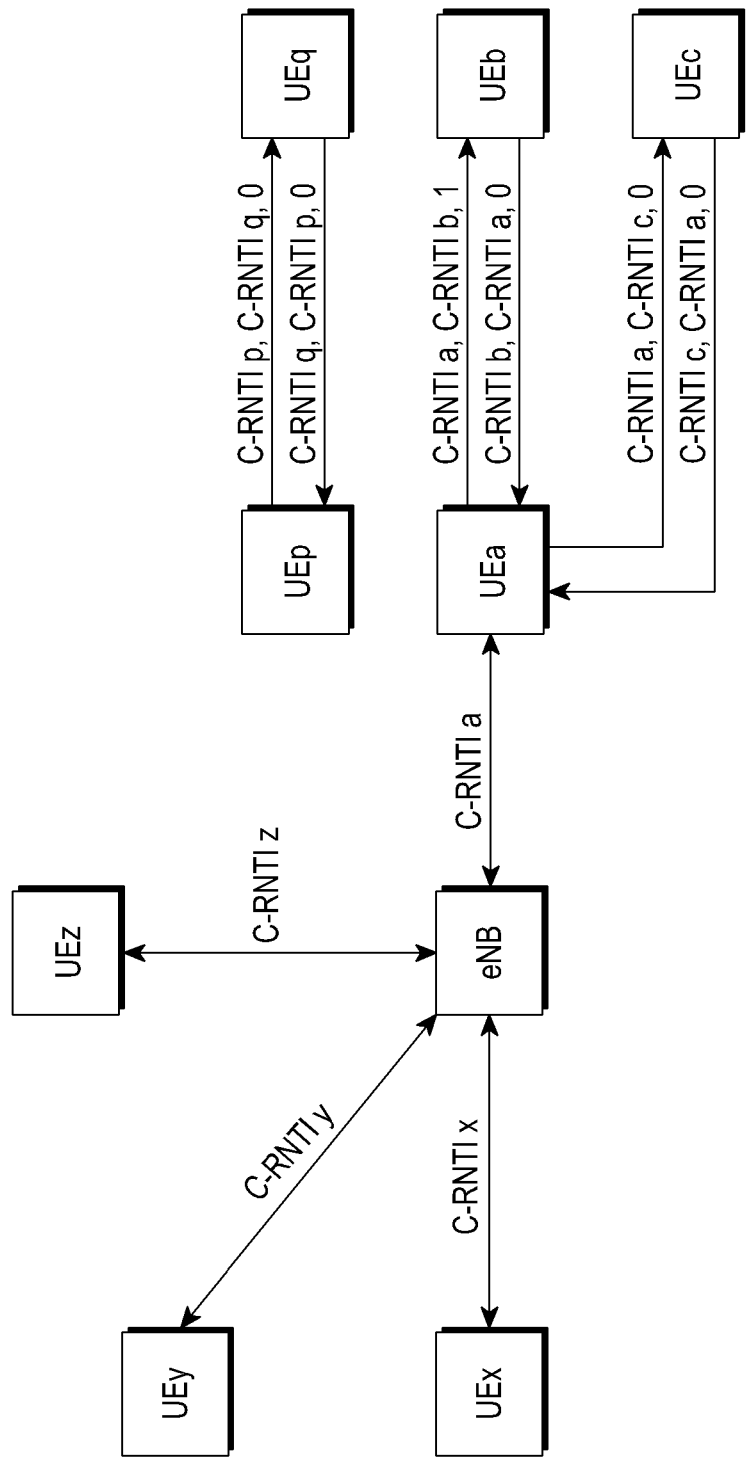
FIG. 33 illustrates an example of using a unified C-RNTI and a transmission and reception index for direct communication according to an embodiment of the present disclosure.

FIG. 33 illustrates an example of using a unified C-RNTI and a Tx/Rx index for direct communication according to an embodiment of the present disclosure.

Referring to FIG. 33, for a pair of UEp and UEq, the Tx/Rx indexes of both UEp and UEq are 0 because UEp and UEq are not connected to any other UE. For a pair of UEa and UEc, the Tx/Rx indexes of both UEa and UEc are 0 because UEc is not connected to any other UE and for UEa, the connection with UEc is the first connection. For a pair of UEa and UEb, the Tx/Rx index of UEa is 1 and the Tx/Rx index of UEb is 0. UEb is not connected to any other UE and hence its Tx/Rx index is 0. UEa has connections with UEb and UEc and hence its Tx/Rx index for the connection with UEb is 1.

Figure 34:
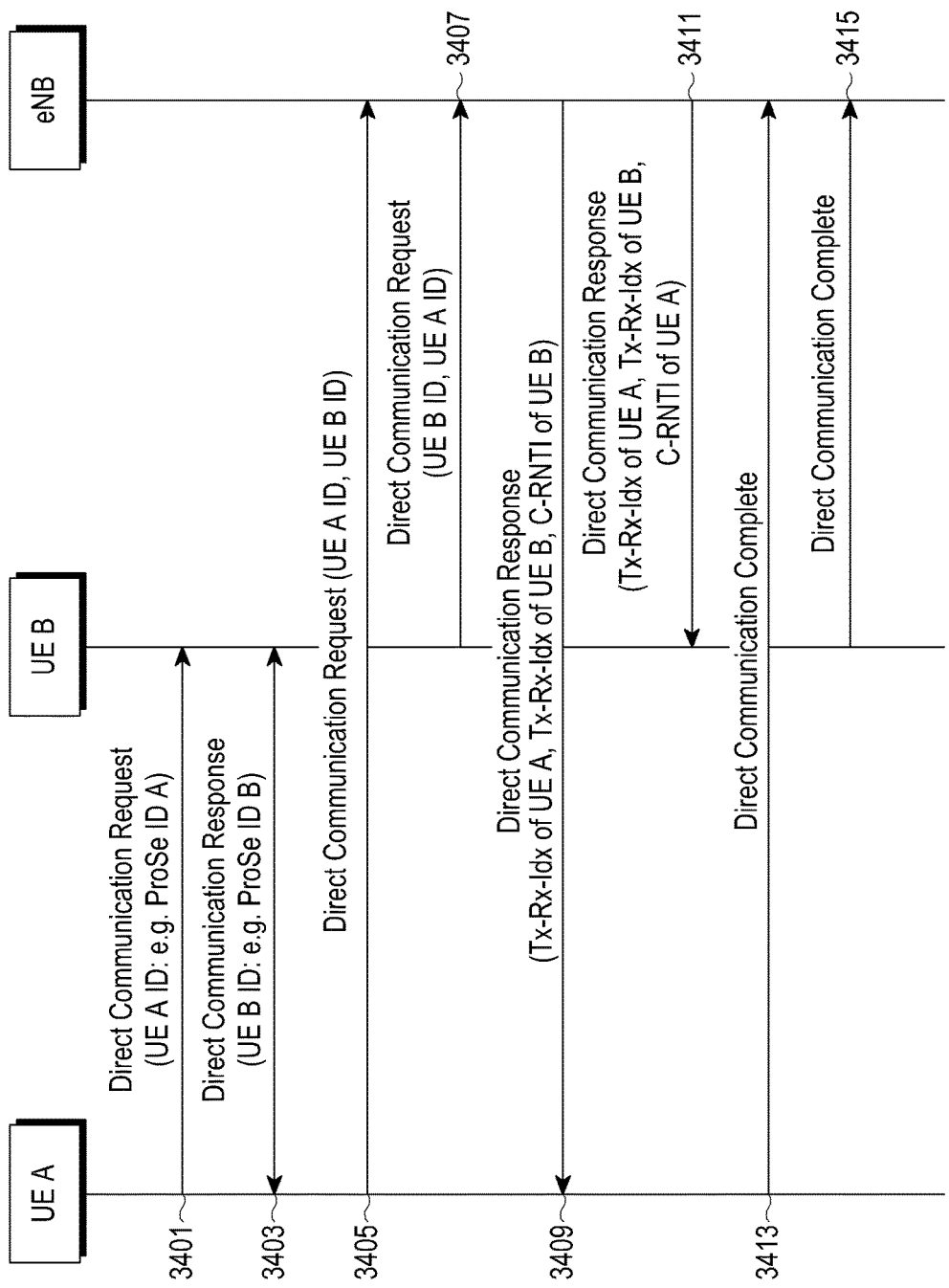
FIG. 34 is a diagram illustrating a signal flow for allocating a transmission and reception index in allocating resources for D2D communication within a cell according to an embodiment of the present disclosure.

FIG. 34 is a diagram illustrating a signal flow for allocating a Tx/Rx index in allocating resources for D2D communication within a cell according to an embodiment of the present disclosure.

Referring to FIG. 34, UE A initiates direct communication establishment with UE B and transmits a direct communication request message including its UE ID to UE B in operation 3401. According to an embodiment, the UE ID may be an ID assigned to UE A for ProSe communication (that is, a ProSe UE ID). Or the UE ID may be an idle mode ID assigned to UE A (that is, an S-TMSI). Or the UE ID may be a GUTI assigned to UE A. If UE B accepts the direct communication request from UE A, UE B transmits a direct communication response message including its UE ID to UE A, in operation 3403. UE A and UE B transmit direct communication request messages to an eNB respectively in operations 3405 and 3407. Each of UE A and UE B includes the UE IDs of the UE B and UE A in its direct communication request message. The order of operations 3405 and 3407 may be changed.

Upon receipt of the direct communication request message from UE A, the eNB verifies the direct connection request message, assigns Tx/Rx indexes to UE A and UE B, and transmits the assigned Tx/Rx indexes and the C-RNTI of UE B to UE A in a direct communication response message in operation 3409. The C-RNTI of UE B may be included only if the C-RNTI is newly assigned to UE B. If a C-RNTI has not been assigned to UE B yet, eNB1 assigns the C-RNTI to UE B. The eNB may transmit other parameters related to direct communication in the direct communication response message to UE A. Upon receipt of the direct communication response message from the eNB, UE A transmits a direct communication complete message to the eNB in operation 3413.

Likewise, upon receipt of the direct communication request message from UE B, the eNB verifies the direct connection request message, assigns the Tx/Rx indexes to UE A and UE B, and transmits the assigned Tx/Rx indexes and the C-RNTI of UE A to UE B in a direct communication response message in operation 3411. The C-RNTI of UE A may be included only if the C-RNTI is newly assigned to UE A. If a C-RNTI has not been assigned to UE A yet, the eNB assigns the C-RNTI to UE A. The eNB may transmit other parameters related to direct communication in the direct communication response message to UE B. Upon receipt of the direct communication response message from the eNB, UE B transmits a direct communication complete message to the eNB in operation 3415. Subsequently, UE A and UE B perform D2D communication using the assigned Tx/Rx indexes and C-RNTIs.

The C-RNTIs may be exchanged between UE A and UE B during direct communication request and response signaling between UE A and UE B.

Figure 35:
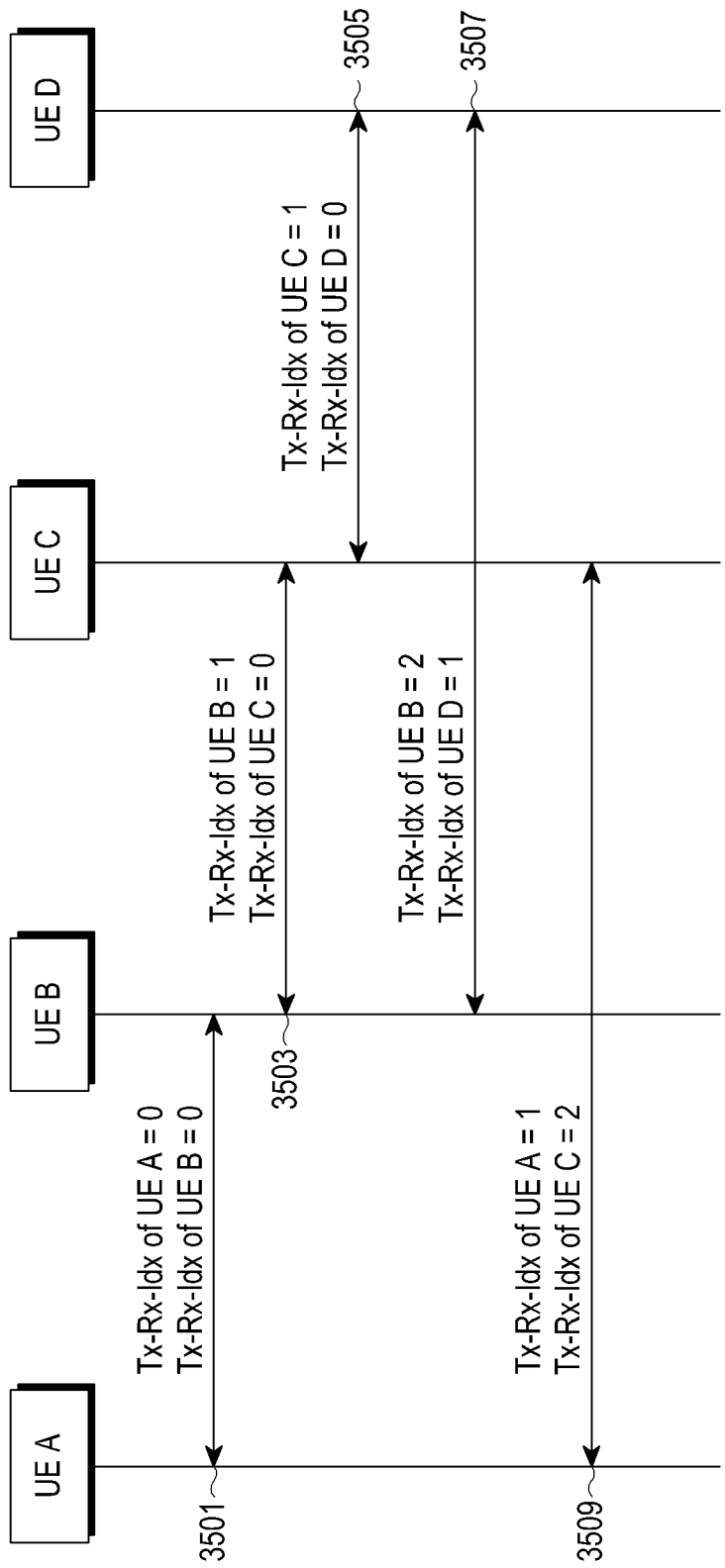
FIG. 35 is a diagram illustrating a signal flow for allocating transmission and reception indexes to UEs according to an embodiment of the present disclosure.

FIG. 35 is a diagram illustrating a signal flow for allocating Tx-Rx indexes to UEs according to an embodiment of the present disclosure.

Referring to FIG. 35, five connections are sequentially established among UE A, UE B, UE C and UE D in operations 3501 to 3509. The first connection for bidirectional communication is established between UE A and UE B in operation 3501. This connection is the first connection between UE A and UE B for which they perform a Tx role and hence each of them is assigned Tx_Rx_Idx 0. The second connection for bidirectional communication is established between UE B and UE C in operation 3503. UE B performs a Tx role for the earlier connection with UE A and a new connection with UE C. So UE B is assigned Tx_Rx_Idx 1 for the connection with UE C. For UE C, the connection with UE B is the first connection and hence it is assigned Tx_Rx_Idx 0. The third connection for bidirectional communication is established between UE C and UE D in operation 3505. UE C performs a Tx role for the earlier connection with UE B and a new connection with UE D. So UE C is assigned Tx_Rx_Idx 1 for the connection with UE D. For UE D, the connection with UE C is the first connection and hence it is assigned Tx_Rx_Idx 0. The fourth connection for bidirectional communication is established between UE B and UE D in operation 3507. UE B performs a Tx role for the earlier connections with UE A and UE B and a new connection with UE D. So UE B is assigned Tx_Rx_Idx 2 for the connection with UE D. UE D performs a Tx role for the earlier connection with UE C and a new connection with UE B. So UE D is assigned Tx_Rx_Idx 1 for the connection with UE B. The fifth connection for bidirectional communication is established between UE A and UE C in operation 3509. UE C performs a Tx role for the earlier connection with UE D and UE B and a new connection with UE A. So UE C is assigned Tx_Rx_Idx 2 for the connection with UE A. UE A performs a Tx role for the earlier connection with UE B and a new connection with UE C. So UE A is assigned Tx_Rx_Idx 1 for the connection with UE C.

A UE may maintain a Tx/Rx index. That is, the UE assigns a Tx/Rx index for its connection with another UE and transmits information about the assigned Tx/Rx index to an eNB during direct connection setup. The eNB stores this information. The UE may transmit the Tx/Rx index in a direct communication request message to the eNB. The eNB transmits the Tx/Rx index of a UE to which the UE is connected in a direct communication response message. Alternatively, the UE transmits its Tx/Rx index for a new connection in a direct communication request message to the eNB. Each UE of a UE pair also exchanges Tx/Rx indexes directly with the other UE through a direct link. The property of a Tx/Rx index is the same irrespective of whether it is assigned by an eNB or a UE. If the eNB assigns a Tx/Rx index, the eNB should maintain information about Tx/Rx indexes assigned to all UEs. If the UE assigns a Tx/Rx index, the UE should maintain information about the Tx/Rx index, thereby reducing the load of the eNB.

A method for monitoring a DL frequency using a unified C-RNTI, for resource allocation will be described.

If a UE is connected to an eNB only, the UE decodes a PDCCH using an assigned C-RNTI to determine resources for transmitting and receiving data in DL and UL subframes. If a UE is connected to one or more other UEs, a transmitting UE decodes a PDCCH using its C-RNTI to determine resources during time durations (for example, UL subframes) meant for direct communication. If this transmitting UE is connected to a plurality of UEs, for transmission, the UE uses a Tx/Rx index in addition to the C-RNTI to determine a UE to which it has to transmit data. The receiving UE decodes a PDCCH using the C-RNTI of another UE to which it is connected and a Tx/Rx index assigned to the other (transmitting) UE for this connection during time durations (for example, UL subframes) meant for direct communication. If the receiving UE is connected to a plurality of UEs, for reception, the same operation is repeated.

Figure 36:
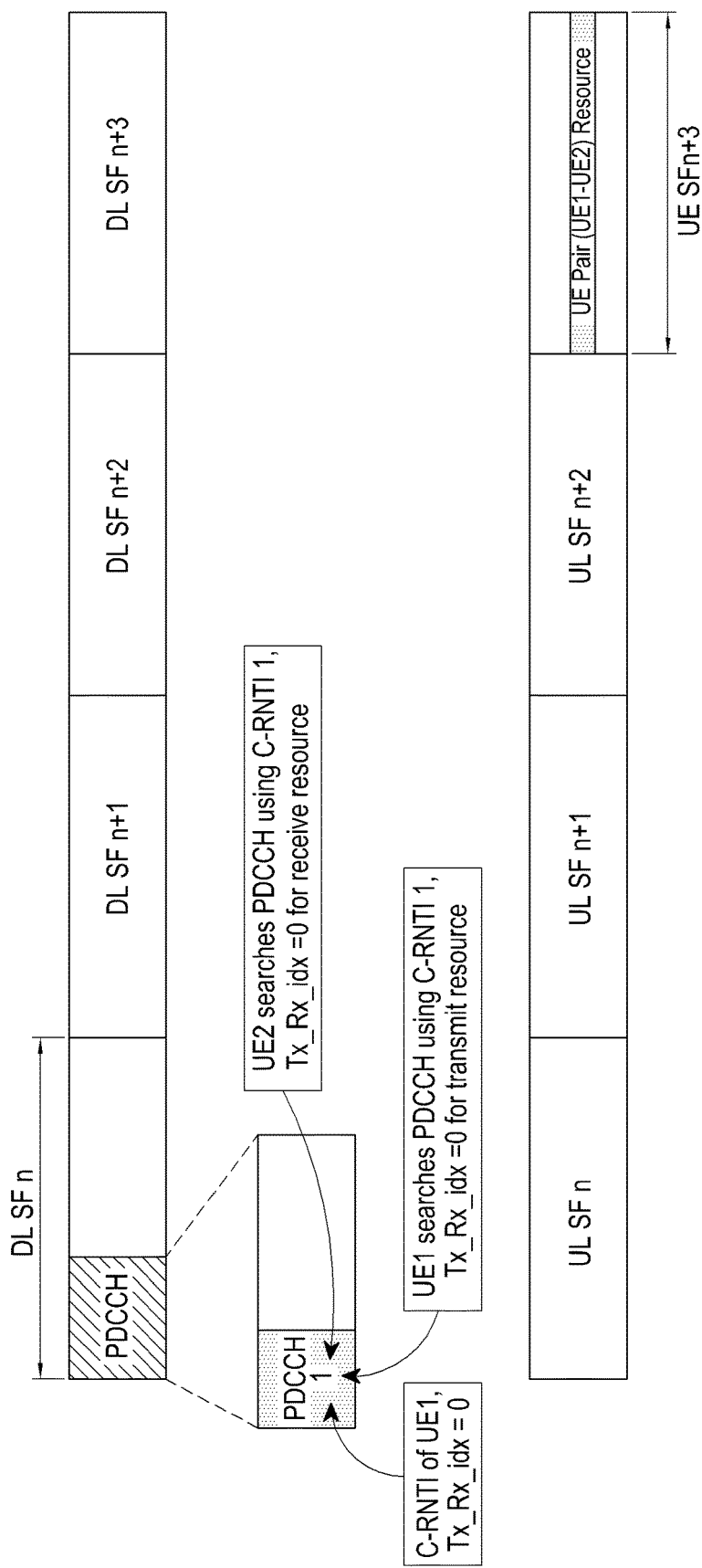
FIG. 36 illustrates an example of distinguishing resources for UE pair communication from other resources within the coverage area of an eNB according to an embodiment of the present disclosure.

FIG. 36 illustrates an example of distinguishing resources for UE pair communication from resources of other UEs within the coverage area of an eNB according to an embodiment of the present disclosure.

Referring to FIG. 36, UE1 and UE2 are engaged in direct communication. UE1 transmits data and UE2 receives the data. C-RNTI 1 is assigned to UE1 and C-RNTI 2 is assigned to UE2. Because UE1 and UE2 are not connected to any other UE, the Tx/Rx index of UE1 is 0 and the Tx/Rx index of UE2 is 0. UE1 and UE2 receive and decode a PDCCH using C-RNTI1 and the Tx/Rx index (=0) of UE1.

Figure 37:
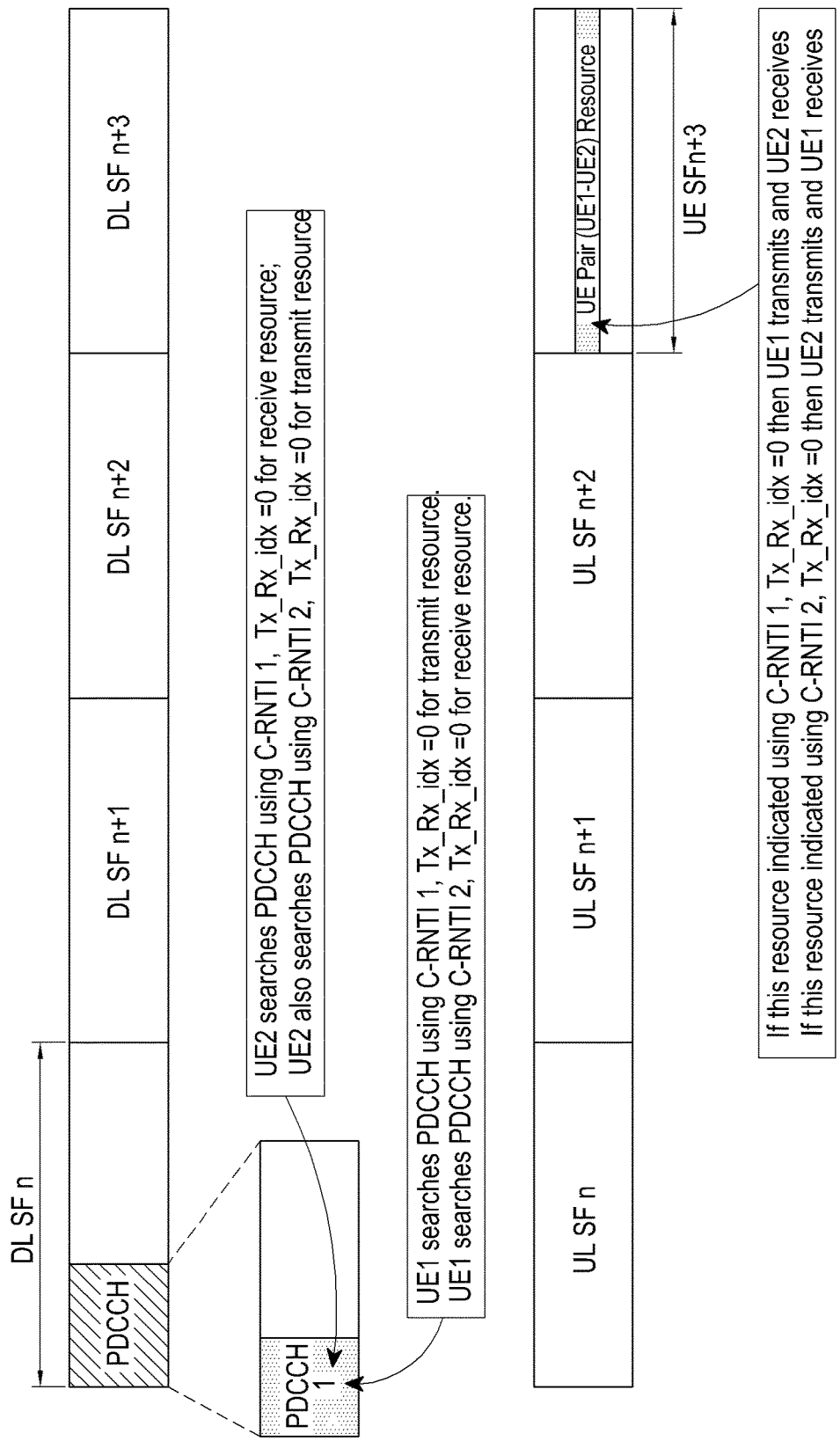
FIG. 37 illustrates an example of distinguishing resources for communication between a UE pair from resources for communication between a UE of the UE pair and an eNB according to an embodiment of the present disclosure.

FIG. 37 illustrates an example of distinguishing resources for communication between a UE pair from resources for communication between a UE of the UE pair and an eNB according to an embodiment of the present disclosure.

Referring to FIG. 37, UE1 and UE2 are engaged in direct communication. C-RNTI 1 and C-RNTI 2 are assigned to UE1 and UE2, respectively. UE1 transmits data and UE2 receives the data. Also, UE2 transmits data and UE1 receives the data. UE1 and UE2 are not connected to any other UE. Therefore, for the connection between UE1 and UE2, the Tx/Rx index of UE1 is 0 and the Tx/Rx index of UE2 is 0. UE1 and UE2 receive and decode a PDCCH using C-RNTI 1, C-RNTI 2, the Tx/Rx index (=0) of UE1, and the Tx/Rx index (=0) of UE2. Specifically, UE1 searches for a PDCCH using C-RNTI 1 and the Tx/Rx index of UE1 for Tx resources, and using C-RNTI 2 and the Tx/Rx index of UE2 for Rx resources. Also, UE2 searches for a PDCCH using C-RNTI 2 and the Tx/Rx index of UE2 for Tx resources and using C-RNTI 1 and the Tx/Rx index of UE1 for Rx resources.

Figure 38:
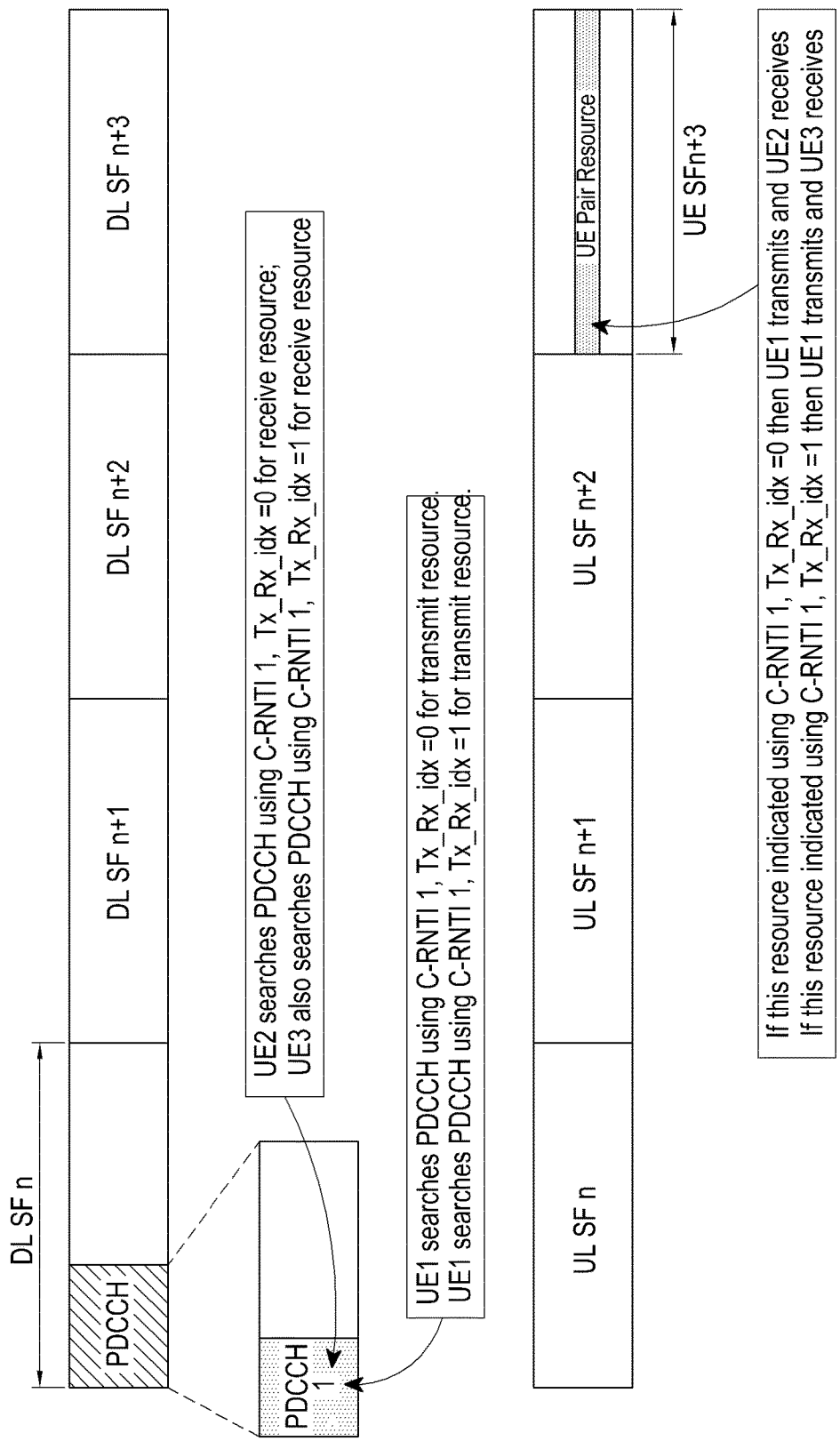
FIG. 38 illustrates an example of distinguishing resources for communication between one UE pair from resources for communication between another UE according to an embodiment of the present disclosure.

FIG. 38 illustrates an example of distinguishing resources for communication between one UE pair from resources for communication between another UE pair according to an embodiment of the present disclosure.

Referring to FIG. 38, UE1 and UE2 are engaged in direct communication, whereas UE1 and UE3 are engaged in direct communication. C-RNTI 1, C-RNTI 2, and C-RNTI 3 are assigned to UE1, UE2, and UE3, respectively. UE1 transmits data and UE2 receives the data. Also, UE1 transmits data and UE3 receives the data. For the UE1-UE2 connection, the Tx/Rx index of UE1 is 0 and the Tx/Rx index of UE2 is 0. For the UE1-UE3 connection, the Tx/Rx index of UE1 is 1 and the Tx/Rx index of UE3 is 0. UE1 receives and decodes a PDCCH using C-RNTI 1 and the Tx/Rx indexes (=0 and 1) of UE1. UE2 receives and decodes a PDCCH using C-RNTI 1 and the Tx/Rx index (=zero) of UE1. UE3 receives and decodes a PDCCH using C-RNTI 1 and the Tx/Rx index (=1) of UE1.

UE1 searches for a PDCCH using C-RNTI 1 and the Tx/Rx index (=0) of UE1 for Tx resources for transmitting to UE2 and UE3. UE2 searches for a PDCCH using C-RNTI 1 and the Tx/Rx index (=0) of UE1 for Rx resources for receiving from UE1. UE3 searches for a PDCCH using C-RNTI 1 and the Tx/Rx index (=0) of UE1 for Rx resources for receiving from UE1.

Another method for identifying and signaling a transmitting/receiving UE pair will be described.

An eNB allocates resources for direct communication between a UE pair in a DL frequency. A control region (that is, a PDCCH) in the DL frequency indicates resources for direct communication as well as resources for communication with the eNB. The resources for direct communication are indicated to the UEs of the UE pair using a single transmission. In an embodiment of the present disclosure, the C-RNTI of a receiving UE amongst the UEs of the UE pair is used in a PDCCH or a control region to indicate resources for direct communication. The transmitting and receiving UEs of the UE pair receive and decode the PDCCH using the C-RNTI of the receiving UE. The UEs of the UE pair exchange their C-RNTIs with each other during connection establishment either directly or via the network.

A receiving UE may be involved in direct communication with a plurality of UEs. For example, if a receiving UE, UE1 is connected to UE2 and UE3, the C-RNTI of UE1 is used to indicate resources for direct communication. Accordingly, UE1 needs to determine whether to use the allocated resources to receive data from UE2 or UE3. Also, UE1 needs to determine whether UE2 or UE3 should transmit data in the indicated resources using the C-RNTI of UE1. For this purpose, the eNB assigns a Tx/Rx index to each UE performing the Rx role in direct communication. The Tx/Rx index is independently maintained for each UE performing the Rx role. The Tx/Rx index of a UE distinguishes a plurality of connections of the UE with other UEs. For example, if UE1 is connected to UE2 and UE3 and receives data from both UE2 and UE3, the Tx/Rx index of UE1 for the UE1-UE2 connection may be 0 whereas the Tx/Rx index of UE1 for the UE1-UE3 connection may be 1. A Tx/Rx index is assigned at the time of connection establishment between the UEs of the UE pair. A Tx/Rx index is assigned to each UE of the UE Pair.

Figure 39:
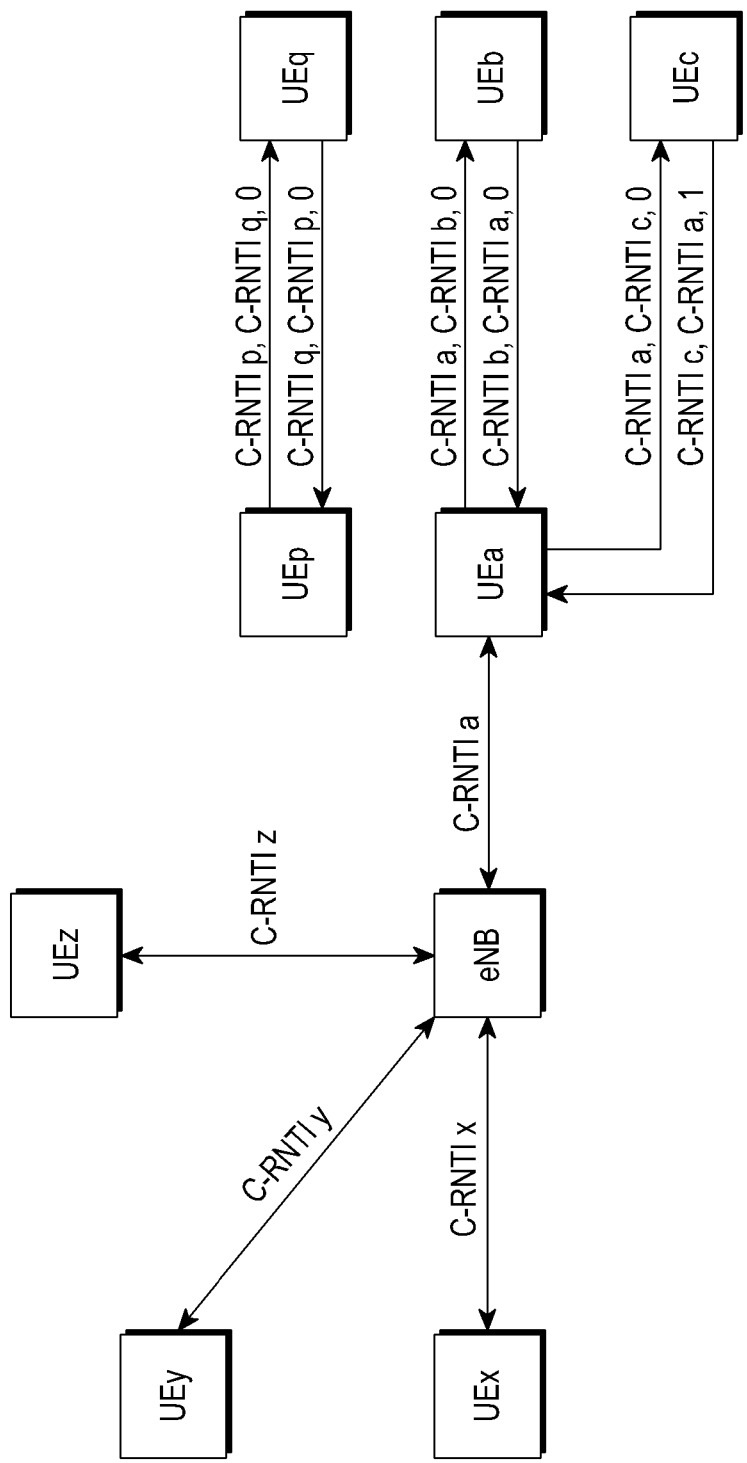
FIG. 39 illustrates a method for using a unified C-RNTI and a transmission and reception index for direct communication according to an embodiment of the present disclosure.

FIG. 39 illustrates a method for using a unified C-RNTI and a Tx/Rx index for direct communication according to an embodiment of the present disclosure.

Referring to FIG. 39, a unified C-RNTI is assigned to every UE engaged in communication according to an embodiment of the present disclosure. For a pair of UEp and UEq, both Tx/Rx indexes of UEp and UEq are 0 because UEp and UEq are not connected to any other UE. For a pair of UEa and UEb, both Tx/Rx indexes of UEa and UEb are 0 because UEb is not connected to any other UE and for UEa the connection with UEb is the first connection. For a pair of UEa and UEc, the Tx/Rx index of UEa is 1 and the Tx/Rx index of UEc is 0. UEc is not connected to any other UE and hence its Tx/Rx index is 0. UEa is connected to UEb and UEc and hence its Tx/Rx index for the connection with UEc is 1.

Figure 40:
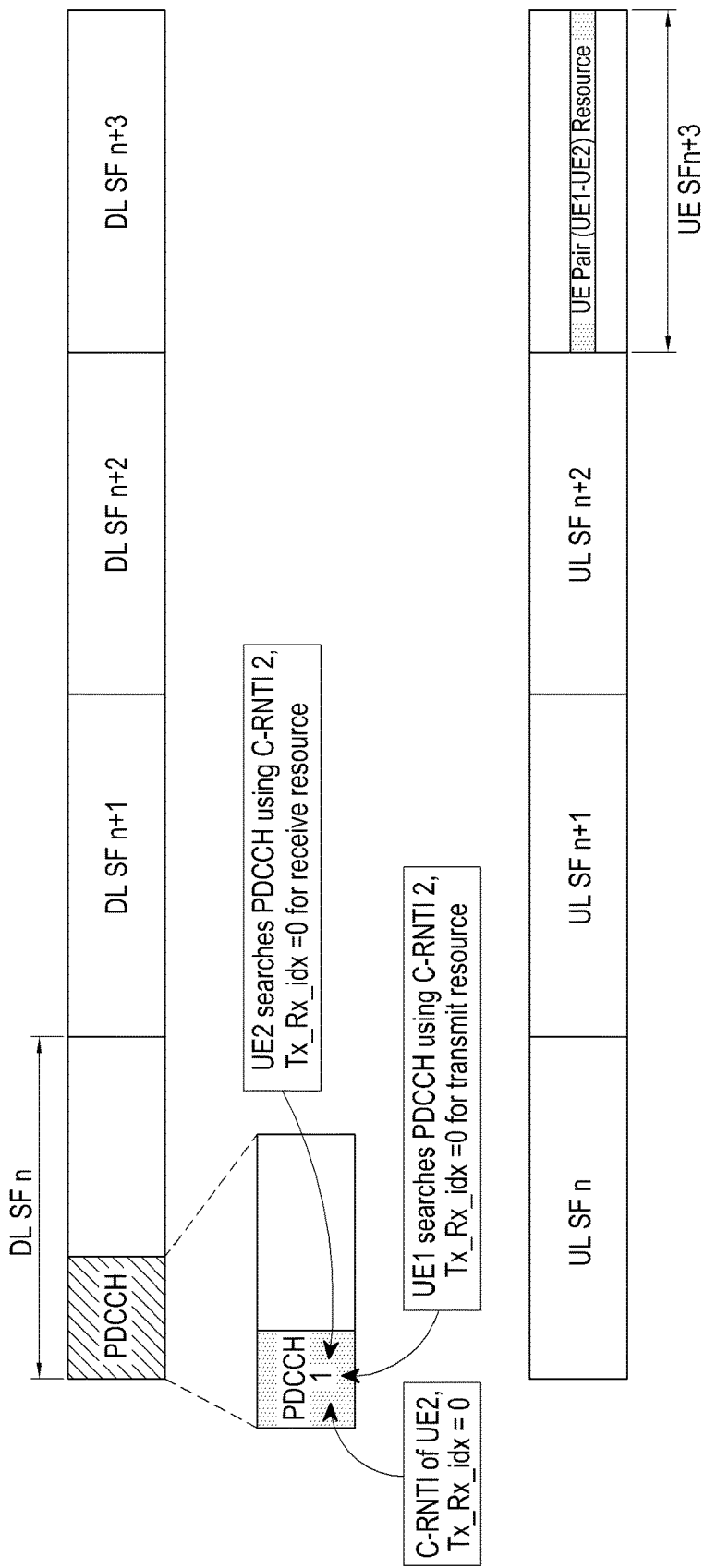
FIG. 40 illustrates an example of distinguishing resources for communication between a UE pair from other resources within the coverage area of an eNB according to an embodiment of the present disclosure.

FIG. 40 illustrates an example of distinguishing resources for communication between a UE pair from other resources within the coverage area of an eNB according to an embodiment of the present disclosure.

Referring to FIG. 40, UE1 and UE2 are engaged in direct communication. UE1 transmits data and UE2 receives the data. C-RNTI 1 is assigned to UE1 and C-RNTI 2 is assigned to UE2. Because UE1 and UE2 are not connected to any other UE, the Tx/Rx index of UE1 is 0 and the Tx/Rx index of UE2 is 0. UE1 and UE2 receive and decode a PDCCH using C-RNTI 2 and the Tx/Rx index (=0) of the receiving UE, UE2.

Figure 41:
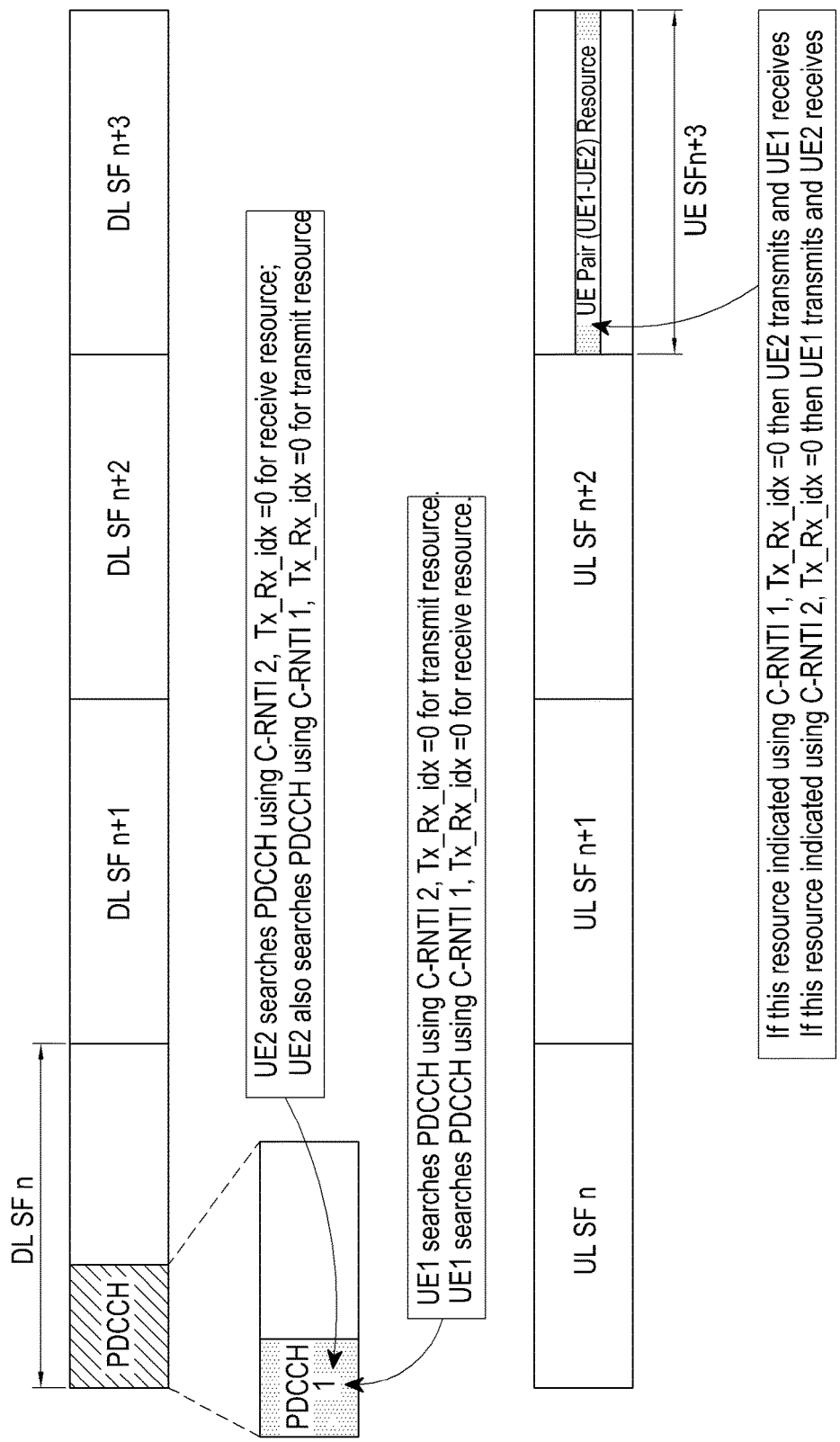
FIG. 41 illustrates an example of distinguishing resources for communication between a UE pair from resources for communication between an eNB and a UE of the UE pair according to an embodiment of the present disclosure.

FIG. 41 illustrates an example of distinguishing resources for communication between a UE pair from resources for communication between an eNB and a UE of the UE pair according to an embodiment of the present disclosure.

Referring to FIG. 41, UE1 and UE2 are engaged in direct communication. C-RNTI 1 and C-RNTI 2 are assigned to UE1 and UE2, respectively. UE1 transmits data and UE2 receives the data. Also, UE2 transmits data and UE1 receives the data. UE1 and UE2 are not connected to any other UE. Therefore, for the connection between UE1 and UE2, the Tx/Rx index of UE1 is 0 and the Tx/Rx index of UE2 is 0. UE1 and UE2 receive and decode a PDCCH using C-RNTI 1, C-RNTI 2, the Tx/Rx index (=0) of UE1, and the Tx/Rx index (=0) of UE2. Specifically, UE1 searches for a PDCCH using C-RNTI 2 and the Tx/Rx index of UE2 for Tx resources, and using C-RNTI-1 and the Tx/Rx index of UE1 for Rx resources. Also, UE2 searches for a PDCCH using C-RNTI 1 and the Tx/Rx index of UE1 for Tx resources and using C-RNTI 2 and the Tx/Rx index of UE2 for Rx resources.

Figure 42:
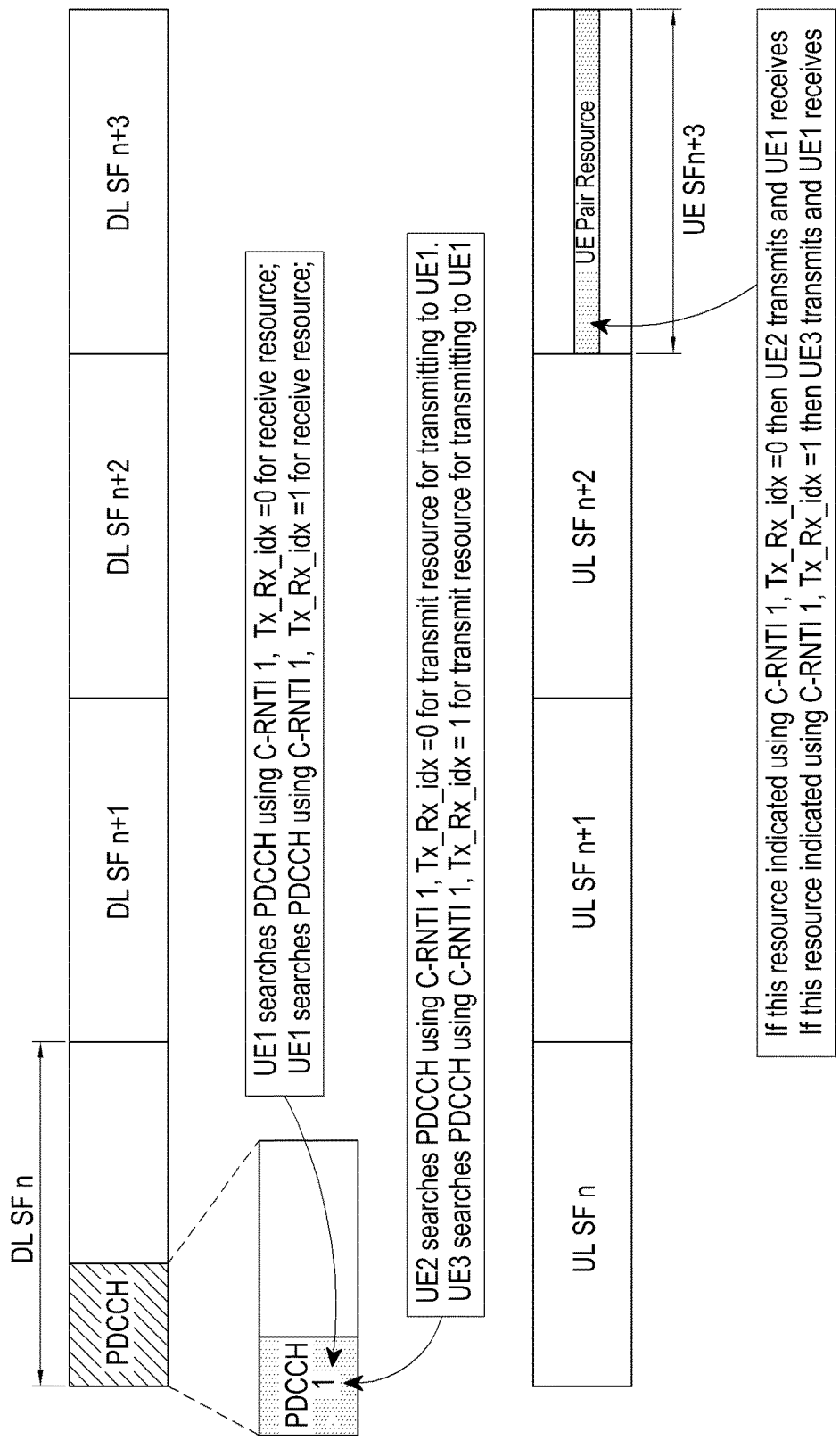
FIG. 42 illustrates an example of distinguishing resources for communication between one UE pair from resources for communication between another UE pair according to an embodiment of the present disclosure.

FIG. 42 illustrates an example of distinguishing resources for communication between one UE pair from resources for communication between another UE pair according to an embodiment of the present disclosure.

Referring to FIG. 42, UE1 and UE2 are engaged in direct communication, and UE1 and UE3 are engaged in direct communication. C-RNTI 1, C-RNTI 2, and C-RNTI 3 are assigned to UE1, UE2, and UE3, respectively. UE1 receives data and UE2 transmits data. Also UE1 receives data and UE3 transmits data. For the UE1-UE2 connection, the Tx/Rx index of UE1 is 0 and the Tx/Rx index of UE2 is 0. For the UE1-UE3 connection, the Tx/Rx index of UE1 is 1 and the Tx/Rx index of UE3 is 0. UE1 receives and decodes a PDCCH using C-RNTI 1 and the Tx/Rx indexes (=0 and 1) of UE1. UE2 receives and decodes a PDCCH using C-RNTI 1 and the Tx/Rx index (=0) of UE1. UE3 receives and decodes a PDCCH using C-RNTI 1 and the Tx/Rx index (=1) of UE1.

UE1 searches for a PDCCH using C-RNTI 1 and the Tx/Rx index (=0) of UE1 for Rx resources for receiving from UE2. UE1 searches for a PDCCH using C-RNTI 1 and Tx-Rx-Idx (=0) of UE1 for Rx resources for receiving data from UE3. UE2 searches for a PDCCH using C-RNTI 1 and the Tx/Rx index (=0) of UE1 for Tx resources for transmitting data to UE1. UE3 searches for a PDCCH using C-RNTI 1 and the Tx/Rx index (=0) of UE1 for Tx resources for transmitting data to UE1.

A third method for identifying and signaling a transmitting/receiving UE pair will be described.

An eNB allocates resources for direct communication between a UE pair in a DL frequency. A control region of the DL frequency indicates the resources for direct communication between the UE pair as well as resources for communication with the eNB. The resources for direct communication are indicated to the UEs of the UE pair by a single transmission. A C-RNTI of a transmitting UE is used to mask a CRC of a PDCCH and a C-RNTI of receiving UE is added inside the contents of the PDCCH. The UEs of the UE pair exchange each other's C-RNTI during connection establishment either directly or via the network. A UE having direct communication with another UE monitors the DL frequency for resource allocation using a unified C-RNTI. If the UE is connected to the eNB only, the UE uses the assigned C-RNTI to decode the PDCCH for determining resources for receiving and transmitting data in DL and UL subframes. If the UE is connected to one or more other UEs, the UE uses the assigned C-RNTI and the C-RNTIs of other UEs with which it is communicating to decode the PDCCH for determining resources for receiving and transmitting data in DL and UL subframes.

A transmitting UE and a receiving UE are identified as follows.

A transmitting UE decodes a PDCCH using its C-RNTI to determine resources for time durations (for example, UL subframes) meant for direct communication with other UEs. If the PDCCH is decoded using the C-RNTI of the UE and the C-RNTI of another UE with which the UE is communicating is present in the decoded PDCCH, the UE uses the resources for transmission. The UE transmits data to a UE whose C-RNTI is present in the decoded PDCCH. If the C-RNTI in the decoded PDCCH does not belong to a UE with which it is communicating, it ignores the decoded PDCCH.

A receiving UE decodes a PDCCH using the C-RNTI of another UE connected to the receiving UE to determine resources for time durations (for example, UL subframes) meant for direct communication with the other UE. If the PDCCH is decoded using the C-RNTI of the UE communicating with the receiving UE and the C-RNTI of the receiving UE is present in the decoded PDCCH, the UE uses the resources for reception. The UE receives data from the UE whose C-RNTI is used to decode the PDCCH. If the C-RNTI in the decoded PDCCH does not belong to the UE, the UE ignores the decoded PDCCH.

Figure 43:
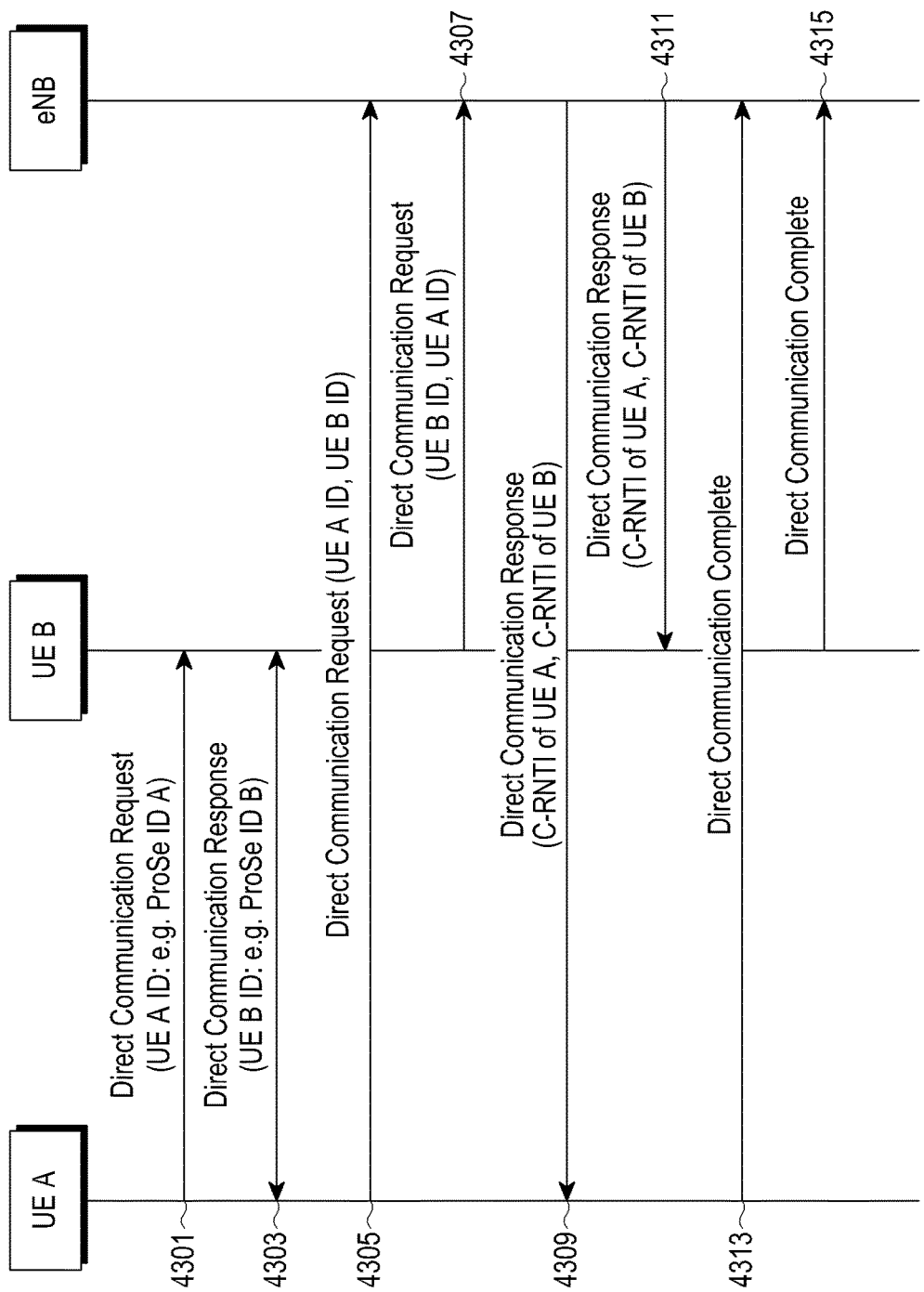
FIG. 43 illustrates an operation for allocating and exchanging a unified C-RNTI according to an embodiment of the present disclosure.

FIG. 43 illustrates an operation for allocating and exchanging a unified C-RNTI according to an embodiment of the present disclosure.

Referring to FIG. 43, UE A initiates direct communication establishment with UE B and transmits a direct communication request message including its UE ID to UE B in operation 4301. According to an embodiment, the UE ID may be an ID assigned to UE A for ProSe communication (that is, a ProSe UE ID). Or the UE ID may be an idle mode ID assigned to UE A (that is, an S-TMSI). Or the UE ID may be a GUTI assigned to UE A. If UE B accepts the direct communication request from UE A, UE B transmits a direct communication response message including its UE ID to UE A, in operation 4303. UE A and UE B transmit direct communication request messages to an eNB respectively in operations 4305 and 4307. Each of UE A and UE B includes the UE IDs of the UE B and UE A in its direct communication request message. The order of operations 4305 and 4307 may be changed.

Upon receipt of the direct communication request message from UE A, the eNB verifies the direct connection request message and transmits the C-RNTI of UE B to UE A in a direct communication response message in operation 4309. The C-RNTI of UE B may be included only if the C-RNTI is newly assigned to UE B. If a C-RNTI has not been assigned to UE B yet, eNB1 assigns the C-RNTI to UE B. The eNB may transmit other parameters related to direct communication in the direct communication response message to UE A. Upon receipt of the direct communication response message from the eNB, UE A transmits a direct communication complete message to the eNB in operation 4313.

Likewise, upon receipt of the direct communication request message from UE B, the eNB verifies the direct connection request message and transmits the C-RNTI of UE A to UE B in a direct communication response message in operation 4311. The C-RNTI of UE A may be included only if the C-RNTI is newly assigned to UE A. If a C-RNTI has not been assigned to UE A yet, the eNB assigns the C-RNTI to UE A. The eNB may transmit other parameters related to direct communication in the direct communication response message to UE B. Upon receipt of the direct communication response message from the eNB, UE B transmits a direct communication complete message to the eNB in operation 4315. Subsequently, UE A and UE B perform D2D communication. The C-RNTIs may be exchanged between UE A and UE B during direct communication request and response signaling between UE A and UE B.

Figure 44:
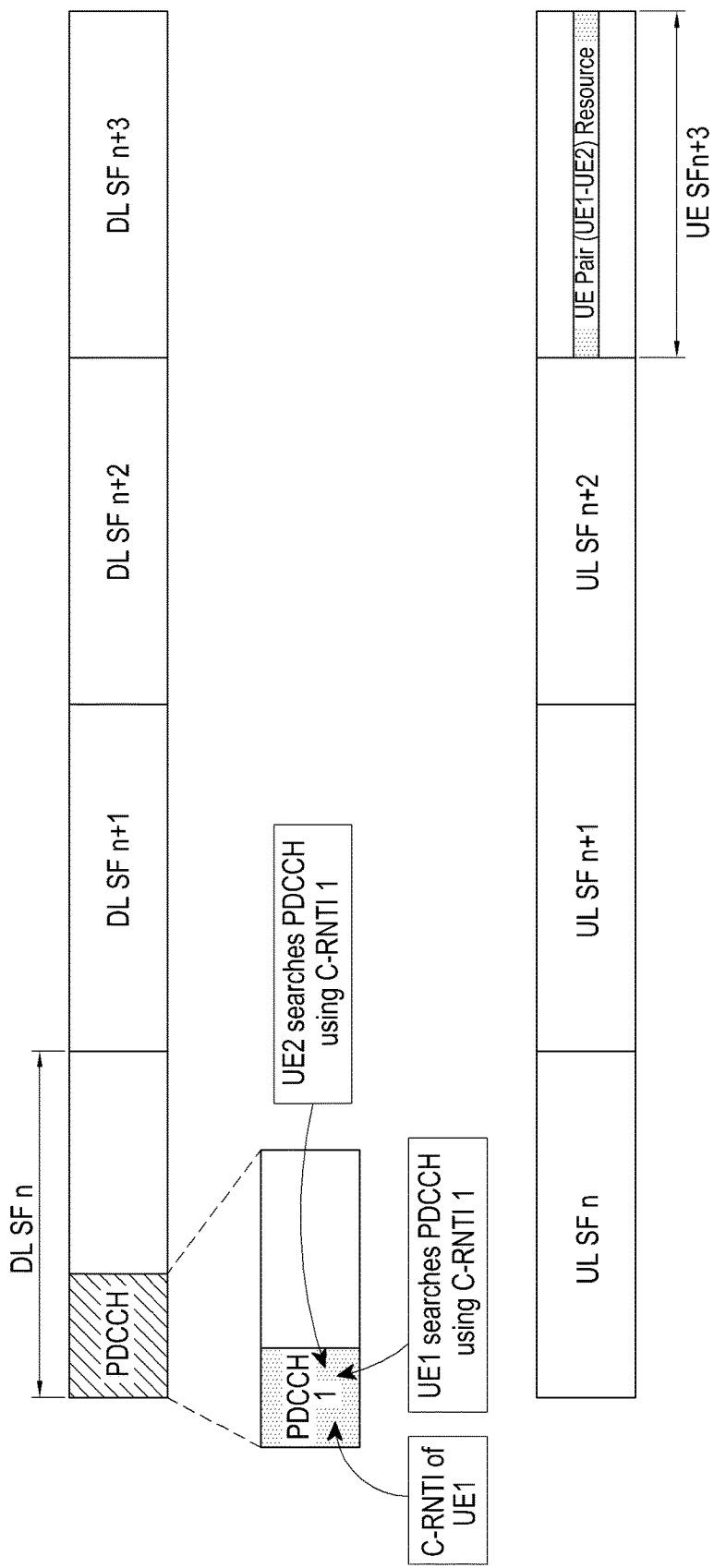
FIG. 44 illustrates an example of distinguishing resources for UE pair communication from other resources within the coverage area of an eNB according to an embodiment of the present disclosure.

FIG. 44 illustrates an example of distinguishing resources for UE pair communication from other resources within the coverage area of an eNB according to an embodiment of the present disclosure.

Referring to FIG. 44, UE1 and UE2 are engaged in direct communication. UE1 transmits data and UE2 receives the data. C-RNTI 1 is assigned to UE1 and C-RNTI 2 is assigned to UE2. UE1 and UE2 are not connected to any other UE. UE1 and UE2 receive and decode a PDCCH using C-RNTI 1 of a transmitting UE, UE1. If C-RNTI 2 is included in a decoded PDCCH, UE1 transmits data in indicated resources and UE2 receives data in the indicated resources.

Figure 45:
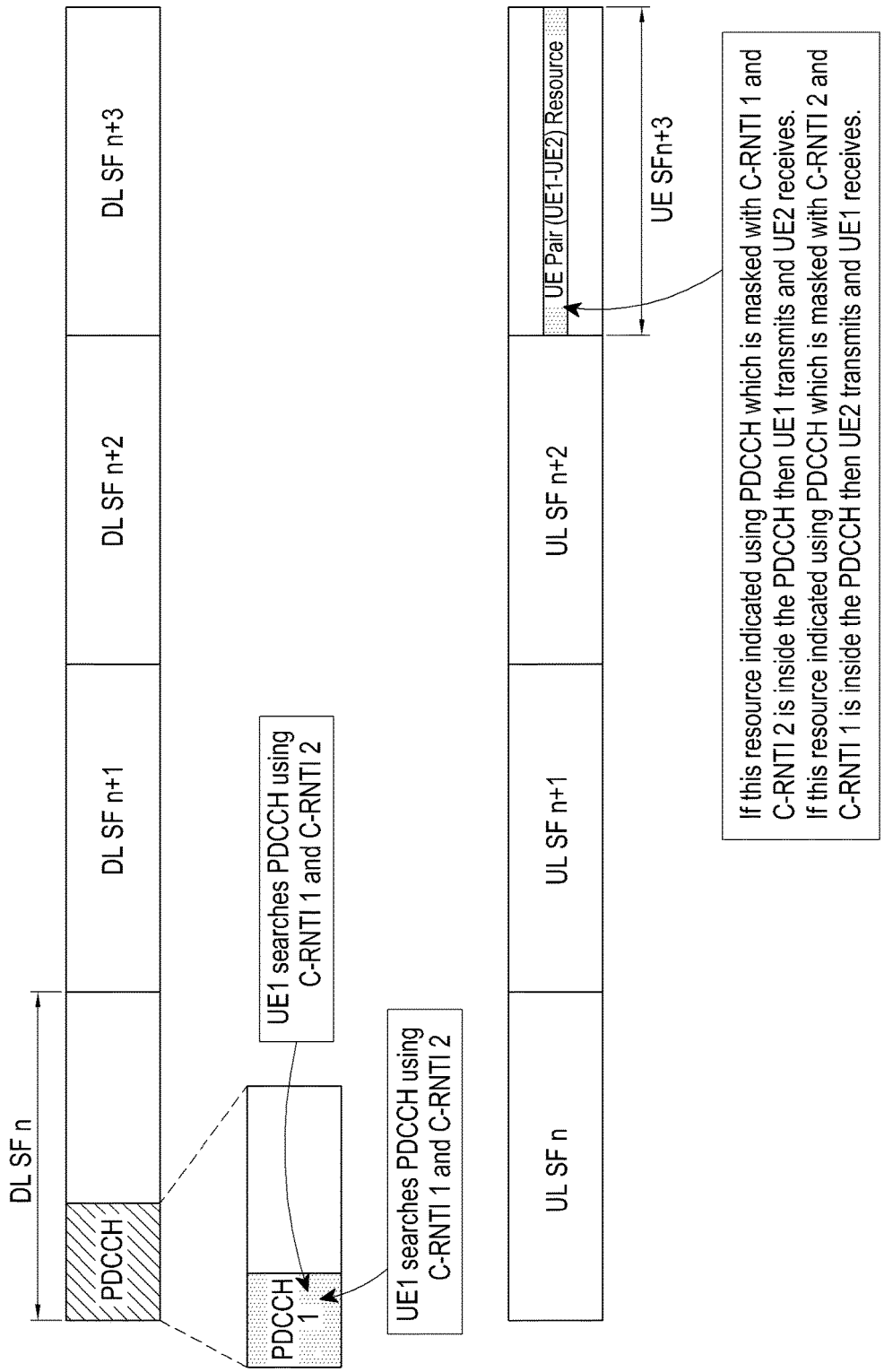
FIG. 45 illustrates an example of distinguishing resources for communication between a UE pair from resources for communication between an eNB and a UE of the UE pair according to an embodiment of the present disclosure.

FIG. 45 illustrates an example of distinguishing resources for communication between a UE pair from resources for communication between an eNB and a UE of the UE pair according to an embodiment of the present disclosure.

Referring to FIG. 45, UE1 and UE2 are engaged in direct communication. C-RNTI 1 and C-RNTI 2 are assigned to UE1 and UE2, respectively. UE1 transmits data and UE2 receives the data. Also, UE2 transmits data and UE1 receives the data. UE1 and UE2 are not connected to any other UE. UE1 and UE2 receive and decode a PDCCH using C-RNTI 1 and C-RNTI 2. If resources are indicated by a PDCCH masked with C-RNTI 1 and C-RNTI 2 is included in the PDCCH, UE1 transmits data and UE 2 receives data. If resources are indicated by a PDCCH masked with C-RNTI 2 and C-RNTI 1 is included in the PDCCH, UE2 transmits data and UE1 receives data.

Figure 46:
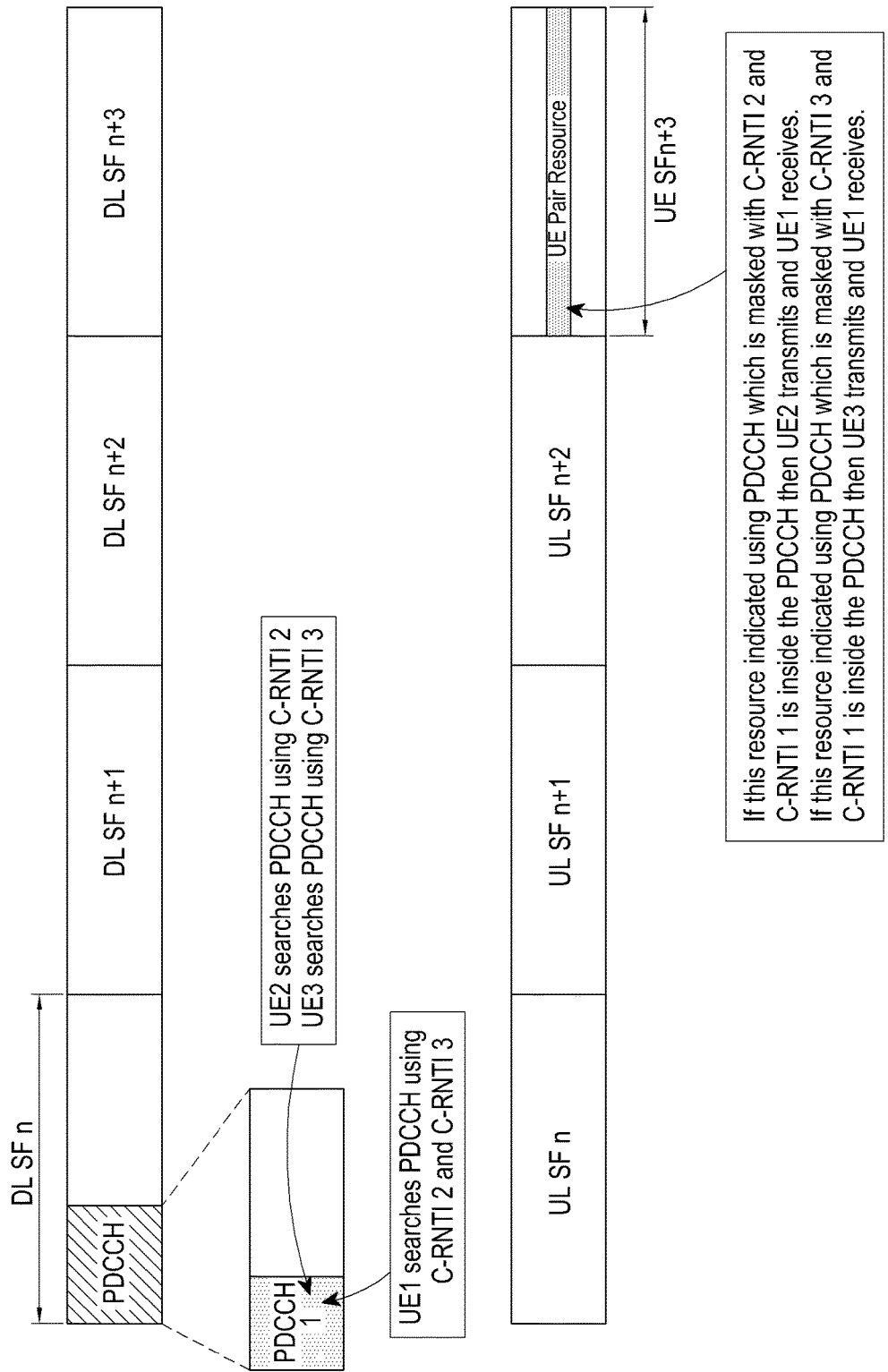
FIG. 46 illustrates an example of distinguishing resources for UE pair communication from resources for other UE pair communication according to an embodiment of the present disclosure.

FIG. 46 illustrates an example of distinguishing resources for communication between one UE pair from resources for communication between another UE pair according to an embodiment of the present disclosure.

Referring to FIG. 46, UE1 and UE2 are engaged in direct communication, and UE1 and UE3 are engaged in direct communication. C-RNTI 1, C-RNTI 2, and C-RNTI 3 are assigned to UE1, UE2, and UE3, respectively. UE1 receives data and UE2 transmits data. Also UE1 receives data and UE3 transmits data. UE2 searches for a PDCCH using C-RNTI 2 and UE3 searches for a PDCCH using C-RNTI 3. If resources are indicated by a PDCCH masked with C-RNTI 2 and C-RNTI 1 is included in the PDCCH, UE2 transmits data and UE 1 receives data. If resources are indicated by a PDCCH masked with C-RNTI 3 and C-RNTI 1 is included in the PDCCH, UE3 transmits data and UE1 receives data.

A fourth method for identifying and signaling a transmitting/receiving UE pair will be described.

An eNB allocates resources for direct communication between a UE pair in a DL frequency. A control region of the DL frequency indicates the resources for direct communication between the UE pair as well as resources for communication with the eNB. The resources for direct communication are indicated to the UEs of the UE pair by a single transmission. A C-RNTI of a receiving UE is used to mask a CRC of a PDCCH and a C-RNTI of a transmitting UE is added inside the contents of the PDCCH. The UEs of the UE pair exchange each other's C-RNTI during connection establishment either directly or via the network. A UE having direct communication with another UE monitors the DL frequency for resource allocation using a unified C-RNTI. If the UE is connected to the eNB only, the UE uses the assigned C-RNTI to decode the PDCCH for determining resources for receiving and transmitting data in DL and UL subframes. If the UE is connected to one or more other UEs, the UE uses the assigned C-RNTI and the C-RNTIs of other UEs with which it is communicating to decode the PDCCH for determining resources for receiving and transmitting data in DL and UL subframes.

A transmitting UE and a receiving UE are identified as follows.

A receiving UE decodes a PDCCH using its C-RNTI to determine resources for time durations (for example, UL subframes) meant for direct communication with other UEs. If the PDCCH is decoded using the C-RNTI of the UE and the C-RNTI of another UE with which the UE is communicating is present in the decoded PDCCH, the UE uses the resources for reception. The UE receives data from a UE whose C-RNTI is present in the decoded PDCCH. If the C-RNTI in the decoded PDCCH does not belong to a UE with which it is communicating, it ignores the decoded PDCCH.

A transmitting UE decodes a PDCCH using the C-RNTI of another UE connected to the UE to determine resources for time durations (for example, UL subframes) meant for direct communication with the other UE. If the PDCCH is decoded using the C-RNTI of the UE communicating with the transmitting UE and the C-RNTI of the transmitting UE is present in the decoded PDCCH, the UE uses the resources for transmission. The UE transmits data to the UE whose C-RNTI is used to decode the PDCCH. If the C-RNTI in the decoded PDCCH does not belong to the UE, the UE ignores the decoded PDCCH.

Figure 47:
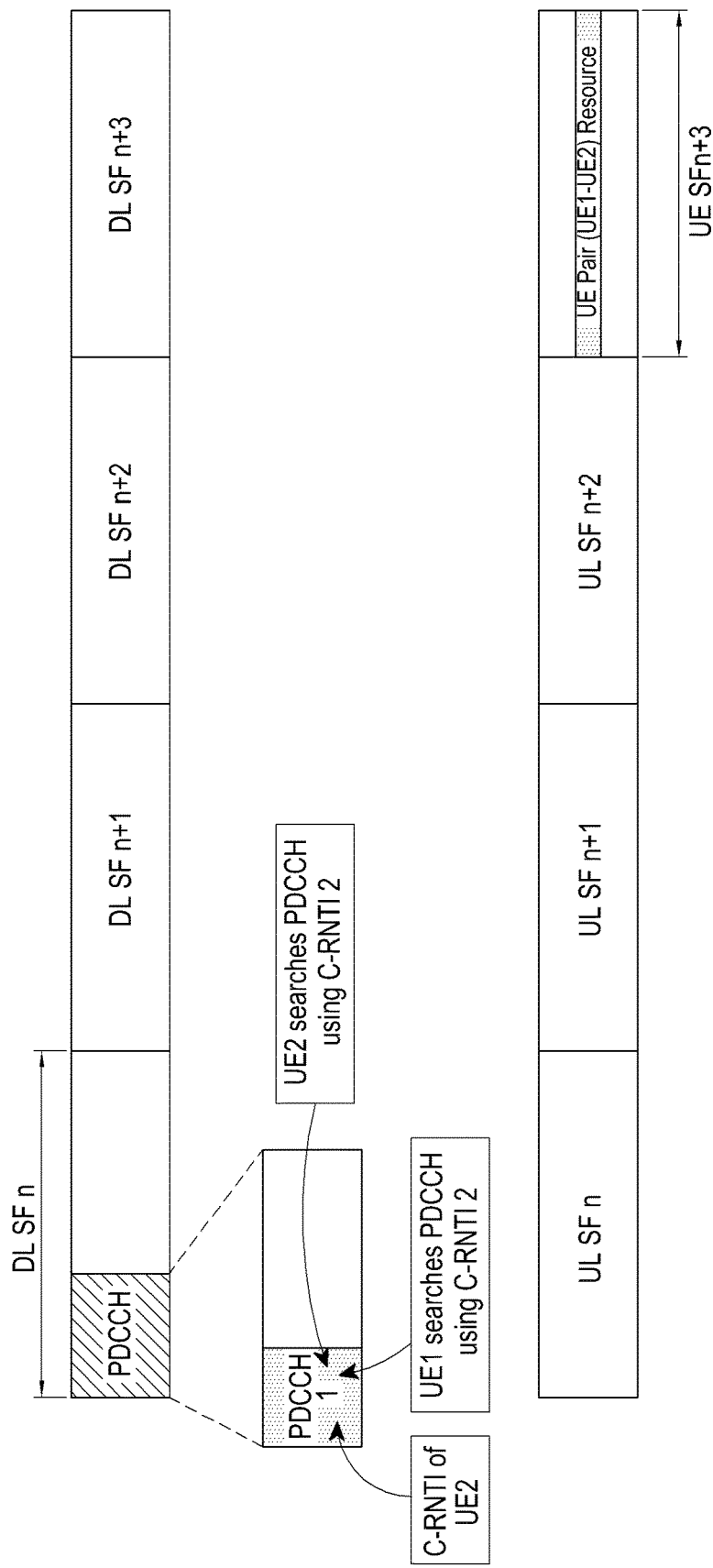
FIG. 47 illustrates an example of distinguishing resources for UE pair communication from other resources within the coverage area of an eNB according to an embodiment of the present disclosure.

FIG. 47 illustrates an example of distinguishing resources for UE pair communication from other resources within the coverage area of an eNB according to an embodiment of the present disclosure.

Referring to FIG. 47, UE1 and UE2 are engaged in direct communication. UE1 transmits data and UE2 receives the data. C-RNTI 1 is assigned to UE1 and C-RNTI 2 is assigned to UE2. UE1 and UE2 are not connected to any other UE. UE1 and UE2 search for a PDCCH using C-RNTI 1 of a receiving UE, UE1. If C-RNTI 1 is included in a decoded PDCCH, UE1 transmits data in indicated resources and UE2 receives data in the indicated resources.

Figure 48:
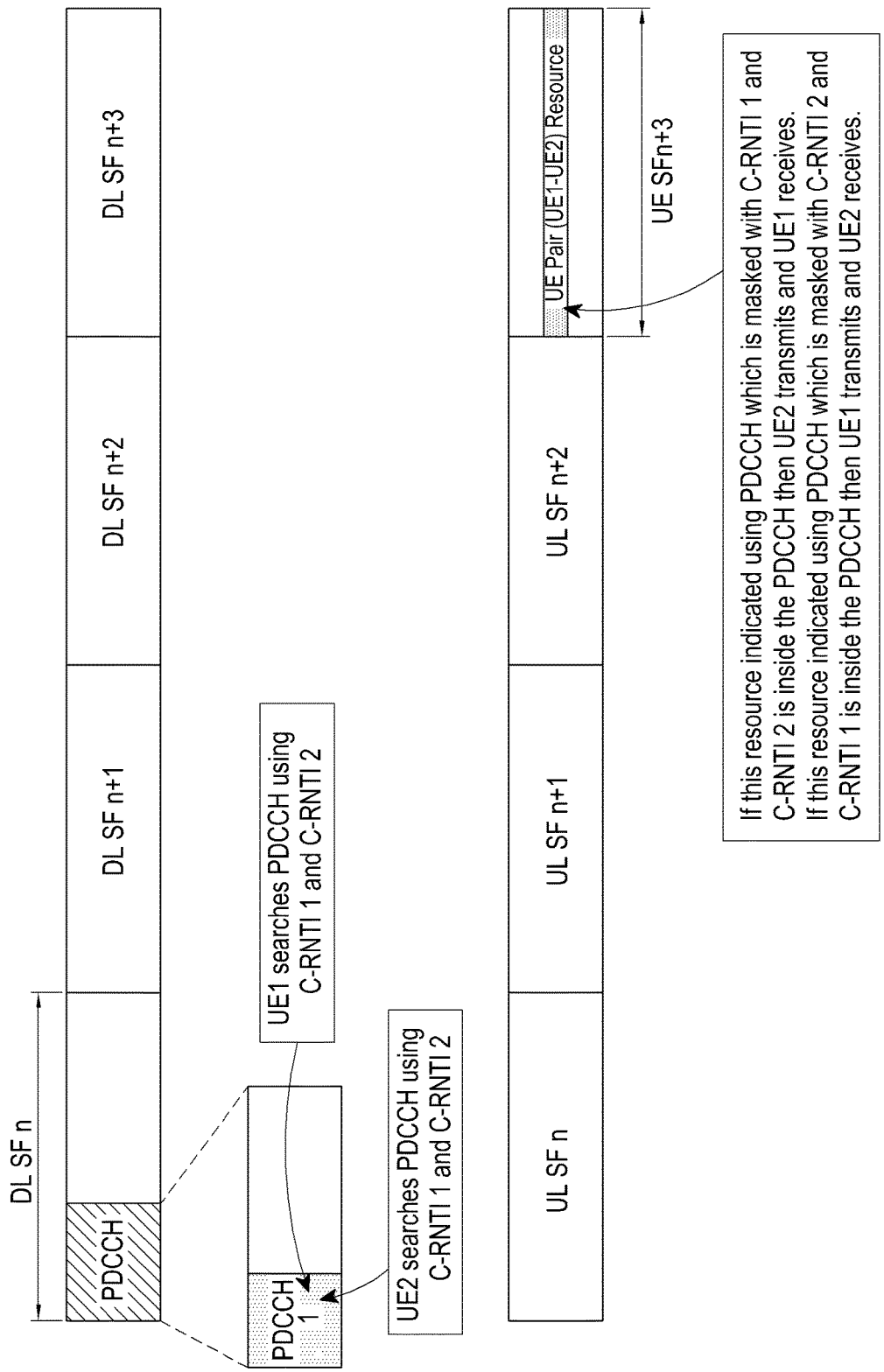
FIG. 48 illustrates an example of distinguishing resources for communication between a UE pair from resources for communication between an eNB and a UE of the UE pair according to an embodiment of the present disclosure.

FIG. 48 illustrates an example of distinguishing resources for communication between a UE pair from resources for communication between an eNB and a UE of the UE pair according to an embodiment of the present disclosure.

Referring to FIG. 48, UE1 and UE2 are engaged in direct communication. C-RNTI 1 and C-RNTI 2 are assigned to UE1 and UE2, respectively. UE1 transmits data and UE2 receives the data. Also, UE2 transmits data and UE1 receives the data. UE1 and UE2 are not connected to any other UE. UE1 and UE2 search for a PDCCH using C-RNTI 1 and C-RNTI 2. If resources are indicated by a PDCCH masked with C-RNTI 1 and C-RNTI 2 is included in the PDCCH, UE2 transmits data and UE1 receives data. If resources are indicated by a PDCCH masked with C-RNTI 2 and C-RNTI 1 is included in the PDCCH, UE1 transmits data and UE2 receives data.

Figure 49:
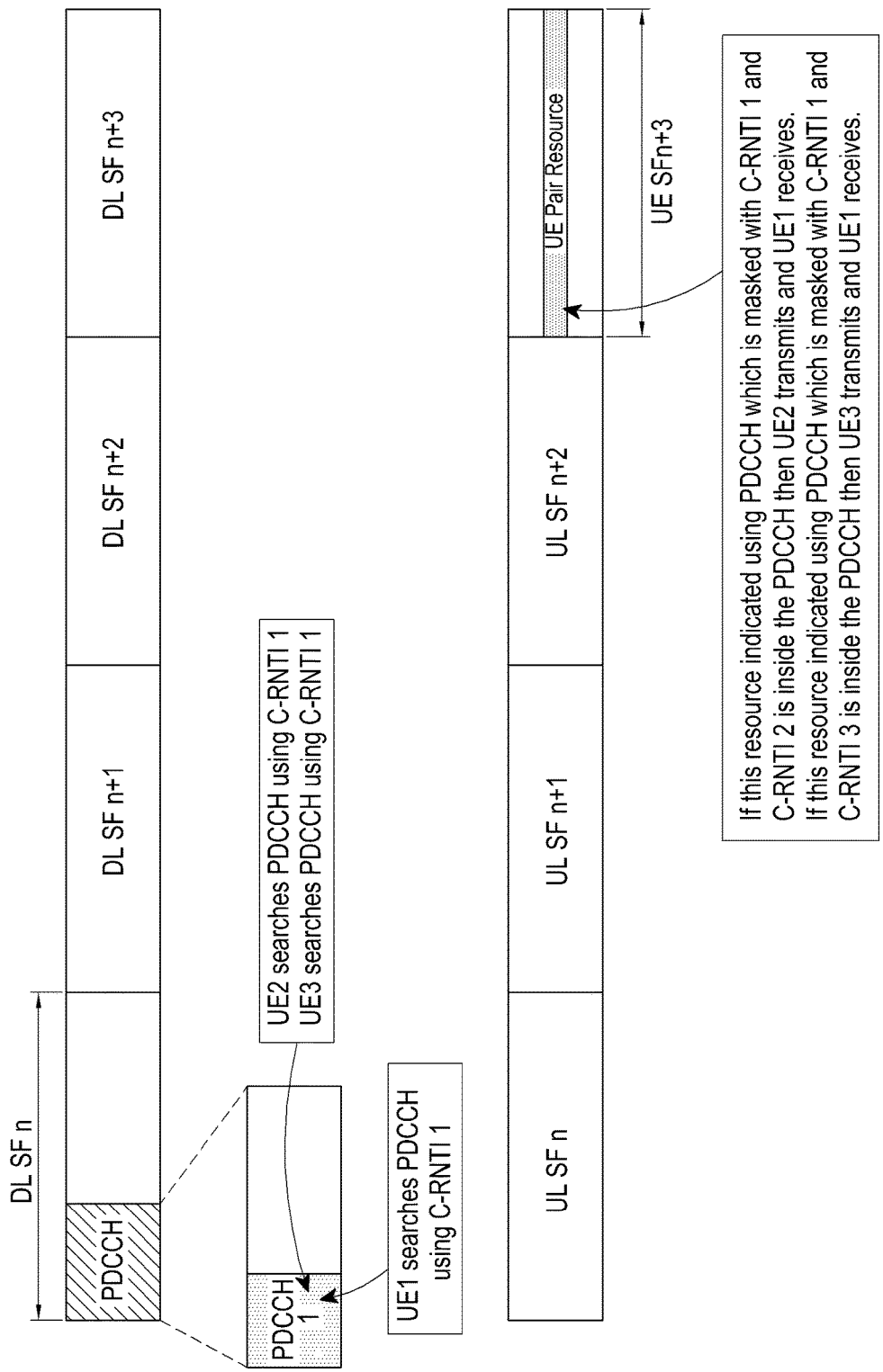
FIG. 49 illustrates an example of distinguishing resources for communication between one UE pair from resources for communication between another UE pair according to an embodiment of the present disclosure.

FIG. 49 illustrates an example of distinguishing resources for communication between one UE pair from resources for communication between another UE pair according to an embodiment of the present disclosure.

Referring to FIG. 49, UE1 and UE2 are engaged in direct communication, and UE1 and UE3 are engaged in direct communication. C-RNTI 1, C-RNTI 2, and C-RNTI 3 are assigned to UE1, UE2, and UE3, respectively. UE1 receives data and UE2 transmits data. Also UE1 receives data and UE3 transmits data. UE1, UE2, and UE3 search for a PDCCH using C-RNTI 1. If resources are indicated by a PDCCH masked with C-RNTI 1 and C-RNTI 2 is included in the PDCCH, UE2 transmits data and UE1 receives data. If resources are indicated by a PDCCH masked with C-RNTI 1 and C-RNTI 3 is included in the PDCCH, UE3 transmits data and UE1 receives data.

A fifth method for identifying and signaling a transmitting/receiving UE pair will be described.

An eNB allocates resources for direct communication between a UE pair in a DL frequency. A control region of the DL frequency indicates the resources for direct communication between the UE pair as well as resources for communication with the eNB. The resources for direct communication are indicated to the UEs of the UE pair by a single transmission. A C-RNTI of a transmitting UE is used to indicate the resources for direct communication in a PDCCH or a control region. Transmitting and receiving UEs of a UE pair receive and decode a PDCCH using the C-RNTI of the transmitting UE. The UEs of the UE pair exchange each other's C-RNTI during connection establishment either directly or via the network.

A transmitting UE may participate in direct communication with a plurality of UEs. For example, if UE1 being a transmitting UE is connected to UE2 and UE3, the C-RNTI of UE1 is used to indicate resources for direct communication. Therefore, UE1 needs to determine to which UE between UE2 and UE3 it should transmit data. Also, UE1 needs to determine which UE should receive data using the indicated resources using the C-RNTI of UE1. For this purpose, an eNB assigns a UE pair ID to each UE playing a Tx role in direct communication in an embodiment of the present disclosure. A UE pair ID distinguishes a plurality of connections between UEs. The eNB assigns a different UE pair ID to each UE pair. In an embodiment, an MME may assign a UE pair ID in order to prevent update of the UE pair ID during a UE's movement between eNBs.

A UE pair ID is assigned in the same manner as illustrated in FIG. 34, except that the UE pair ID is assigned to UE A and UE B instead of Tx/Rx indexes.

A UE having direct communication with another UE monitors a DL frequency for resource allocation using a unified C-RNTI. Specifically, if the UE is connected to the eNB only, the UE uses the assigned C-RNTI to decode the PDCCH for determining resources for receiving and transmitting data in DL and UL subframes. If the UE is connected to one or more other UEs, a transmitting UE uses its C-RNTI to decode a PDCCH for determining time durations (for example, UL subframes) for direct communication. If the transmitting UE is connected to a plurality of UEs, for transmission, the transmitting UE uses a UE pair ID in addition to a C-RNTI to determine a UE to which the transmitting UE should transmit data. A receiving UE decodes a PDCCH using the C-RNTI of another UE connected to the receiving UE and a UE pair ID assigned to the connection in order to determine resources for time durations (for example, UL subframes) for direct communication. If the receiving UE is connected to a plurality of UEs, for reception, the same operation is repeated.

If a control information format of a decoded PDCCH for communication with an eNB is different from a control information format for direct communication, the first to fifth methods for identifying and signaling a Tx UE pair and an Rx UE pair may be used even when a dedicated subframe is not allocated for direct communication. Only if a UE can identify the control information formats for communication with an eNB and direct communication after decoding a PDCCH, the first to fourth methods for identifying and signaling a Tx UE pair and an Rx UE pair may be used even when a dedicated subframe is not allocated for direct communication.

DL control information delivered on a control channel (that is, a PDCCH) to indicate resources for communication with an eNB has a different format from DL control information delivered on a control channel (that is, a PDCCH) to indicate resources for direct communication. The size of DL control information delivered on a control channel to indicate resources for direct communication may be different from the size of existing DL control information, so that a UE may determine whether DL control information indicates resources for direct communication, when the UE receives and decodes a control channel.

In another embodiment, different C-RNTIs may be assigned for communication with an eNB and communication with another UE. A UE may be assigned an additional C-RNTI to communicate with another UE through a direct communication link. If the UE communicates with one or more other UEs through direct communication link, the UE is assigned one C-RNTI. If the UE communicates with one or more other UEs through direct communication links and also communicates with the eNB, the UE is assigned two C-RNTIs for a direct communication link and a link with the eNB. In this case, the additional C-RNTI assigned to the UE, for direct communication may be used as a unified C-RNTI in the first to fifth methods for identifying and signaling a Tx UE pair and an Rx UE pair.

Figure 50:
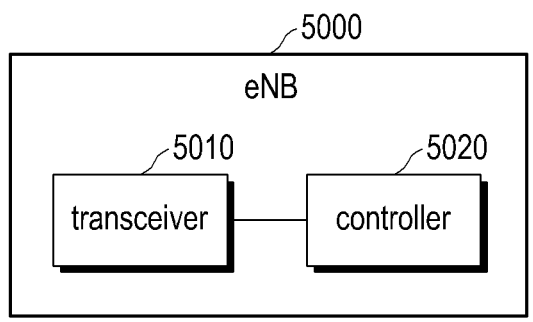
FIG. 50 is a block diagram of an eNB according to an embodiment of the present disclosure.

FIG. 50 is a block diagram of an eNB according to an embodiment of the present disclosure.

Referring to FIG. 50, an eNB 5000 may include a transceiver 5010 for performing data communication with various network nodes and a UE and a controller 5020 for controlling the transceiver 5010. In the present disclosure, the foregoing operations of an eNB may be interpreted as performed under control of the controller 5020.

While the transceiver 5010 and the controller 5020 are shown in FIG. 50 as separately configured, the transceiver 5010 and the controller 5020 may be incorporated into a single component.

Figure 51:
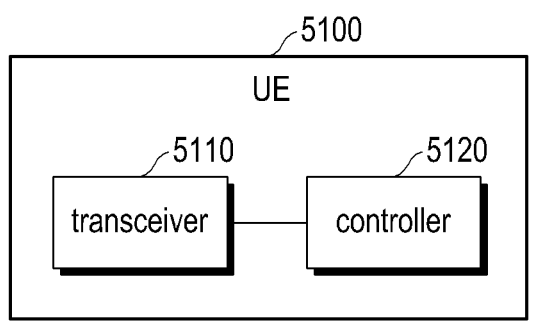
FIG. 51 is a block diagram of a UE according to an embodiment of the present disclosure.

FIG. 51 is a block diagram of a UE according to an embodiment of the present disclosure.

Referring to FIG. 51, a UE 5100 may include a transceiver 5110 for performing data communication with various network nodes and an eNB and a controller 5120 for controlling the transceiver 5110. In the present disclosure, the foregoing operations of a UE may be interpreted as performed under control of the controller 5120.

While the transceiver 5110 and the controller 5120 are shown in FIG. 51 as separately configured, the transceiver 5110 and the controller 5120 may be incorporated into a single component.

The proposed method and apparatus for performing D2D communication may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, upon accessing the Wi-Fi communication network, the electronic device may receive a variety of service information from an operator or a venue providing the Wi-Fi communication network, making it possible for the operator to provide a variety of service information to the users, contributing to the improvement of the advertising efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for device-to-device (D2D) communication, the method comprising:
    transmitting, by a user equipment (UE), a D2D indication message to a base station (BS);
    in response to the D2D indication message, receiving, from the BS, a message including a radio network terminal identifier (RNTI) for D2D communication, the RNTI for D2D communication being assigned by the BS to the UE;
    transmitting, to the BS, a buffer status report for D2D communication to request resources for D2D communication; and receiving information on resources for D2D communication from the BS using the RNTI for D2D communication,
  wherein the buffer status report for D2D communication includes a destination ID for D2D communication, a logical channel group ID, and a buffer size, and
  wherein the buffer status report for D2D communication is identified by media access control protocol data unit (MAC PDU) subheaders with a logical channel identifier (LCID) and a LCID value indicating the buffer status report for D2D communication is different from a LCID value indicating a buffer status report for uplink transmission to the BS.

2. The method of claim 1, wherein the buffer status report for D2D communication is transmitted in physical uplink control channel (PUCCH) resources reserved or assigned to the UE for transmitting a scheduling request.

3. The method of claim 1, wherein the D2D indication message indicates that the UE is interested in D2D communication or in transmission for D2D communication or in reception for D2D communication or in both transmission and reception for D2D communication.

4. The method of claim 1, wherein the D2D indication message is transmitted by the UE in a radio resource control (RRC) connected state.

5. The method of claim 1, wherein the D2D indication message is transmitted by the UE in a radio resource control (RRC) connection setup message.

6. The method of claim 1, further comprising:
  transmitting, to the BS, a scheduling request for the buffer status report for D2D communication,
  wherein the scheduling request is transmitted via a random access channel.

7. A method for device-to-device (D2D) communication, the method comprising:
  receiving, by a base station (BS), a D2D indication message from a user equipment (UE);
  assigning a radio network terminal identifier (RNTI) for D2D communication to the UE, and in response to the D2D indication message, transmitting, to the UE, a message including the RNTI for D2D communication;
  receiving, from the UE, a buffer status report for D2D communication to request resources for D2D communication;
  determining that the UE has data for D2D communication based on the buffer status report for D2D communication; and
  allocating, to the UE, resources for D2D communication using the RNTI for D2D communication,
  wherein the buffer status report for D2D communication includes a destination ID for D2D communication, a logical channel group ID, and a buffer size, and
  wherein the buffer status report for D2D communication is identified by media access control protocol data unit (MAC PDU) subheaders with a logical channel identifier (LCID) and a LCID value indicating the buffer status report for D2D communication is different from a LCID value indicating a buffer status report for uplink transmission to the BS.

8. The method of claim 7, wherein the buffer status report for D2D communication is received in physical uplink control channel (PUCCH) resources reserved or assigned to the UE for transmitting a scheduling request.

9. The method of claim 7, wherein the D2D indication message indicates that the UE is interested in D2D communication or in transmission for D2D communication or in reception for D2D communication or in both transmission and reception for D2D communication.

10. The method of claim 7, wherein the D2D indication message is received from the UE in a radio resource control (RRC) connected state.

11. The method of claim 7, wherein the D2D indication message is received from the UE in a radio resource control (RRC) connection setup message.

12. The method of claim 7, further comprising:
  receiving, from the UE, a scheduling request for the buffer status report for D2D communication,
  wherein the scheduling request is received via a random access channel.

13. An apparatus for device-to-device (D2D) communication, the apparatus comprising:
  a transceiver configured to perform D2D communication with another apparatus through a direct communication link; and
  a controller configured to:
    transmit a D2D indication message to a base station (BS),
    in response to the D2D indication message, receive, from the BS, a message including a radio network terminal identifier (RNTI) for D2D communication, the RNTI for D2D communication being assigned by the BS to the apparatus,
    transmit, to the BS, a buffer status report for D2D communication for requesting resources for D2D communication, and
    receive information on resources for D2D communication from the BS using the RNTI for D2D communication,
  wherein the buffer status report for D2D communication includes a destination ID for D2D communication, a logical channel group ID, and a buffer size, and
  wherein the buffer status report for D2D communication is identified by media access control protocol data unit (MAC PDU) subheaders with a logical channel identifier (LCID) and a LCID value indicating the buffer status report for D2D communication is different from a LCID value indicating a buffer status report for uplink transmission to the BS.

14. The apparatus of claim 13, wherein the buffer status report for D2D communication is transmitted in physical uplink control channel (PUCCH) resources reserved or assigned to the UE for transmitting a scheduling request.

15. The apparatus of claim 13, wherein the D2D indication message indicates that the UE is interested in D2D communication or in transmission for D2D communication or in reception for D2D communication or in both transmission and reception for D2D communication.

16. The apparatus of claim 13, wherein the D2D indication message is transmitted in a radio resource control (RRC) connected state.

17. The apparatus of claim 13, wherein the D2D indication message is transmitted in a radio resource control (RRC) connection setup message.

18. The apparatus of claim 13,
  wherein the transceiver is further configured to transmit a scheduling request for the buffer status report for D2D communication to the BS, and
  wherein the scheduling request is transmitted via a random access channel.

19. An apparatus for device-to-device (D2D) communication, the apparatus comprising:

a controller configured to:
  receive a D2D indication message from a user equipment (UE),
  assign a radio network terminal identifier (RNTI) for D2D communication to the UE, and in response to the D2D indication message, transmit, to the UE, a message including the RNTI for D2D communication,
  receive a buffer status report for D2D communication for requesting resources for D2D communication,
  determine that the UE has data for D2D communication based on the buffer status report for D2D communication, and
  allocate resources for D2D communication using the RNTI for D2D communication to the UE; and
a transceiver configured to perform communication with the UE,
wherein the buffer status report for D2D communication includes a destination ID for D2D communication, a logical channel group ID, and a buffer size, and
wherein the buffer status report for D2D communication is identified by media access control protocol data unit (MAC PDU) subheaders with a logical channel identifier (LCID) and a LCID value indicating the buffer status report for D2D communication is different from a LCID value indicating a buffer status report for uplink transmission to the BS.

20. The apparatus of claim 19, wherein the buffer status report for D2D communication is received in physical uplink control channel (PUCCH) resources reserved or assigned to the UE for transmitting a scheduling request.

21. The apparatus of claim 19, wherein the D2D indication message indicates that the UE is interested in D2D communication or in transmission for D2D communication or in reception for D2D communication or in both transmission and reception for D2D communication.

22. The apparatus of claim 19, wherein the D2D indication message is received from the UE in a radio resource control (RRC) connected state.

23. The apparatus of claim 19, wherein the D2D indication message is received from the UE in a radio resource control (RRC) connection setup message.

24. The apparatus of claim 19,
  wherein the transceiver is further configured to receive a scheduling request for the buffer status report for D2D communication from the UE, and
  wherein the scheduling request is received via a random access channel.

* * * * *